United States Patent
Hassan et al.

(10) Patent No.: US 10,998,982 B2
(45) Date of Patent: May 4, 2021

(54) TRANSMITTER FOR THROUGHPUT INCREASES FOR OPTICAL COMMUNICATIONS

(71) Applicant: Microsoft Technology Licensing, LLC, Redmond, WA (US)

(72) Inventors: Amer Aref Hassan, Kirkland, WA (US); Wei-Chen Chen, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 16/387,827

(22) Filed: Apr. 18, 2019

(65) Prior Publication Data

US 2020/0336217 A1    Oct. 22, 2020

(51) Int. Cl.
*H04B 10/04* (2006.01)
*H04B 10/67* (2013.01)
(Continued)

(52) U.S. Cl.
CPC ........... *H04B 10/672* (2013.01); *H04B 10/25* (2013.01); *H04B 10/43* (2013.01); *H04B 10/516* (2013.01); *H04B 10/564* (2013.01)

(58) Field of Classification Search
CPC .... H04B 10/506; H04B 10/501; H04B 10/50; H04B 10/502; H04B 10/503; H04B 10/25891; H04B 10/508; H04B 10/504; H04B 10/5051; H04B 10/5055; H04B 10/505; H04B 10/5053; H04B 10/564;
(Continued)

(56) References Cited

U.S. PATENT DOCUMENTS 3,984,190 A    10/1976  Barrett et al.
4,150,284 A     4/1979  Trenkler et al.
(Continued)

FOREIGN PATENT DOCUMENTS

EP    0234730 B1    7/1992
EP    0975104 A1    1/2000
(Continued)

OTHER PUBLICATIONS

"Non Final Office Action Issued in U.S. Appl. No. 16/387,813", dated Apr. 3, 2020, 10 Pages.
(Continued)

*Primary Examiner* — Hibret A Woldekidan
(74) *Attorney, Agent, or Firm* — Schwegman Lundberg & Woessner, P.A.

(57) ABSTRACT

Disclosed in some examples, are optical devices, systems, and machine-readable mediums that send and receive multiple streams of data across a same optical communication path (e.g., a same fiber optic fiber) with a same wavelength using different light sources transmitting at different power levels—thereby increasing the bandwidth of each optical communication path. Each light source corresponding to each stream transmits at a same frequency and on the same optical communication path using a different power level. The receiver differentiates the data for each stream by applying one or more detection models to the photon counts observed at the receiver to determine likely bit assignments for each stream.

20 Claims, 18 Drawing Sheets

(51) Int. Cl.
  *H04B 10/25* (2013.01)
  *H04B 10/43* (2013.01)
  *H04B 10/516* (2013.01)
  *H04B 10/564* (2013.01)

(58) Field of Classification Search
  CPC .............. H04B 10/50572; H04B 10/54; H04B 10/588; H04B 10/25137; H04B 10/40; H04B 10/50575; H04B 10/572; H04B 10/07955; H04B 10/0775; H04B 10/035; H04B 10/0795; H04B 10/11; H04B 10/1149; H04B 10/116; H04B 10/672; H04B 10/25; H04B 10/43; H04B 10/516; H04J 14/0221; H04J 14/06; H04J 14/0212; H04J 14/0252; H04Q 11/0001; H04Q 11/0005; H04Q 2011/0041; H04Q 2011/0083; H01L 25/167; G02B 6/4249; G02B 6/4286; G02B 6/43; H01S 3/1305; H01S 3/131; H01S 5/068
  USPC ...... 398/135–139, 38, 94, 195, 197, 196, 25
  See application file for complete search history.

(56) References Cited

U.S. PATENT DOCUMENTS

| | | | |
|---|---|---|---|
| 4,476,495 A | 10/1984 | Fujisawa et al. | |
| 4,763,326 A | 8/1988 | Krick | |
| 4,829,596 A | 5/1989 | Barina | |
| 5,410,147 A | 4/1995 | Riza et al. | |
| 5,510,919 A | 4/1996 | Wedding | |
| 5,737,366 A | 4/1998 | Gehlot | |
| 5,793,880 A | 8/1998 | Constant | |
| 6,148,428 A | 11/2000 | Welch et al. | |
| 6,366,381 B1 * | 4/2002 | Anderson | H04B 10/0775 398/154 |
| 6,424,444 B1 | 7/2002 | Kahn et al. | |
| 6,433,904 B1 | 8/2002 | Swanson et al. | |
| 6,437,893 B1 | 8/2002 | Rivollet et al. | |
| 6,490,067 B2 | 12/2002 | Bloom et al. | |
| 6,580,535 B1 * | 6/2003 | Schonfelder | H04J 14/06 398/152 |
| 6,609,139 B1 | 8/2003 | Dultz et al. | |
| 6,748,083 B2 | 6/2004 | Hughes et al. | |
| 6,816,726 B2 | 11/2004 | Lysejko et al. | |
| 6,851,086 B2 | 2/2005 | Szymanski | |
| 6,868,236 B2 | 3/2005 | Wiltsey et al. | |
| 6,915,076 B1 | 7/2005 | Mittal et al. | |
| 6,963,175 B2 | 11/2005 | Archenhold et al. | |
| 7,032,238 B2 | 4/2006 | Parnell et al. | |
| 7,050,723 B2 | 5/2006 | Katagiri et al. | |
| 7,110,681 B1 | 9/2006 | Mizuochi | |
| 7,113,708 B1 | 9/2006 | Creaney et al. | |
| 7,139,491 B2 | 11/2006 | Katagiri et al. | |
| 7,177,320 B2 | 2/2007 | Lysejko et al. | |
| 7,212,742 B2 | 5/2007 | Peddanarappagari et al. | |
| 7,286,762 B2 | 10/2007 | Elahmadi et al. | |
| 7,305,091 B1 | 12/2007 | Hirano | |
| 7,307,569 B2 | 12/2007 | Vrazel et al. | |
| 7,477,849 B2 | 1/2009 | Ahmed et al. | |
| 7,489,875 B2 | 2/2009 | Murphy | |
| 7,606,272 B2 | 10/2009 | Beausoleil et al. | |
| 7,689,130 B2 | 3/2010 | Ashdown | |
| 7,830,575 B2 | 11/2010 | Moon et al. | |
| 7,844,186 B2 | 11/2010 | Dorrer et al. | |
| 7,936,829 B2 | 5/2011 | Romero et al. | |
| 7,970,349 B2 | 6/2011 | Chen et al. | |
| 7,983,570 B2 | 7/2011 | Han et al. | |
| 7,986,783 B2 | 7/2011 | Ikushima et al. | |
| 8,155,175 B2 | 4/2012 | Olgaard | |
| 8,213,801 B2 | 7/2012 | Nien et al. | |
| 8,295,485 B2 | 10/2012 | Yuan et al. | |
| 8,552,659 B2 | 10/2013 | Ashdown et al. | |
| 8,559,378 B2 | 10/2013 | Schaepperle | |
| 8,873,965 B2 | 10/2014 | Giustiniano et al. | |
| 8,879,925 B2 | 11/2014 | Akiyama et al. | |
| 8,929,402 B1 | 1/2015 | Hughes | |
| 8,948,600 B2 | 2/2015 | Kwon et al. | |
| 9,014,551 B1 | 4/2015 | Stooke | |
| 9,094,151 B2 | 7/2015 | Prez De et al. | |
| 9,386,587 B2 | 7/2016 | Hu et al. | |
| 9,401,766 B2 | 7/2016 | Yuan et al. | |
| 9,608,733 B2 | 3/2017 | Pavlas et al. | |
| 9,787,404 B2 | 10/2017 | Cesnik | |
| 9,800,399 B2 | 10/2017 | Tanzilli et al. | |
| 9,813,127 B2 | 11/2017 | George et al. | |
| 9,826,540 B1 | 11/2017 | Li et al. | |
| 9,859,977 B2 | 1/2018 | Zhao et al. | |
| 9,946,723 B2 | 4/2018 | Lawrence | |
| 10,117,120 B2 | 10/2018 | Sun et al. | |
| 10,135,540 B2 | 11/2018 | Medra et al. | |
| 10,182,480 B2 | 1/2019 | Scapa et al. | |
| 10,187,171 B2 | 1/2019 | Doster et al. | |
| 10,193,722 B2 | 1/2019 | Guha | |
| 10,219,695 B2 | 3/2019 | Bhadri et al. | |
| 10,230,468 B2 | 3/2019 | Mansouri Rad et al. | |
| 10,231,687 B2 | 3/2019 | Kahn et al. | |
| 10,333,622 B2 | 6/2019 | Bhoja et al. | |
| 10,404,379 B2 | 9/2019 | Shiraishi | |
| 10,476,728 B2 | 11/2019 | Zhang et al. | |
| 10,686,530 B1 | 6/2020 | Hassan | |
| 10,742,325 B1 | 8/2020 | Hassan et al. | |
| 10,742,326 B1 | 8/2020 | Hassan et al. | |
| 2001/0033406 A1 | 10/2001 | Koike et al. | |
| 2002/0171899 A1 | 11/2002 | Gurusami et al. | |
| 2002/0196510 A1 | 12/2002 | Hietala et al. | |
| 2003/0030873 A1 | 2/2003 | Hietala et al. | |
| 2003/0032391 A1 | 2/2003 | Schweinhart et al. | |
| 2003/0072050 A1 | 4/2003 | Vrazel et al. | |
| 2003/0076569 A1 | 4/2003 | Stevens | |
| 2003/0223762 A1 | 12/2003 | Ho et al. | |
| 2003/0231676 A1 | 12/2003 | Buckman et al. | |
| 2003/0235415 A1 | 12/2003 | Peters et al. | |
| 2004/0013429 A1 | 1/2004 | Duelk et al. | |
| 2004/0028412 A1 | 2/2004 | Murphy | |
| 2004/0057733 A1 | 3/2004 | Azadet et al. | |
| 2005/0012033 A1 | 1/2005 | Stern et al. | |
| 2005/0100336 A1 | 5/2005 | Mendenhall et al. | |
| 2005/0213966 A1 | 9/2005 | Chown et al. | |
| 2006/0088110 A1 | 4/2006 | Romero et al. | |
| 2006/0115272 A1 | 6/2006 | Minato et al. | |
| 2006/0127102 A1 | 6/2006 | Roberts et al. | |
| 2006/0165190 A1 | 7/2006 | Tamaki et al. | |
| 2006/0204247 A1 | 9/2006 | Murphy | |
| 2007/0014286 A1 | 1/2007 | Lai | |
| 2007/0041731 A1 | 2/2007 | Yasumoto et al. | |
| 2007/0092265 A1 | 4/2007 | Vrazel et al. | |
| 2007/0160212 A1 | 7/2007 | Zavriyev et al. | |
| 2007/0165862 A1 | 7/2007 | Young et al. | |
| 2007/0201692 A1 | 8/2007 | Furusawa et al. | |
| 2007/0201867 A1 | 8/2007 | Delew et al. | |
| 2007/0222654 A1 | 9/2007 | Vrazel et al. | |
| 2007/0280684 A1 | 12/2007 | Onoda et al. | |
| 2008/0019523 A1 | 1/2008 | Fuse et al. | |
| 2008/0129564 A1 | 6/2008 | Kitayama et al. | |
| 2008/0138087 A1 | 6/2008 | Snyder | |
| 2008/0166131 A1 | 7/2008 | Hudgins et al. | |
| 2008/0166135 A1 | 7/2008 | Ann | |
| 2008/0224635 A1 * | 9/2008 | Hayes | H05B 35/00 315/297 |
| 2008/0240734 A1 | 10/2008 | Fuse | |
| 2008/0272276 A1 | 11/2008 | Huang et al. | |
| 2009/0148058 A1 | 6/2009 | Dane et al. | |
| 2009/0245809 A1 | 10/2009 | Nakamoto | |
| 2009/0269055 A1 | 10/2009 | Butler et al. | |
| 2010/0054754 A1 | 3/2010 | Miller et al. | |
| 2010/0142965 A1 | 6/2010 | Breyer et al. | |
| 2010/0182294 A1 | 7/2010 | Roshan et al. | |
| 2010/0221011 A1 | 9/2010 | Pinceman et al. | |
| 2011/0052195 A1 | 3/2011 | Karstens | |
| 2011/0076026 A1 | 3/2011 | Ledentsov et al. | |
| 2011/0234436 A1 | 9/2011 | Bogoni et al. | |
| 2011/0255866 A1 | 10/2011 | Van veen et al. | |

(56) References Cited

U.S. PATENT DOCUMENTS

| | | |
|---|---|---|
| 2011/0280576 A1 | 11/2011 | Chan et al. |
| 2012/0057506 A1 | 3/2012 | Kumar |
| 2012/0063596 A1 | 3/2012 | Brodsky et al. |
| 2012/0063774 A1 | 3/2012 | Niibe et al. |
| 2012/0128367 A1 | 5/2012 | Yamada |
| 2013/0004172 A1 | 1/2013 | Sugawa et al. |
| 2013/0188956 A1 | 7/2013 | Abe et al. |
| 2013/0216219 A1 | 8/2013 | Honda et al. |
| 2013/0236171 A1 | 9/2013 | Saunders |
| 2013/0236194 A1 | 9/2013 | Saunders et al. |
| 2013/0287403 A1 | 10/2013 | Roberts |
| 2014/0199075 A1* | 7/2014 | Huh .................. H04J 14/0221 398/79 |
| 2014/0312777 A1* | 10/2014 | Shearer ................ H05B 45/20 315/151 |
| 2014/0313387 A1 | 10/2014 | Vogelsang et al. |
| 2014/0321859 A1 | 10/2014 | Guo et al. |
| 2014/0321863 A1 | 10/2014 | Diab |
| 2015/0063476 A1 | 3/2015 | Wang et al. |
| 2015/0071651 A1 | 3/2015 | Asmanis et al. |
| 2015/0071653 A1 | 3/2015 | Robinson et al. |
| 2015/0098705 A1 | 4/2015 | Motley |
| 2015/0147069 A1 | 5/2015 | Brandt-pearce et al. |
| 2015/0222359 A1 | 8/2015 | Kai et al. |
| 2015/0222366 A1 | 8/2015 | Asmanis et al. |
| 2015/0318928 A1 | 11/2015 | Yoo et al. |
| 2015/0365172 A1 | 12/2015 | Luo et al. |
| 2016/0036525 A1* | 2/2016 | Pirkl ................ H04B 10/07955 398/38 |
| 2016/0080087 A1 | 3/2016 | Koike-akino et al. |
| 2016/0119096 A1 | 4/2016 | Sun et al. |
| 2016/0266054 A1 | 9/2016 | Cao et al. |
| 2017/0063466 A1 | 3/2017 | Wang et al. |
| 2017/0099139 A1 | 4/2017 | Han et al. |
| 2017/0168472 A1 | 6/2017 | Ando et al. |
| 2017/0207854 A1* | 7/2017 | Blumkin .............. H04R 23/008 |
| 2017/0250780 A1 | 8/2017 | Ge et al. |
| 2017/0302383 A1 | 10/2017 | Medra et al. |
| 2017/0325179 A1 | 11/2017 | Ameixieira |
| 2017/0366368 A1* | 12/2017 | Crayford ................ H04L 67/10 |
| 2018/0076836 A1 | 3/2018 | Zhu et al. |
| 2018/0145753 A1 | 5/2018 | Ashrafi et al. |
| 2018/0199378 A1 | 7/2018 | Son et al. |
| 2018/0205465 A1 | 7/2018 | Tanaka et al. |
| 2018/0205503 A1 | 7/2018 | Chen et al. |
| 2018/0213305 A1 | 7/2018 | Campos et al. |
| 2018/0227162 A1 | 8/2018 | Tokuhiro |
| 2018/0227651 A1 | 8/2018 | Brodsky et al. |
| 2018/0262291 A1 | 9/2018 | Doster et al. |
| 2018/0279270 A1 | 9/2018 | Sano et al. |
| 2018/0332373 A1 | 11/2018 | Wey et al. |
| 2018/0337816 A1 | 11/2018 | Herath et al. |
| 2019/0017824 A1* | 1/2019 | Qiu ........................ H01S 3/1024 |
| 2019/0081702 A1 | 3/2019 | Laycock et al. |
| 2019/0110084 A1 | 4/2019 | Jia et al. |
| 2019/0140741 A1 | 5/2019 | Cheng et al. |
| 2019/0149236 A1* | 5/2019 | Wang .................. H04J 14/0298 398/48 |
| 2019/0191383 A1 | 6/2019 | Dang et al. |
| 2019/0214852 A1 | 7/2019 | Park |
| 2019/0239753 A1 | 8/2019 | Wentz |
| 2019/0245646 A1 | 8/2019 | Robert Safavi et al. |
| 2019/0280809 A1 | 9/2019 | Cho et al. |
| 2019/0312694 A1 | 10/2019 | Jia et al. |
| 2019/0317286 A1* | 10/2019 | Seyedi ................ G02B 6/4249 |
| 2019/0317315 A1 | 10/2019 | Wang et al. |
| 2019/0376820 A1 | 12/2019 | Jones et al. |
| 2020/0092009 A1 | 3/2020 | Böcherer et al. |
| 2020/0106529 A1 | 4/2020 | Nakamura et al. |

FOREIGN PATENT DOCUMENTS

| | | |
|---|---|---|
| EP | 1508989 A2 | 2/2005 |
| EP | 2903187 A1 | 8/2015 |
| EP | 3244554 A1 | 11/2017 |
| RU | 2009104211 A | 8/2010 |
| WO | 0077962 A1 | 12/2000 |
| WO | 02082694 A1 | 10/2002 |
| WO | 2007083157 A1 | 7/2007 |
| WO | 2013097088 A1 | 7/2013 |

OTHER PUBLICATIONS

"Non Final Office Action Issued in U.S. Appl. No. 16/387,819", dated Apr. 6, 2020, 11 Pages.

"Final Office Action Issued in U.S. Appl. No. 16/388,211", dated Mar. 31, 2020, 16 Pages.

"LDM | Layered Division Multiplexing | Power Division Multiplexing", Retrieved from https://web.archive.org/web/20170220135434/http:/www.rfwireless-world.com/Terminology/LDM-vs-TDM-vs-FDM.html, Feb. 20, 2017, 5 Pages.

"Notice of Allowance Issued in U.S. Appl. No. 16/387,774", dated Sep. 30, 2019, 8 Pages.

Feng, et al., "Digital Domain Power Division Multiplexing DDO-OFDM Transmission with Successive Interference Cancelation", In Conference on Lasers and Electro-Optics, Jun. 5, 2016, 2 Pages.

Quimby, Richard S., "Photonics and Lasers: An Introduction", In Publications of John Wiley & Sons, Apr. 14, 2006, 533 Pages.

Wu, et al., "Digital Domain Power Division Multiplexed Dual Polarization Coherent Optical OFDM Transmission", In Journal of Computing Research Repository, Jul. 2017, 9 Pages.

U.S. Appl. No. 16/387,756, filed Apr. 18, 2019, Throughput Increases for Optical Communications.

U.S. Appl. No. 16/387,774, filed Apr. 18, 2019, Power Switching For Systems Implementing Throughput Improvements For Optical Communications.

U.S. Appl. No. 16/387,784, filed Apr. 18, 2019, Receiver Training Throughput Increases in Optical Communications.

U.S. Appl. No. 16/388,178, filed Apr. 18, 2019, Power-Based Encoding of Data to be Transmitted Over an Optical Communication Path.

U.S. Appl. No. 16/388,211, filed Apr. 18, 2019, Power-Based Decoding of Data Received Over an Optical Communication Path.

U.S. Appl. No. 16/388,258, filed Apr. 18, 2019, Power-Based Encoding of Data to Be Transmitted Over an Optical Communication Path.

U.S. Appl. No. 16/388,340, filed Apr. 18, 2019, Power-Based Decoding of Data Received Over an Optical Communication Path.

U.S. Appl. No. 16/387,791, filed Apr. 18, 2019, Blind Detection Model Optimization.

U.S. Appl. No. 16/387,802, filed Apr. 18, 2019, Error Control Coding With Dynamic Ranges.

U.S. Appl. No. 16/388,373, filed Apr. 18, 2019, Power-Based Encoding of Data to Be Transmitted Over an Optical Communication Path.

U.S. Appl. No. 16/388,393, filed Apr. 18, 2019, Power-Based Decoding of Data Received Over an Optical Communication Path.

U.S. Appl. No. 16/387,813, filed Apr. 18, 2019, Throughput Increases for Optical Communications.

U.S. Appl. No. 16/387,819, filed Apr. 18, 2019, System for Throughput Increases for Optical Communications.

U.S. Appl. No. 16/387,835, filed Apr. 18, 2019, Unequal Decision Regions for Throughput Increases for Optical Communications.

"Non-Final Office Action Issued in U.S. Appl. No. 16/387,756", dated Nov. 18, 2019, 8 Pages.

"Notice of Allowance Issued in U.S. Appl. No. 16/388,178", dated Oct. 1, 2019, 12 Pages.

"Non-Final Office Action Issued in U.S. Appl. No. 16/388,211", dated Oct. 3, 2019, 18 Pages.

"Notice of Allowance Issued in U.S. Appl. No. 16/388,258", dated Nov. 19, 2019, 10 Pages.

"Non-Final Office Action Issued in U.S. Appl. No. 16/388,373", dated Nov. 15, 2019, 9 Pages.

"Poisson Regression", [online]. Retrieved from the Internet: <URL: https://docs.microsoft.com/en-us/azure/machine-learning/studio-module-reference/poisson-regression>, (Jan. 27, 2018), 7 Pages.

(56) References Cited

OTHER PUBLICATIONS

"T1.2 / Project xxxx/ Rev 0.5", Information Technology: Fibre Channel—Methodologies for Signal Quality Specification—3 FC-MSQS-3, (Jan. 26, 2017), 22 Pages.
Donovan, James, "How Multiplexing Techniques Enable Higher Speeds on Fiber Optic Cabling", [online]. Retrieved from the Internet: URL: https://www.commscope.com/Blog/How-Multiplexing-Techniques-Enable-Higher-Speeds-on-Fiber-Optic-Cabling/>, (Jul. 25, 2016), 7 pages.
Quimby, Richard S., "Section 24-3. Power Budget in Fiber Optic Link—Receiver Sensitivity", *Photonics and Lasers—An Introduction*, John Wiley & Sons, Inc., Hoboken, New Jersey, (2006), 464-469.
Van Der Bij, Erik, "Fibre Channel Overview", [online]. Retrieved from the Internet: <URL: http://hsi.web.cern.ch/HSI/fcs/spec/overview.htm>, (Aug. 15, 1994), 10 Pages.
U.S. Appl. No. 16/387,784, filed Apr. 18, 2019, Receiver Training for Throughput Increases in Optical Communications.
"Non Final Office Action Issued in U.S. Appl. No. 16/388,340", dated May 8, 2020, 20 Pages.
"Non Final Office Action Issued in U.S. Appl. No. 16/388,393", dated May 7, 2020, 20 Pages.
"International Search Report and Written Opinion Issued in PCT Application No. PCT/US2019/063124", dated Mar. 27, 2020, 11 Pages.
"Notice of Allowance Issued in U.S. Appl. No. 16/387,784", dated Mar. 11, 2020, 11 Pages.
"Non Final Office Action Issued in U.S. Appl. No. 16/387,835", dated Feb. 5, 2020, 7 Pages.
"Notice of Allowance Issued in U.S. Appl. No. 16/388,373", dated Feb. 27, 2020, 11 Pages.
Elsherif, et al., "Performance Enhancement of Mapping Multiplexing Technique Utilising Dual-Drive Mach—Zehnder Modulator for Metropolitan Area Networks", In Journal of IET Optoelectronics, vol. 9, Issue 2, Apr. 2015, pp. 108-115.
Linden, et al., "Improvement on Received Optical Power Based Flexible Modulation in a PON by the Use of Non-Uniform PAM", In Proceedings of European Conference on Optical Communication, Sep. 17, 2017, 3 Pages.
"International Search Report & Written Opinion Issued in PCT Application No. PCT/US20/014304", dated Jul. 21, 2020, 11 Pages.
"International Search Report & Written Opinion Issued in PCT Application No. PCT/US20/024323", dated Aug. 3, 2020, 11 Pages.
"International Search Report & Written Opinion Issued in PCT Application No. PCT/US20/024328", dated Aug. 3, 2020, 13 Pages.
"International Search Report & Written Opinion Issued in PCT Application No. PCT/US20/024366", dated Jul. 17, 2020, 12 Pages.
"International Search Report & Written Opinion Issued in PCT Application No. PCT/US20/024370", dated Aug. 3, 2020, 12 Pages.
"International Search Report & Written Opinion Issued in PCT Application No. PCT/US20/024535", dated Jul. 6, 2020, 13 Pages.
"International Search Report & Written Opinion issued in PCT Application No. PCT/US20/024529", dated Aug. 7, 2020, 11 Pages.
"Non Final Office Action Issued in U.S. Appl. No. 16/387,802", dated Jun. 22, 2020, 9 Pages.
"Notice of Allowance Issued in U.S. Appl. No. 16/387,813", dated Jul. 23, 2020, 7 Pages.
"Non Final Office Action Issued in U.S. Appl. No. 16/388,211", dated Aug. 7, 2020, 18 Pages.
Cuccato, et al., "Complete and Compact 32-Channel System for Time-Correlated Single-Photon Counting Measurements", In Journal of IEEE Photonics Journal, vol. 5, Issue 5, Oct. 2, 2013, 14 Pages.
Feng, et al., "Spectrally overlaid DDO-OFDM transmission enabled by optical power division multiplexing", In Proceedings of 15th International Conference on Optical Communications and Networks (ICOCN), Sep. 24, 2016, 3 Pages.
Han, et al., "Power division multiplexing", In Proceedings of IEEE/CIC International Conference on Communications in (ICCC), Jul. 27, 2016, 6 Pages.
Hsu, et al., "Multilevel Priority Scheme for Fiber-Optic-Code Division Multiple Access (CDMA) Packet Networks", In Proceedings of IEEE INFOCOM '93 The Conference on Computer Communications, Mar. 29, 1993, pp. 1359-1366.
Khan, et al., "Visible Light Communication using Wavelength Division Multiplexing for Smart Spaces", In Proceedings of the IEEE Consumer Communications and Networking Conference (CCNC), Jan. 14, 2012, pp. 230-234.
"International Search Report and Written Opinion Issued in PCT Application No. PCT/US19/063121", dated Apr. 1, 2020, 13 Pages.
"International Search Report and Written Opinion Issued in PCT Application No. PCT/US20/024522", dated Jul. 16, 2020, 14 Pages.
"International Search Report and Written Opinion Issued in PCT Application No. PCT/US20/024533", dated Jul. 16, 2020, 12 Pages.
"International Search Report and Written Opinion Issued in PCT Application No. PCT/US20/024534", dated Jul. 16, 2020, 11 Pages.
"International Search Report and Written Opinion Issued in PCT Application No. PCT/US20/024536", dated Jul. 6, 2020, 12 Pages.
"International Search Report and Written Opinion Issued in PCT Application No. PCT/US2020/024325", dated Jun. 18, 2020, 16 Pages.
"International Search Report and Written Opinion Issued in PCT Application No. PCT/US2020/024368", dated Jun. 22, 2020, 10 Pages.
Salehi, et al., "Code division multiple-access techniques in optical fiber networks—Part I: Fundamental principles", In Proceedings of IEEE Transactions on Communications, vol. 37, Issue 8,, Aug. 1, 1989, pp. 824-833.
Simon, et al., "Performance Analysis and Tradeoffs for Dual-Pulse PPM on Optical Communication Channels With Direct Detection", In Proceedings of IEEE Transactions on Communications, vol. 52, Issue 11, Nov. 1, 2004, pp. 1969-1979.
"Notice of Allowance Issued in U.S. Appl. No. 16/387,791", dated Aug. 28, 2020, 19 Pages.
"Notice of Allowance Issued in U.S. Appl. No. 16/388,340", dated Sep. 17, 2020, 13 Pages.
"Notice of Allowance Issued in U.S. Appl. No. 16/388,393", dated Sep. 22, 2020, 13 Pages.

* cited by examiner

TRANSMITTER FOR THROUGHPUT INCREASES FOR OPTICAL COMMUNICATIONS

BACKGROUND

Optical communications, such as fiber optic communications utilize a light source at one end that transmits one or more data streams by modulating the data stream into light signals. These light signals pass through a medium such as air or a glass fiber with internally reflective surfaces (a fiber optic fiber) to a receiver which employs a photon detection module to detect the light signals. The detected light is then demodulated back into one or more data streams.

In order to effectively utilize the available light bandwidth, a number of distinct channels may be created by assigning a different light wavelength to each channel. Different data streams may be placed on each channel and transmitted simultaneously over a same medium to a same receiver. This practice is commonly referred to as Wavelength Division Multiplexing (WDM). Some WDM systems allow up to 80 such channels per fiber and per channel bandwidth may be 40 Gbit/second to produce almost 3.1 terabits/second of transmission on a single fiber (not including losses due to overhead).

As a result of this large bandwidth, fiber optic systems are becoming increasingly popular with communication network providers, cloud service providers, and other entities that need to transfer large amounts of data very quickly. In addition to carrying a large amount of data, fiber optics offer other advantages such as: less attenuation than electrical cables—which provides the benefit of utilizing less network infrastructure for longer runs of communication cables; lack of electromagnetic interference; and various other benefits.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1:
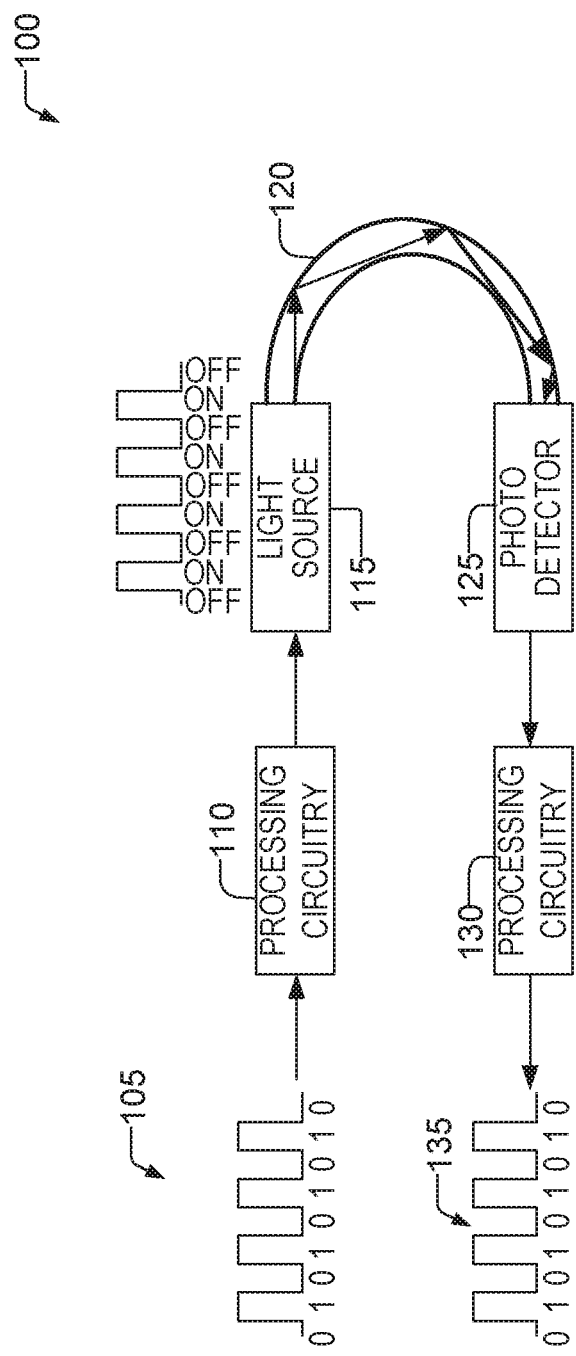
FIG. 1 illustrates components of a simplified optical communication system according to some examples of the present disclosure.

FIG. 1 illustrates components of a simplified optical communication system in the form of a fiber optic system 100 according to some examples of the present disclosure. A data stream 105 may comprise binary data produced by higher network layers that is processed by processing circuitry 110. Processing circuitry 110 may process the data of data stream 105 in one or more ways to prepare it for transmission. Example processing operations performed by the processing circuitry 110 includes applying one or more error correction codes, compression algorithms, encryption algorithms, and/or the like. The data, as transformed by the processing circuitry 110, is then passed as a control signal to a light source 115. The light source 115 modulates the data by selectively turning the light source on an off in accordance with the input data according to a modulation scheme. For example, in a simple modulation scheme, each bit may be transmitted during a predetermined period of time e.g., a timeslot). During a particular timeslot, if the current bit from the input data is a '1', the light source may be turned on during the timeslot and if the current bit from the input data is a '0', the light source may be turned off during the timeslot. Other, more complex modulation schemes may be utilized such as amplitude, phase, or polarization modulation. In some examples, the light may be modulated on a sine wave.

The light produced by the light source then travels over an optical communication path to the receiver. An optical communication path is the path taken by the light source from the transmitting light source to the receiving sensor. This path may be through one or more mediums, such as a single fiber optic fiber, air, or the like. In the example of FIG. 1 the optical communication path travels across a single fiber optic fiber 120. In examples in which the medium is air, the optical communication path may be the alignment of the transmitting light source and the sensor at the receiver.

The receiver includes a photo detector 125 and processing circuitry 130. The photo detector 125 collects a count of a number of photons detected over a detection time period which corresponds to an amount of time that a single bit of the data stream 105 is transmitted. Based upon the photon counts, the photo detector produces a data stream that is then input to the processing circuitry 130 which applies an inverse operation than that was applied by the processing circuitry 110 to produce data stream 135. The goal is to transmit data stream 105 to the receiver as fast as possible while having data stream 135 match data stream 105.

As previously noted, when using WDM, each communication path (e.g., each fiber) may support simultaneous transmission of multiple light streams when each transmission is using a different light wavelength. Despite the already high bandwidth of optical communications, as data needs grow, more capacity is necessary. For example, the proliferation of higher quality video streaming; the popularity of connected sensors and controllable devices (e.g., such as Internet of Things devices); and the ever-growing world population requires increased bandwidth and connectivity. Once the bandwidth of a fiber run in a system utilizing existing techniques such as WDM has been exceeded, increasing bandwidth requires installing additional fibers, which may be difficult and/or expensive to install.

While WDM increases the bandwidth of the medium, as will be made clear, it does not make use of the entire bandwidth available in the medium. Another solution to expand system bandwidth may be to utilize multiple power levels to represent different bits in a form of amplitude modulation (AM). For example, a '10' might be represented by modulating a sinusoidal wave with a first power level (a first amplitude) and a '01' might be represented by modulating a sinusoidal wave with a second power level (a second amplitude) and a '11' might be represented by modulating the sinusoidal wave with a third power level (a third amplitude). While increasing the number of bits that a particular light source may transmit, AM has a number of drawbacks. First, AM does not allow for two different transmitters with two different light sources to transmit simultaneously at a same wavelength and through the same communication path (e.g., fiber) as the receiver. Thus, this does not increase the number of devices that may occupy a particular communication path (e.g., fiber). Second, AM does not allow for non-sinusoidal waveforms. Finally, using AM, the receiver must know the exact power levels for each bit level ahead of time.

Other schemes similar to amplitude modulation include digital domain power division multiplexing DDPDM with successive interference cancellation. DDPDM linearly combines baseband signals (with bitstreams in each signal) after coding and modulation to form a new signal which is transmitted using a single light source. The receiver detects each stream by demodulating and decoding the baseband signals one by one in descending order of power level using a successive interference cancellation algorithm. This process estimates the channel response and demodulates the strongest signal while treating the other signals as interference. The estimated strongest signal is then re-modulated and multiplied by the channel response before subtracting that product from the received signal. This process is then repeated until all signals are decoded.

DDPDM schemes suffer from a number of drawbacks. First, as with AM, this scheme does not increase the number of devices that can simultaneously use the medium of a fiber. That is, while the scheme increases the number of streams that can be carried over a communication link, the DDPDM scheme utilizes a single light source. Using additional light sources would likely produce destructive interference that would prevent successful demodulation of the signal at the receiver. Even if the problem of reducing destructive interference was solved, since the decision regions in AM and DDPDM (the photon count region corresponding to a detected bit combination) are equal for each bit combination, the DDPDM and AM systems would have difficulty in situations where different transmitters have slightly different power levels. Finally, the decoding, demodulation, and interference cancellation of DDPDM communications are very complicated and require significant processing resources. For example, DDPDM demodulates and remodulates a same signal several times at the receiver. This increases device cost and/or decoding time.

Disclosed in some examples, are optical devices, systems, and machine-readable mediums that send and receive multiple streams of data across a same optical communication path (e.g., a same fiber optic fiber) with a same wavelength using different light sources transmitting at different power levels—thereby increasing the bandwidth of each optical communication path. Each light source corresponding to each stream transmits at a same frequency and on the same optical communication path using a different power level. The receiver differentiates the data for each stream by applying one or more detection models to the photon counts observed at the receiver to determine likely bit assignments for each stream. An example detection model may be a Poisson distribution around an average number of photons received for a given bit assignment combination. As a result, multiple streams of data may be sent on a single optical link which may double, triple, quadruple, or more the bandwidth of a single channel on a single link.

The present disclosure solves the technical problem of efficient bandwidth utilization in optical communications without the drawbacks of previous approaches discussed above. For example, the present disclosure allows for multiple data streams transmitted using a single light source or multiple data streams transmitted using multiple light sources. In the present disclosure, any interference from multiple light sources are accounted for by the detection models which are trained using any such interference. Also, due to the possibility that the models may have unequal decision regions, the use of different light sources with different power levels does not pose a problem like it does with AM and DDPDM. Furthermore, the models may adapt over time to factor in aging transmitter circuitry. In contrast to DDPDM, the present disclosure does not require remodulation of a received signal by doing a successive interference cancellation. Instead, the present disclosure utilizes average photon counts for a particular bit combination. Because the disclosed detection models are relatively simple probability distributions, the process of decoding and demultiplexing the data streams may use comparatively simple, cheap, and fast hardware and/or software to demultiplex the input rather than needing more complex hardware such as necessary in approaches using successive interference cancellation.

As optical power is a function of the number of photons and the wavelength, if the wavelength is kept constant, the power is therefore dependent on the number of photons. Thus, for a given wavelength, a power increase is an increase in photons being transmitted over the fiber. The probability of a particular number of photons striking the photodetector in the receiver during a particular time period (e.g., the time period for sending a data bit) for a given power level of the light source is described by a Poisson probability distribution where the median and the range of this probability distribution is related to the power level of the light source. As noted, an increase in power level increases the number of photons transmitted and thereby also increases a probability of more photons striking the receiver—thus causing a shift in the Poisson probability distribution.

Figure 2:
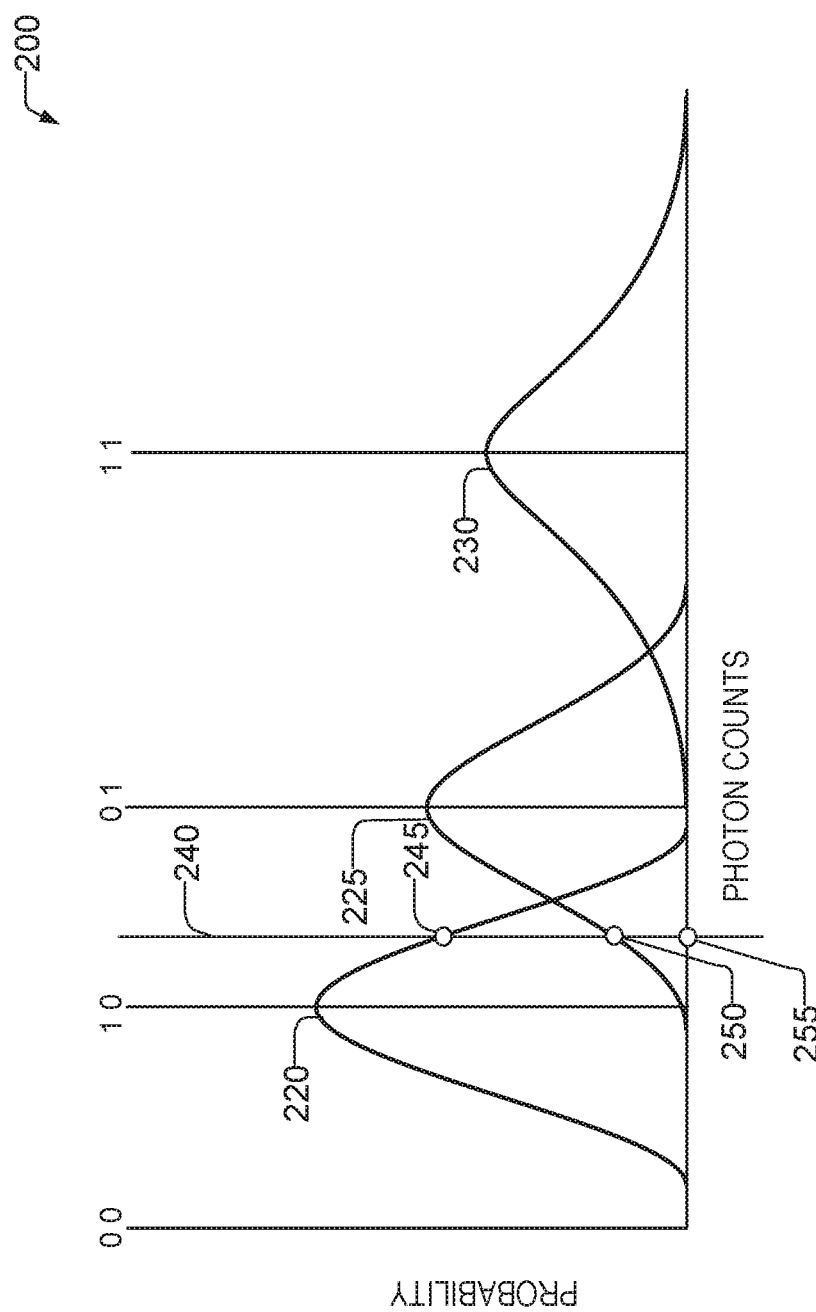
FIG. 2 shows a graph of three Poisson probability distributions corresponding to three different power levels graphed with probability as a y-axis and photon count as the x-axis according to some examples of the present disclosure.

FIG. 2 shows a graph 200 of three Poisson probability distributions corresponding to three different power levels graphed with probability as a y-axis and received photon count as the x-axis according to some examples of the present disclosure. FIG. 2 illustrates a first probability distribution 220 of a light source activated at a first power, a second probability distribution 225 of a light source activated at a second power (the second power is greater than the first power), and a third probability distribution 230 of a light source activated at a third power (the third power is greater than the second power) for a given wavelength on a same optical communication path. As noted above, as the power level of a light source increases, the number of photons output by the light source increases. This increases the number of photons that may be expected to strike the receiver which shifts the probability distributions to the right on the graph of FIG. 2 and flattens the curve (as more variation is to be expected with higher photon counts).

As noted above, the present disclosure utilizes one or more detection models to determine bit values for each bit in each stream that is transmitted over a same optical communication path (e.g., a same fiber) and a same wavelength but using different power levels. The detection models may be Poisson probability distributions. For example, probability distributions 220, 225, and 230 may serve as detection models. The first probability distribution 220 may model the probability that a particular photon count observed at the receiver is caused by the first light source corresponding to a first stream at a first power being switched on and the second light source corresponding to a second stream being switched off. In a simple modulation scheme where the light source being 'on' for the detection period is interpreted as a '1' and the light source being 'off' for the detection period is interpreted as a '0,' the first probability distribution 220 thus models a probability of a corresponding bit value for the first stream of '1' and '0' for the second stream—denoted in the figure as (1,0).

A second probability distribution 225 models the probability that a particular photon count observed at the receiver is caused by the second light source being activated corresponding to a second stream at a second power being on and the first light source corresponding to the first stream is off. Under the aforementioned simple modulation scheme, the second probability distribution 225 thus models a probability of a corresponding bit value for the first stream of 0 and 1 for the second stream—denoted in the figure as (0,1). The second power level is greater than the first power level.

A third probability distribution 230 models the probability that a particular photon count observed at the receiver is caused by both the first and second light sources being activated (and thus more photons are expected to strike the receiver). The third probability distribution 230 thus models a probability of a corresponding bit value for the first stream of 1 and 1 for the second stream denoted in the figure as (1,1). Multiple light sources that are activated at a same time will produce more photons then each individual light source—thus, shifting a probability distribution even farther to the right. Additionally, the range will increase with power as well flattening out the Poisson distributions as the additional photons also introduces the potential for more variance.

Thus, the receiver may utilize the observation that the photon counts observed at the receiver follow Poisson distributions based upon the power level of the light source to determine each bit for each bit stream even when both light sources are active at the same time. The receiver may observe the number of photons striking the receiver and calculate the probabilities that the photon count was produced by the first light source alone using the first probability distribution 220, the second light source alone using the second probability distribution 225, and a combination of the first and second light sources using the third probability distribution 230. Based upon these probability calculations a decision may be made using decision logic whether a bit for a first stream is '0' or '1' and whether a bit for a second stream is a '0' or '1.' In one example, the decision logic may be to select bits associated with a detection model corresponding to the highest probability given the observed photon count. For example, if the highest probability is that the photon count was produced by the first light source alone, the first stream may be assigned a bit value of '1' and the second stream may be assigned a bit value of '0.' Alternatively, if the highest probability is that the photon count was produced by the second light source alone, the first stream may be assigned a bit value of 0 and the second stream may be assigned a bit value of 1. Finally, of the highest probability is that the photon count was produced by both light sources, then both streams may be assigned a 1. This scheme may be repeated until the transmitters have finished transmitting data.

As an example, a photon count 240 observed at the receiver may have a first probability 245 according to the first probability distribution 220 and a second probability 250 according to a second probability model and a zero or near zero third probability 255 according to the third probability distribution 230. As first probability 245 is greater than both second probability 250 and third probability 255, probability distribution 220 may be selected—thus it is most probable that the photon count observed was caused by the first light source activated at the first power level and the second light source being off. Since a '1' is represented in this example by turning the light source on and a zero is represented by the light source being off—the most probable bit assignment of the first stream is 1 and for the second stream, the most probable bit assignment is 0.

As used herein, a detection region for the detection model is a range in which a signal, or an observed value (such as a photon count) of a signal has a non-negligible probability of assignment to a particular bit value. In the example of FIG. 2, the detection region may be the region underneath the distributions 220, 225, and 230. The detection region may be a region in which a probability of assigning a particular bit or bit combination to one or more bitstreams is above a predetermined threshold (e.g., a non-negligible value). As can be appreciated, the detection regions for the bit assignment 10 is of a different size than the detection region for bit assignment 01 and likewise from bit assignment 11. The differing sizes reflects the reality that different light sources operating at different power levels may produce different photon count signatures.

Figure 3:
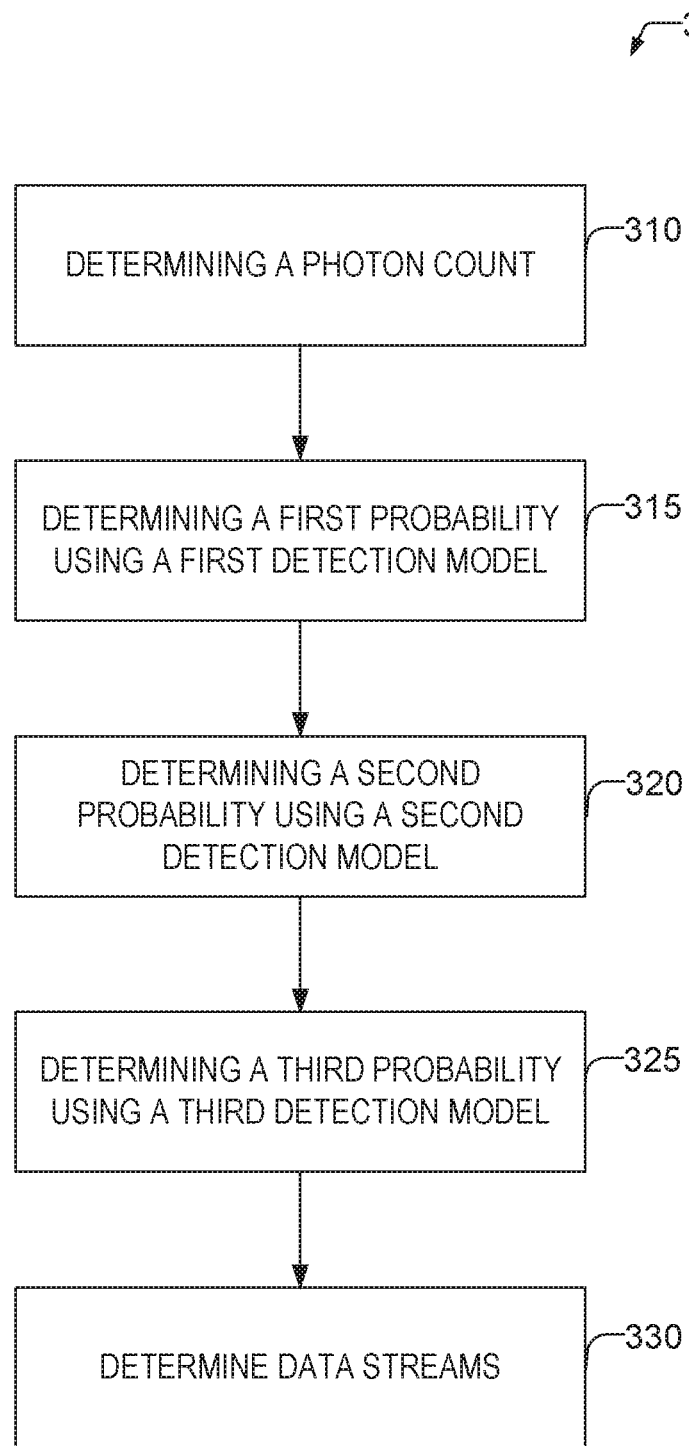
FIG. 3 illustrates a method performed by a receiver according to some examples of the present disclosure.

FIG. 3 illustrates a method 300 performed by a receiver according to some examples of the present disclosure. At operation 310 the receiver may determine a photon count of photons observed during a predetermined period of time. The predetermined period of time may be a period of time (e.g., a timeslot) whereby the transmitters and receivers are synchronized to transmit one or more bits of a bit stream (e.g., bits of a packet). At operation 315, the receiver determines a first probability using the photon count and a first detection model that a first light source corresponding to a first data stream is on at a first power level and a second light source corresponding to a second data stream is off. At operation 320, the receiver determines a second probability using the photon count and a second detection model that a first light source corresponding to a first data stream is off and a second light source corresponding to a second data stream is on at a second power level. At operation 325, the receiver determines a third probability using the photon count and a third detection model that the first light source is on at the first power level and the second light source is on at the second power level.

At operation 330, the system may determine bit values for the first and second data streams based upon the first, second, and third probabilities. For example, a model producing a highest probability value may be selected and bit values corresponding to that model may be assigned to the bit stream. As noted, the detection models may correspond to bit-values of the various data streams. For example, a light source being on during the predetermined period of time (e.g., timeslot) may indicate a '1' of the bit stream and a light source being off indicates a '0.' In these examples, the first detection model may indicate a probability, for a given photon count, that a bit of the first stream is a '1' and a bit of the second stream is a '0.' In some examples, a value of '0' for both bit streams may be determined (e.g., before operations 315, 320, and 325 or during operation 330) by comparing the photon count to a predetermined minimum threshold. In other examples, a separate model may be used for a value of '0' for both bit streams.

The present disclosure thus improves the functioning of a data transmission system by providing an improved transmission scheme that provides increased utilization of existing physical resources. By differentiating between multiple streams based upon detection models such as photon count probability models, each channel may carry multiple streams of data which increases overall system bandwidth significantly. This bandwidth increase may allow for additional users via additional devices or additional streams for each user (e.g., increase of a connection bandwidth for a particular user) over a same fiber. The disclosed techniques thus solve the technical problem of bandwidth shortages by utilizing detection models, such as photon count probability models to more efficiently utilize the currently available bandwidth rather than adding new bandwidth by adding additional fibers.

Power Level Assignments

As described above, each light source sending data across the optical communication path activates at different power levels. In some examples, the power levels of each light source may be fixed—that is, one or more of the transmitting light sources may be fixed to always activate at a particular power level that is different than other light sources in the system. This system may be simple and may be appropriate in certain situations such as where one light source is much more powerful than another light source. In these examples, no coordination or power level adjustments may be necessary as each light source naturally activates at a different power than the other light sources.

In other examples where the light sources have similar output powers and/or may have adjustable power outputs, the power levels of each light source may be set by assigning a power level to each light source via a power level assignment scheme. The power level assignment scheme is any formula or plan that is used to coordinate differing power levels across two or more transmitters. The power level assignment scheme may be divided into one or more phases. A phase specifies a unit of a power level assignment scheme where each transmitter serviced by the scheme is assigned a power level for either a defined duration or until the occurrence of a defined event. The duration may be time-based, data length-based (e.g., a defined number of timeslots), or the like. In some examples, the detection models used by the receiver may be specific to the current phase of the power level assignment scheme. Power level assignment schemes may be described by one or more data structures. For example, a formula, table, chart, or other indicator.

In some examples, the receiver may assign a power level assignment scheme. In other examples, the transmitters may mutually agree upon a power level assignment scheme. In examples in which the transmitters mutually agree on the power level assignment scheme, an agreement protocol may be utilized such as a majority voting algorithm where a power level assignment scheme is chosen as the scheme with the highest number of votes by the transmitters. The determination of a power level assignment scheme may include a selection of a power level assignment scheme from a determined list of power level assignment schemes and may include a customization of the selected power level assignment scheme.

When using a majority voting algorithm, each transmitter may vote for the power level assignment scheme that best matches a transmitter policy. The transmitter policy may vote a power level assignment scheme that most closely meets one or more policy goals such as bandwidth, error rate, quality of service (QoS), power consumption, heat output, and the like. These policy goals may be represented by an indication in the policy of a desired number of phases in which the transmitter is to transmit on high power. The number of phases at high power is a representation of the policy goals as high power phases increase bandwidth, decrease error rate, increase QoS, but also increase power consumption and heat output. Thus, devices prioritizing low battery usage would desire fewer high power phases. In contrast, devices wanting high QoS and high performance would desire more high power phases. The rating for each particular power level assignment scheme may be determined based upon how many high power phases are assigned to the transmitter for the particular power level assignment scheme in comparison to the desired number of high power phases.

In examples in which the receiver assigns a power level scheme or where one of the transmitters makes determinations for the entire system, the determination (the selection, creation, and/or customization) of the power level assignment scheme may be made without knowledge of the capabilities of the transmitters. In other examples, the determination (the selection and/or customization) of the power level assignment scheme may be based upon light source, data stream, and/or device characteristics. These characteristics may be exchanged amongst the transmitters and the receiver. Example, light source characteristics may include attainable power levels of the light source, type of light source (e.g., Light Emitting Diode (LED) or Light Amplification by Stimulated Emission of Radiation (LASER)), and the like. Device characteristics may include a heat budget, power budget, battery life, and the like. Data stream characteristics may include an expected QoS priority, expected bandwidth requirements for the stream, expected data rate, or the like.

As an example, consider a simple power level assignment scheme in which two data streams are utilized with two power levels where a first phase may have the first stream transmitting using a light source selectively activated at a high power level and the second stream transmitting sing a light source selectively activated at a low power level and a second phase with the first stream selectively transmitting with a light source activated at a low power level and the second stream selectively transmitting with a light source activated at a high power level. The phases may repeat as long as data is being sent. Phases may last a determined time, a determined number of bit transmissions (e.g., a determined number of timeslots), or until the occurrence (or non-occurrence) of a particular event. Thus, the scheme may change power levels every x-bits—where x is a determined number of bits (where x could be 1), every x periods of time, at the occurrence of a determined event, and the like.

The power level assignment scheme may be evenly distributed in that the power levels are assigned such that each light source may have an equal, or near equal (e.g., +/−10%) time that it activates at each power level. In other examples, the power level assignment scheme may be asymmetrically distributed such that one light source may activate at a higher or lower power level more often. This may be the result of considerations related to the light source, data stream, and/or device characteristics of the transmitter. For example, some transmitters may have heat and/or power budgets that govern how much power they may use to supply to the light source. For example, if the light source operates over a particular power a battery of the transmitter may be discharged too quickly. Additionally, operation at high power levels may unacceptably increase a heat that the device puts out. If one of the light sources has higher heat and/or power levels, this light source may be assigned to activate at a higher power level for longer periods of time to keep both light sources within the power and/or heat budgets. This may be accomplished by adjusting the phase durations. If the transmitters supply information on heat dissipation and power usage of the light sources, the system may calculate an optimal power level assignment scheme that keeps all light sources within their power level and/or heat dissipation budgets. Expected QoS priorities and bandwidth requirements may also be considered. For example, a light source corresponding to a data stream that is low priority data or utilizing lower bandwidths may be assigned to use lower power levels for longer than light sources with high priority or high bandwidth data to send.

For example, an asymmetric phase distribution for a power level assignment scheme may utilize transmitter power budgets (e.g., which may be set by a user, an administrator, a manufacturer, or the like) which specify power limits for a total power spent by the light source over a particular time period. In these examples, the system may determine how long each transmitter may activate its light source at the high power and the low power to keep itself within its power budget and use those calculations to set the duration of each phase. For example, by solving x such that both of the following equations are true and selecting the answer that is closest to being equal to the power budgets of each transmitter without going over:

$$(Power_L * (1-x) * Time_P + Power_H * (x) * Time_P) * \frac{Time_P}{Time_z} \leq \quad \text{Equation 1}$$

$$\text{Power Budget}_{trans1}$$

-continued $$(Power_L * (x) * Time_P + Power_H * (1-x) * Time_P) * \frac{Time_P}{Time_z} \leq \quad \text{Equation 2}$$

$$\text{Power Budget}_{trans2}$$

Where x is the proportion of phases spent at a high power level, $Power_L$ is the power needed to activate the light source on the low power level, $Power_H$ is the power needed to activate the light source on the high power level, $Time_P$ is the total time spent in each phase of the power level assignment scheme. The above equations assume that the light source would be transmitting 100% of the time in the phase. Thus, in some examples, the left sides of each equation may be adjusted to factor in an expected duty cycle during the phase (which may be 50% assuming on average that the data is well distributed between '1's and '0's). $Time_Z$ is the time-frame the Power Budget is measured in. Thus, $$\frac{Time_P}{Time_z}$$

corresponds to the number of phases that elapse in the power budget.

In other examples, the power level assignment scheme may be determined, in whole or in part, upon a Quality of Service (QoS) of the data to be transmitted. A light source transmitting a data stream carrying higher priority data (as determined by QoS metadata of the stream) may be assigned a higher power level to increase. In some examples, the phases of the power level assignment scheme may be changed on a packet-by-packet basis as the various QoS of the data to be transmitted changes. In other examples, the power level assignments may be changed as a result of higher priority QoS data and then changed back after a predetermined period of time. QoS approaches may supplement or override other approaches such that a power level assignment scheme may be modified to support QoS. As an example, a scheme in which the power level is alternated may extend or reduce the time left on a current phase in order to transmit data with higher priority data on a higher power level. Thus, a time frame for each scheme may be set initially through consideration of power budgets as described above, but the timing of each phase may be modified based upon QoS data and expected bandwidth needed for the QoS data. In some examples, QoS approaches may wholly dictate the power level of the streams such that the stream with the highest priority data is selected to transmit at the highest power level. In other examples, a QoS of the data may be a factor in the selection and/or modification of a power level assignment scheme.

Other characteristics may be utilized to select or modify a power level assignment scheme. For example, the heat budget may be utilized similarly to the power budget (as heat and power are correlated). For example, a heat budget may be converted to a power budget and used as previously described. Similarly, battery life may be considered such that as the battery life of the device gets lower, the proportion of time spent transmitting at a high-power level may be reduced. For example, if the battery level reported by a transmitter goes lower than a first threshold, then a time duration of a phase in which that transmitter activates the light source at the higher power level may be reduced (e.g., either by a static predetermined amount, or by a predetermined amount based upon the remaining battery life, or by some other calculation that uses the remaining battery life). In some examples, if the other participants are also low on battery power, blank periods may be inserted into the power level assignment scheme where none of the transmitters transmits.

Other factors such as expected bandwidth requirements and data rate may be utilized similar to QoS requirements in that they modify the phase timing. For example, in order to achieve a particular data rate, the system may allocate additional time for a device at the highest power level in order to ensure that errors that may be caused by transmitting at a lower power rate do not lower the data rate. The particular data rate of one device may be balanced against competing data rates of other devices. For example, if both transmitters request a highest data rate, the system may not favor one device. On the other hand, if one transmitter requests a higher data rate than the other, the device requesting the higher data rate may receive additional time transmitting at the higher power level. In still other examples, the system may dedicate a particular phase exclusively to a particular transmitter and instruct the transmitter to use an amplitude modulation on that phase.

In some examples, a plurality of the described factors may be utilized in combination by an algorithm to select a power level assignment schemes from a set of power level assignment schemes. Example selection algorithms may include machine learning algorithms, a plurality of if-then-statements, a decision tree, a random forest algorithm, and the like. Machine learning algorithms may be trained with feature data corresponding to the above-mentioned factors and labeled (e.g., manually labeled) with an appropriate power level assignment scheme. An example machine learning system is given in FIG. 14. The power level assignment schemes may be configurable such that a duration of each phase may change based upon the above-mentioned factors.

In an example selection algorithm, each possible power level assignment scheme of a plurality of schemes may be scored based upon how closely the power level assignment scheme matches the characteristics of the communicating devices (e.g., transmitters and the receiver). For example, for each characteristic used, a subscore may be generated. The scores may be calculated by one or more of the transmitters, by the receiver, or the like.

The score for a particular power level assignment scheme may be the summation of the subscores. For example, for a subscore corresponding to a power budget, the system may determine how well the particular power level assignment scheme matches the power budgets of the transmitters (with or without modifications as described above). As one example, the score may be based upon a difference between the value calculated on the left side of equations 1 and 2 and the power level budgets on the right side of the equations. As this difference grows, the fit between the transmitting devices and the power level assignment scheme is less desirable. In some examples, a predetermined number of points may be assigned to this subscore and the difference between the left and right sides of both equations 1 and 2 may be subtracted from this amount.

As another example, points may be assigned based upon an anticipated QoS of the data to be transmitted and how well the particular power level assignment scheme fits that QoS classes for both transmitters. These points may be determined by consulting a table that matches power level assignment schemes with point values for various QoS classes. Each transmitter's point value for its expected QoS class (as determined by the table) may be summed to produce the QoS subscore. Similarly, anticipated or desired data rates may be evaluated against potential power level assignment schemes—again, using a table with a point values for each power level assignment scheme and each desired data rate. Likewise, a battery level of a device corresponding to one or more transmitters may be factored in. Power level assignment schemes may be rated based upon their power consumption (with higher ratings for more power consumption). Transmitting devices may be rated based upon their battery life left (with higher ratings denoting more battery power left). The subscore for the battery level may be the power level assignment scheme power consumption rating minus the battery life rating for each transmitter. These subscores may be summed to produce a final score for each power level assignment scheme.

The power level assignment scheme may then be chosen based upon these scores. For example, the power level assignment scheme with the highest score may be chosen. In some examples, the various subscores may be weighted. The weights may be determined manually by an administrator of the system or may be learned using one or more machine learning algorithms as detailed with respect to FIG. 6 and the discussion below.

Power level assignment schemes may be determined before data transmission and may be changed in response to the addition of a new data stream (either adding a light source, or adding a stream to be transmitted with a light source), the changing of one or more characteristics of the stream and/or light source, degradation of the light source over time, and the like. For example, scores of the power level assignment scheme may be calculated periodically based upon updated characteristic information. If a different power level assignment scheme scores more than a threshold score higher than the current power level assignment scheme, the power level assignment scheme may be changed. In some examples, the scheme is periodically changed as a matter of course.

Figure 4:
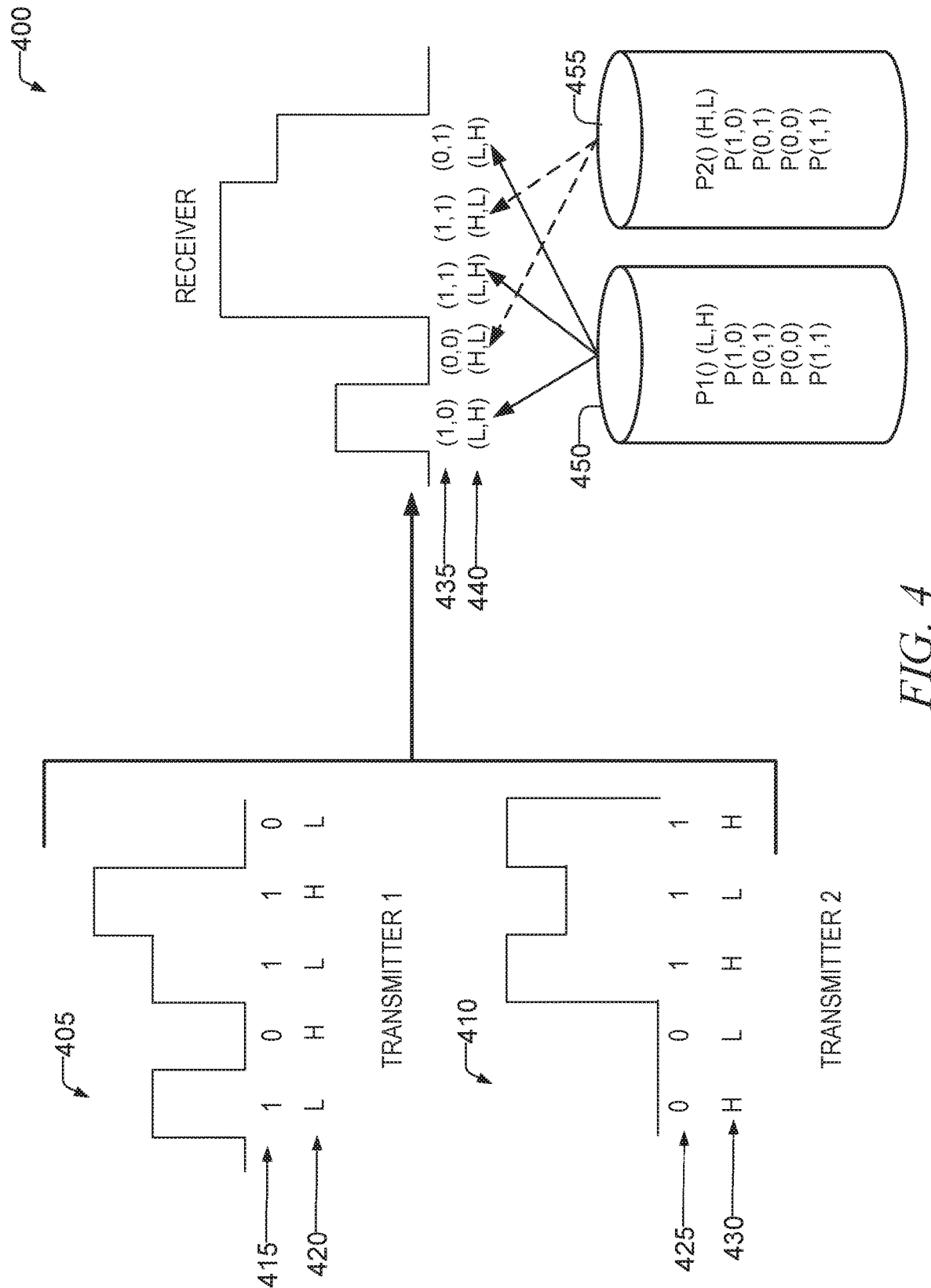
FIG. 4 shows a schematic of an example power level assignment scheme according to some examples of the present disclosure.

FIG. 4 shows a schematic 400 of an example power level assignment scheme according to some examples of the present disclosure. A first transmitter 405 and a second transmitter 410 are shown, with each transmitter comprising a light source. First transmitter and second transmitters may be on a same device (e.g., different streams on a same device) or different devices. In some examples, transmitters 405 and 410 are example transmitters 1205 and 1250 of FIG. 12. A power level assignment scheme with power level assignments 420 is shown for the first transmitter 405 along with power level assignments 430 for the second transmitter 410. Shown in FIG. 4, the power level assignment scheme has two repeating phases. A first phase where the first transmitter activates its light source using a low power and the second transmitter activates its light source using a high power. A second phase where the first transmitter activates its light source using a high power and the second transmitter activates its light source using low power. The first and second phases then repeat in an alternating fashion for each bit. While two power levels are shown ('L' for low and 'H' for high), more than two power levels may be utilized in a given power level assignment scheme. In FIG. 4, the power level assignment scheme assigns each transmitter alternating power levels. That is, when one transmitter is transmitting on high, the other is transmitting on low. Furthermore, in FIG. 4, the power level changes with each bit—that is, the phases change with each bit—but in other examples, the power level assignment scheme may change power levels (phases) after a number of bits, a defined period of time, or the like.

Example bit streams 415 and 425 are shown along with a sample of a graph of the power level of the light source (y-axis) over time (x-axis) for each bit transmitted by each transmitter. For example, the first bit with a value of '1' is transmitted at a low power level by the first transmitter. By turning off the light source, second transmitter transmits a '0'. This is detected by the receiver who is aware of the power level assignment scheme and the current phase of the power level assignment scheme. As shown in the figure, at the receiver side, the power level assignment scheme is represented at 440 for each phase by a tuple with the first item being a power assigned to the first transmitter and the second item being the power level assigned to the second transmitter, So, the first bit is (L,H) to signify that the first transmitter would transmit a '1' at a low power level and the second transmitter would transmit a '1' at the high power level.

The receiver counts the number of photons received during the period that a first bit is transmitted (e.g., a first timeslot). The graph shows the number of photons detected (y-axis) over time (x-axis) for each timeslot. The receiver then chooses a detection model set 450 or 455 based upon the current phase. In the example shown in FIG. 4, each phase corresponds to a different timeslot. Model sets 450 and 455 include multiple detection models. With respect to the first detection period, since the phase is (L,H) the detection model set 450 is chosen as that set of models corresponds to the (L,H) phase of the power level assignment scheme. Matching the detection models to a phase of a power level assignment scheme may increase detection accuracy as different transmitters may have slightly different power levels. Thus, a high-power level for the first transmitter 405 may be slightly different than the high-power level for the second transmitter 410—even if a low power level may be similar. In the example shown, the photon counts have a highest probability of being a '1' for the first stream and '0' for the second stream according to the detection models, (1,0) is assigned—where '1' is for the first stream and '0' is for the second stream.

At the second bit, the power level assignments reverse, however no hit is transmitted by either transmitter, so the receiver determines that the bit assignments should be (0,0) by using the set of detection model 455. In some examples, rather than using a particular detection model, if the photon count is below a determined threshold, then the bit stream assignments may be set at (0,0). The power level assignments revert back to the first phase at the third bit. This time, both light sources are on and the receiver utilizes the detection models 450 to determine that the bit assignments should be (1,1). This continues until communication ceases. The bit assignments for the streams are shown at 435 with stream 1 listed before stream 2.

Note that the first and second transmitters may be time synchronized. This may be accomplished through a variety of mechanisms, such as a Network Time Protocol (NTP), a Precision Time Protocol (PTP), a Reference Broadcast Time Synchronization, or the like. In some examples, the receiver may act as the time server.

Figure 5:
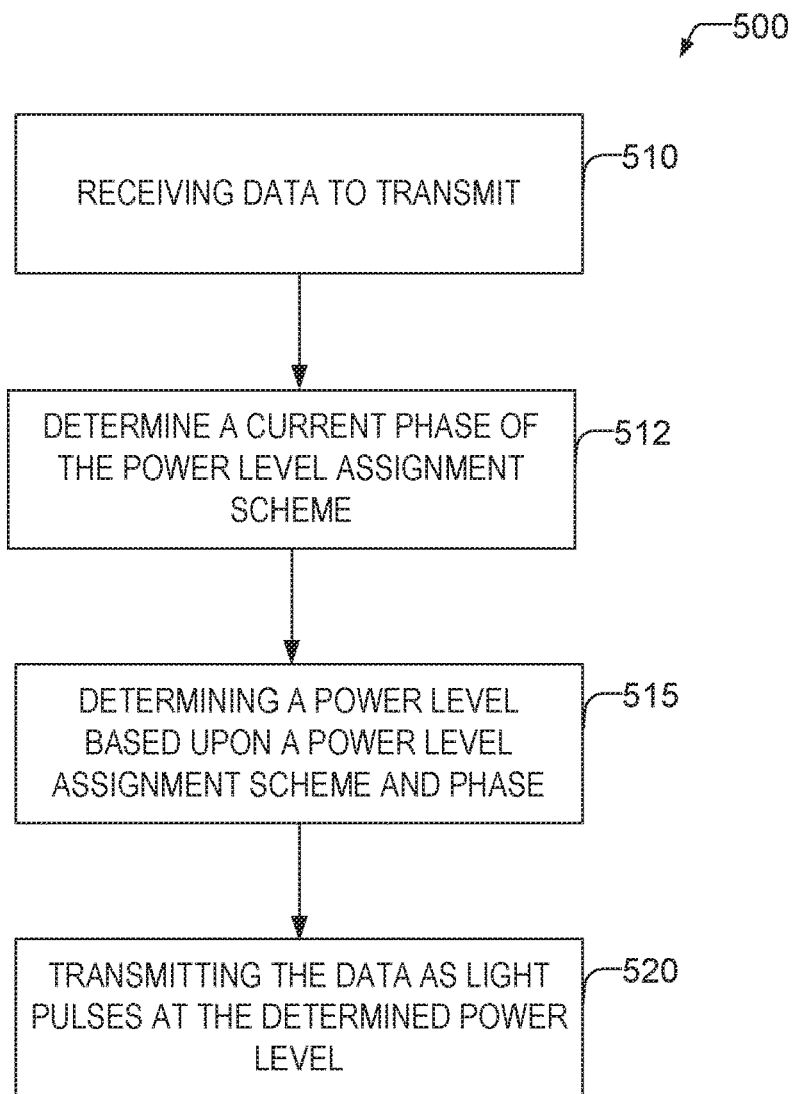
FIG. 5 illustrates a flowchart of a method of a transmitter implementing a power level assignment scheme according to some examples of the present disclosure.
Figure 6:
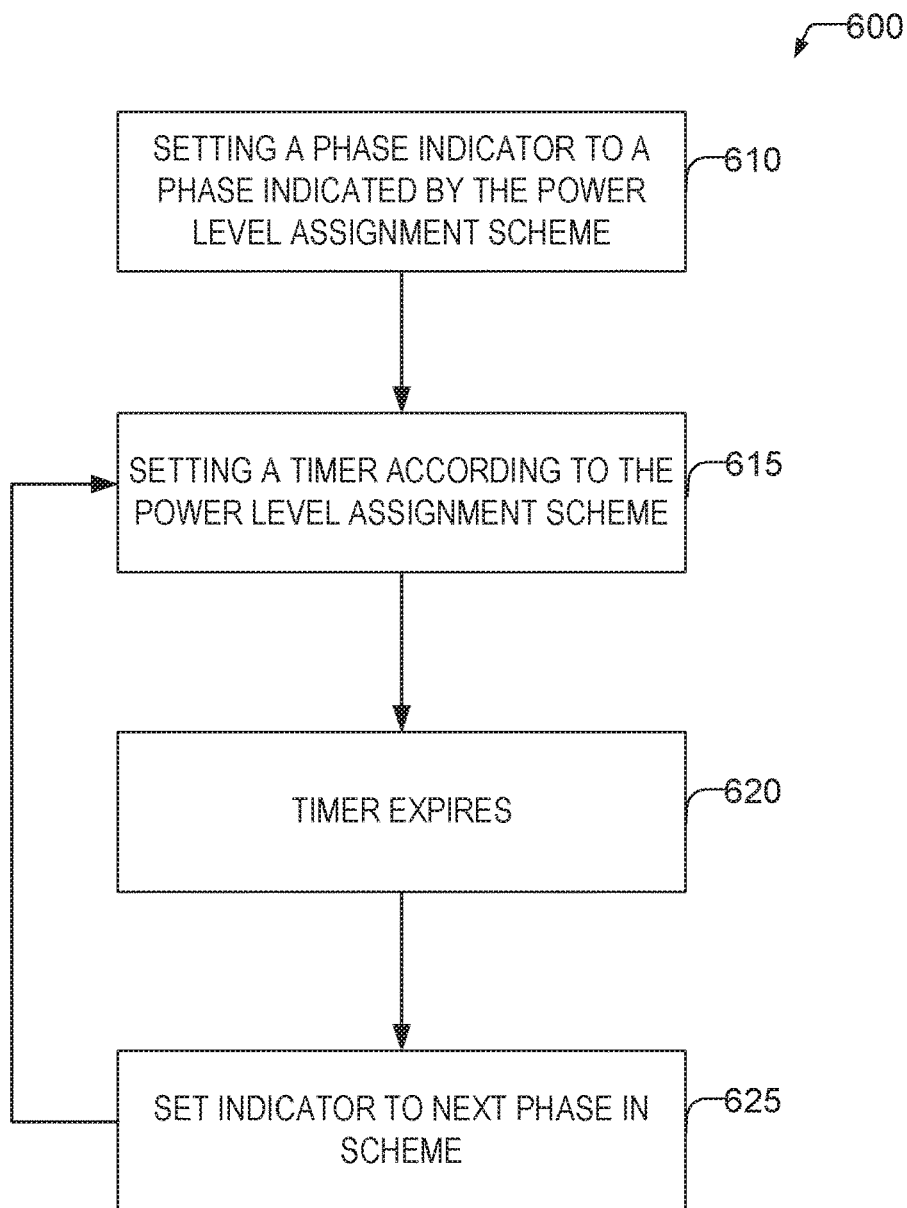
FIG. 6 illustrates a flowchart of an example method of tracking a phase according to a power level assignment scheme that is timing based according to some examples of the present disclosure.
Figure 7:
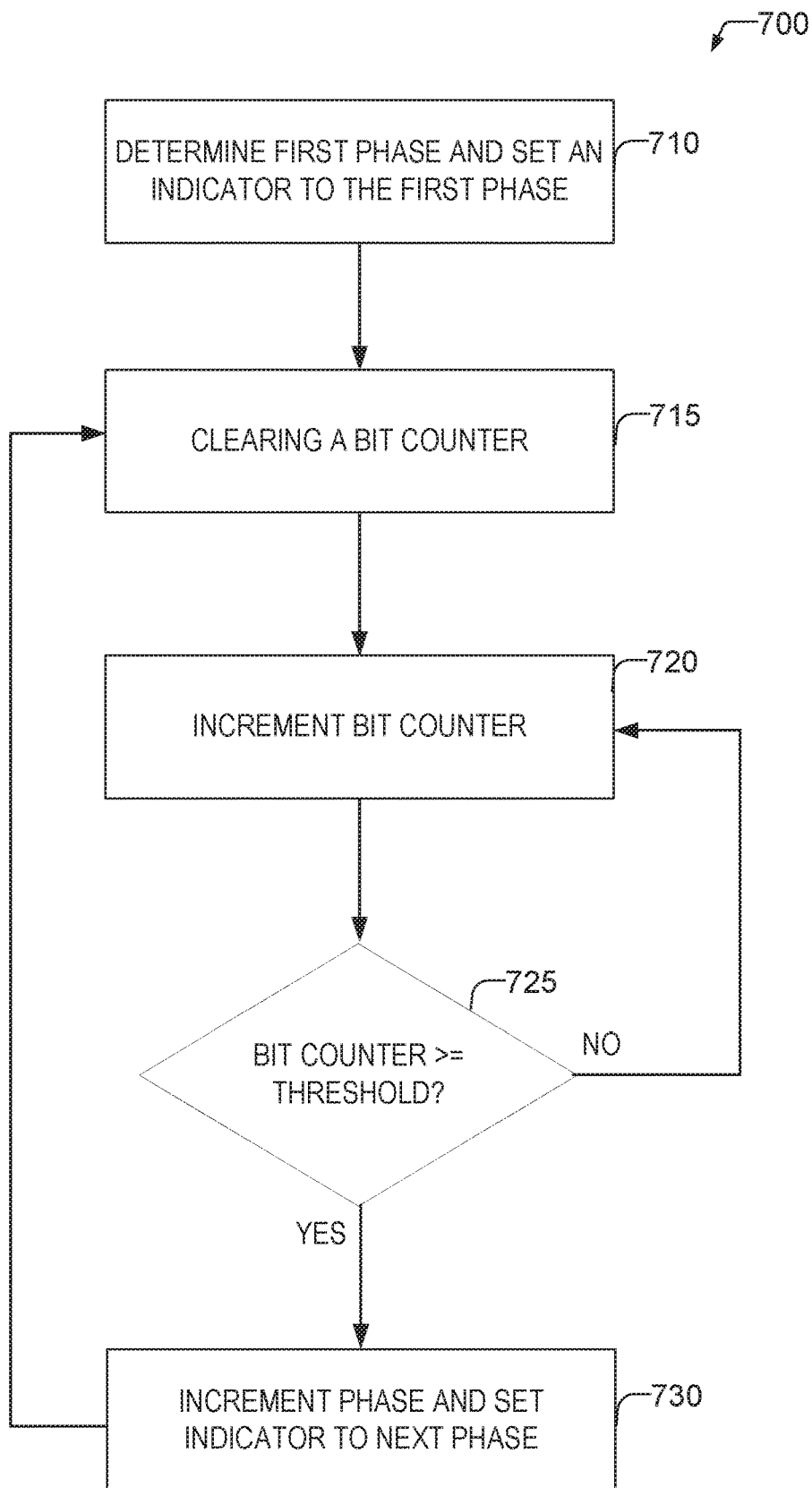
FIG. 7 illustrates an example method of tracking a phase according to a power level assignment scheme that is bit-count based according to some examples of the present disclosure.

FIG. 5 illustrates a flowchart of a method 500 of a transmitter implementing a power level assignment scheme according to some examples of the present disclosure. Prior to the operations of FIG. 5, the transmitter may identify or determine the current power level assignment scheme. At operation 510 the transmitter may receive data to transmit from a data stream. For example, a data stream from a higher layer in a network protocol stack. In some examples, the transmitter may be in a device that has a higher layer that splits a single data stream to multiple data streams for simultaneous transmission in examples where a same device has multiple light sources. At operation 512, the transmitter may determine the current phase of the power level assignment scheme. The process for determining the phase depends on the power level assignment scheme. For example, if the power level assignment scheme is based upon a timer—e.g., each phase lasts a predetermined period of time, then a timer value may be used to determine the phase. In some examples, the timer value may be a multiple of a timeslot length. FIG. 6 illustrates a flowchart (discussed in more detail below) of a method 600 of tracking a phase according to a power level assignment scheme that is timing based according to some examples of the present disclosure. If the power level assignment scheme is based upon a bit count (e.g., each phase lasts a predetermined amount of bits that are transmitted), then the phase may be determined based upon the bit count that has elapsed since the last change. FIG. 7 illustrates an example of tracking a phase (discussed in more detail below) according to a power level assignment scheme that is based upon a bit number according to some examples of the present disclosure.

In examples in which the phase is based upon a QoS, the phase may be determined by a stream having data to be transmitted having the highest QoS value. For example, every predetermined period of time, the transmitters may communicate their respective QoS values of data in their transmission queues to each other and the receiver—either through the fiber or out-of-band through another communication mechanism. The transmitter with the highest QoS data activates its light source at the highest power level, and the power level assignment scheme is advanced to the phase corresponding to that transmitter transmitting at the highest power level. In other examples, a phase may be accelerated or changed based upon QoS properties, but otherwise determined by the other described mechanisms (e.g., time or bit count).

With reference back to FIG. 5, at operation 515, the transmitter may determine a power level based upon a selected power level assignment scheme and the determined phase. At operation 520, the transmitter may transmit the data as light pulses at the determined power level by turning the light source on or off. The light source, if turned on, is turned on at the determined power level. In some examples, rather than turning the light source on or off, the transmitter may remove an obstruction that blocked the light produced by the light source from entering the fiber optic fiber (or other medium) or otherwise directing an already activated light to the fiber (e.g., moving a mirror to direct the light).

FIG. 6 illustrates an example method 600 of tracking a phase according to a power level assignment scheme that is timing based according to some examples of the present disclosure. At operation 610, the system determines an initial phase based upon the power level assignment scheme. For example, a first transmitter may be assigned a particular power level at a first phase and a second transmitter may be assigned a different power level at a first phase. In some examples, the transmitters may be assigned a first phase by the receiver or by agreement between the transmitters, but in other examples a contention resolution method is utilized. For example, each transmitter may generate a random number, or have a random number programmed onto it. The transmitters may exchange the random numbers and the lowest (or highest depending on the implementation) number utilizes the high-power level for the first phase. An indicator may be set to indicate the power level and the current phase in memory of the transmitter.

At operation 615, a timer may be set based upon the phase timing specified in the power level assignment scheme. In some examples, each phase may be the same time duration, but in other examples, two phases may differ in duration. In still other examples, phases may be variable duration depending on one or more events, factors, or characteristics (e.g., of the device, the transmitter, the light source, the data stream, or the like). At operation 620, the timer expires. At operation 625, the indicator is set to the next phase and/or power level based upon the power level assignment scheme. In power level assignment schemes that are time based, the operations of 512 of FIG. 5 may comprise reading the phase indicator.

FIG. 7 illustrates an example method 700 of tracking a phase according to a power level assignment scheme that is bit-count based according to some examples of the present disclosure. At operation 710, the system determines an initial phase based upon the power level assignment scheme and sets an indicator to indicate this initial phase. This may be done using the method described for operation 610 of FIG. 6. At operation 715, a bit counter may be set to zero to clear it. At operation 720 the bit counter is incremented when a bit is communicated (either a '1' or a '0'). For example, when a predetermined period of time (timeslot) elapses. In some examples, a bit is communicated either when the light source is turned on to send a '1' or kept off to send a '0'. In other examples, the bit counter may count only when the light source is turned on Examples in which the bit counter counts only when the light source is turned on may be utilized when a transmitter wishes to keep a power usage under a power budget. At operation 725 a comparison is made between a bit counter and a threshold. If the bit counter is greater than, or equal to the threshold, then at operation 730, the phase is incremented, the indicator is updated, and operation proceeds to operation 715 where the bit counter is reset. If at operation 725, the bit counter is not over than, or equal to, the threshold, then the bit counter continues being incremented as bits are transmitted at operation 720. FIG. 7 illustrated a bit counter, but other data sizes may be utilized such as bytes, kilobytes, megabytes, gigabytes, terabytes, and the like.

Figure 8:
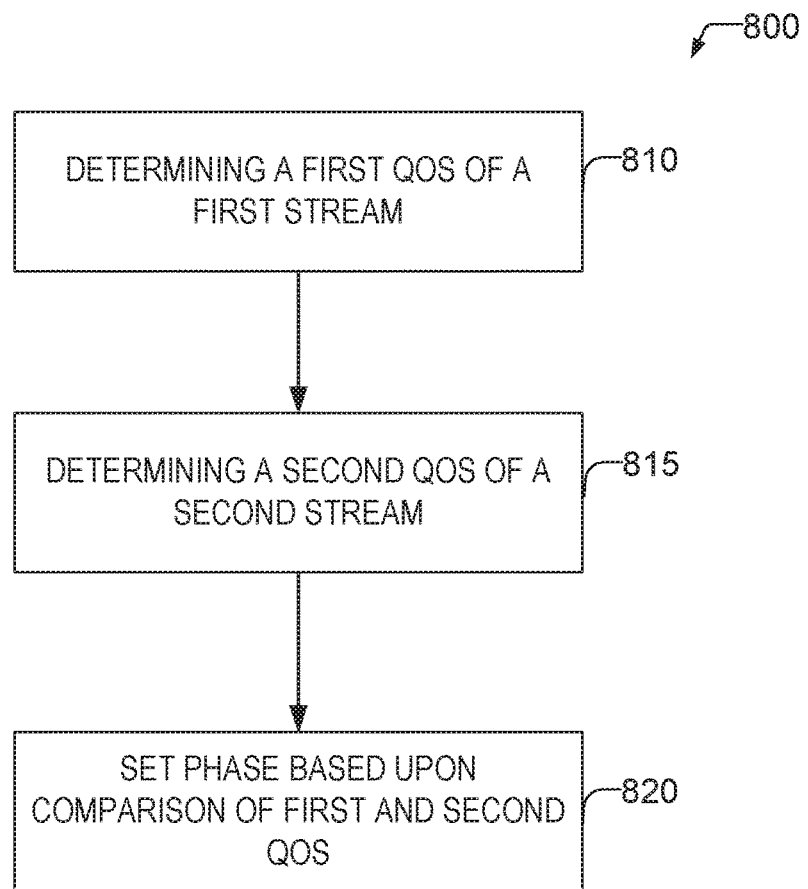
FIG. 8 illustrates an example method of tracking a phase according to a power level assignment scheme that is QoS based according to some examples of the present disclosure.

FIG. 8 illustrates an example method 800 of tracking a phase according to a power level assignment scheme that is QoS based according to some examples of the present disclosure. At operation 810 the system determines a QoS indicator of data of a first stream assigned to a first transmitter. The data may be a packet, a portion of a packet, a plurality of packets, or the like. For example, a communications application may be sending streams of communication data that may have an associated QoS level. The QoS level may be determined by messaging from a higher level of a network stack, an indicator in the packet (e.g., a packet header), or the like.

At operation 815 the system determines a QoS of data of a second stream assigned to a second transmitter. The data may be a packet, a portion of a packet, a plurality of packets, or the like. For example, a communications application may be sending streams of communication data that may have an associated QoS level. The QoS level may be determined by messaging from a higher level of a network stack, an indicator in the packet (e.g., a packet header), or the like.

At operation 820, the phase may be set based upon a comparison of the first and second QoS values. For example, a phase may be selected where the stream with the highest QoS may have a highest power level assigned. In other examples, where more than two streams are utilized and more than two QoS levels are determined, the highest power level may be assigned to a highest QoS, a second highest power level may be assigned to a second highest QoS, and so on. In case of a tie between QoS levels, the system may have the transmitters alternate transmitting at a high power level.

While the above-mentioned example power level assignment schemes utilized a single power level per phase for each transmitter, in other examples, a plurality of power levels may be grouped into a plurality of power level groups. For example, a highest power group of power levels, a middle power group that has power levels that are lower than those in the highest power group, and a low power group that has power levels that are lower than those in the middle power group. Each transmitter may be assigned to different power groups (e.g., based upon the QoS data) and may transmit using any of those power levels in the group. In some examples, the groups may be useful in utilizing amplitude modulation on top of the techniques disclosed in the present invention. In other examples, within the power group, the power level assignment scheme may be defined that specifies a power level for the transmitter at a particular timer and/or bit count within that power level grouping.

Once a phase based upon a QoS level is set, the power levels may be maintained indefinitely, until the QoS of the data changes, until a predetermined period of time has elapsed (at which point method 800 may be repeated), until a predetermined amount of data has been sent (at which point method 800 may be repeated), and the like.

Creating the Detection Models

Each light source may differ in an amount of photons given out as a result of manufacturing variances and because real-world conditions (such as distance between the transmitter and receiver, fiber quality, bends in the fiber, and the like) may affect the number of photons hitting a receiver. Accordingly, the receiver may employ a training process to build detection models that are customized according to the system. The training procedure may comprise a series of one or more steps where test bits of data are sent at one or more power levels by one or more of the transmitters alone or in combination with each other. For example, for a two-transmitter system running a power level assignment scheme with two alternating power levels, the receiver may instruct each transmitter to activate their light sources at each power level separately and then at each power level together over the optical communication path at a same frequency. The photons received for each test may be counted and used to build a detection model, such as a Poisson distribution model. In other examples, other models, such as a machine-learning model may be built using the photon counts and labels corresponding to the light source producing the photon counts (and thus the bit assignments). In order to coordinate the training, the transmitters may be synchronized—e.g., through the use of in-band (through the fiber optic) or out-of-band (through another network) communications.

As noted, the model training process may utilize photon counts detected by the photon detector at the receiver to train the detection models to produce probabilities of one or more particular bit combinations. For example, the system may instruct the transmitters to activate their light sources—alone or in combination—for each particular combination of power level and bit combination (and in some cases, multiple times). Thus, for example, for a system with two transmitters and a simple power level assignment scheme that alternates each transmitter between two power levels the possible (bit, power level) combinations are given by Table 1:

TABLE 1

| Stream 1 Bit | Stream 1 Power | Stream 2 Bit | Stream 2 Power |
|---|---|---|---|
| 0 | High | 0 | Low |
| 0 | High | 1 | Low |
| 1 | High | 0 | Low |
| 1 | High | 1 | Low |
| 0 | Low | 0 | High |
| 0 | Low | 1 | High |
| 1 | Low | 0 | High |
| 1 | Low | 1 | High |

In table 1, the first four rows correspond to a first phase of a power level assignment scheme and the second four rows correspond to a second phase of the power level assignment scheme. The receiver may calculate a separate detection model for each possibility shown above. For example, if the detection models are Poisson distributions, the system may instruct the transmitters to activate their light sources according to each combination (e.g., according to the modulation scheme to produce the indicated bit) and calculate an average number of photons for the bit and power level combination (e.g., each row of Table 1).

Thus, for example, the system may have the light source for the first bit stream transmit a '1' by activating its light source at high power alone. The photon counts observed at the receiver during this period may be used to calculate a detection model for a bit combination of (1,0) for a first phase. The system may also instruct the light source of the first bit stream and the second bit stream to transmit a by activating their light sources at their respective assigned power levels together. The photon counts observed at the receiver during this period may be used to calculate a detection model for a bit combination of (1,1) for the first phase. Next, the system may instruct the light source of the second bit stream to transmit a '1' by activating its light source at a low power (without the light source of the first bit stream being activated). The photon counts observed at the receiver during this period may be used to calculate a detection model for the bit combination of (0,1). This process is repeated for the second phase where photon counts are observed for the bit combinations and power levels for rows 5-8 of table 1.

In some examples, a single measurement of photon counts is taken for each of the combinations of transmitter and power level, but in other examples, multiple measurements are taken and an average is calculated. As noted, one example detection model is a Poisson distribution. One example, Poisson detection model is:

$$P(\text{photon counts } t) = e^{-\lambda}\frac{\lambda^t}{t!}$$

Where $\lambda$ is the average number of photons calculated in the training procedure, and t is the observed photons at the photon detector.

Instead of Poisson models, in other examples, other machine learning models may be utilized and calculated. These are explained in more detail in FIG. 14. As noted, in some examples training data—and the model created from that training data—may be specific to a particular power level scheme phase. In other examples, negative training data that corresponds to power levels and/or bit combinations corresponding to an out-of-phase assignment may be utilized to train the machine learning model of characteristics of an invalid photon count. That is, the machine-learning model may recognize and correct for out-of-phase operation.

Figure 9:
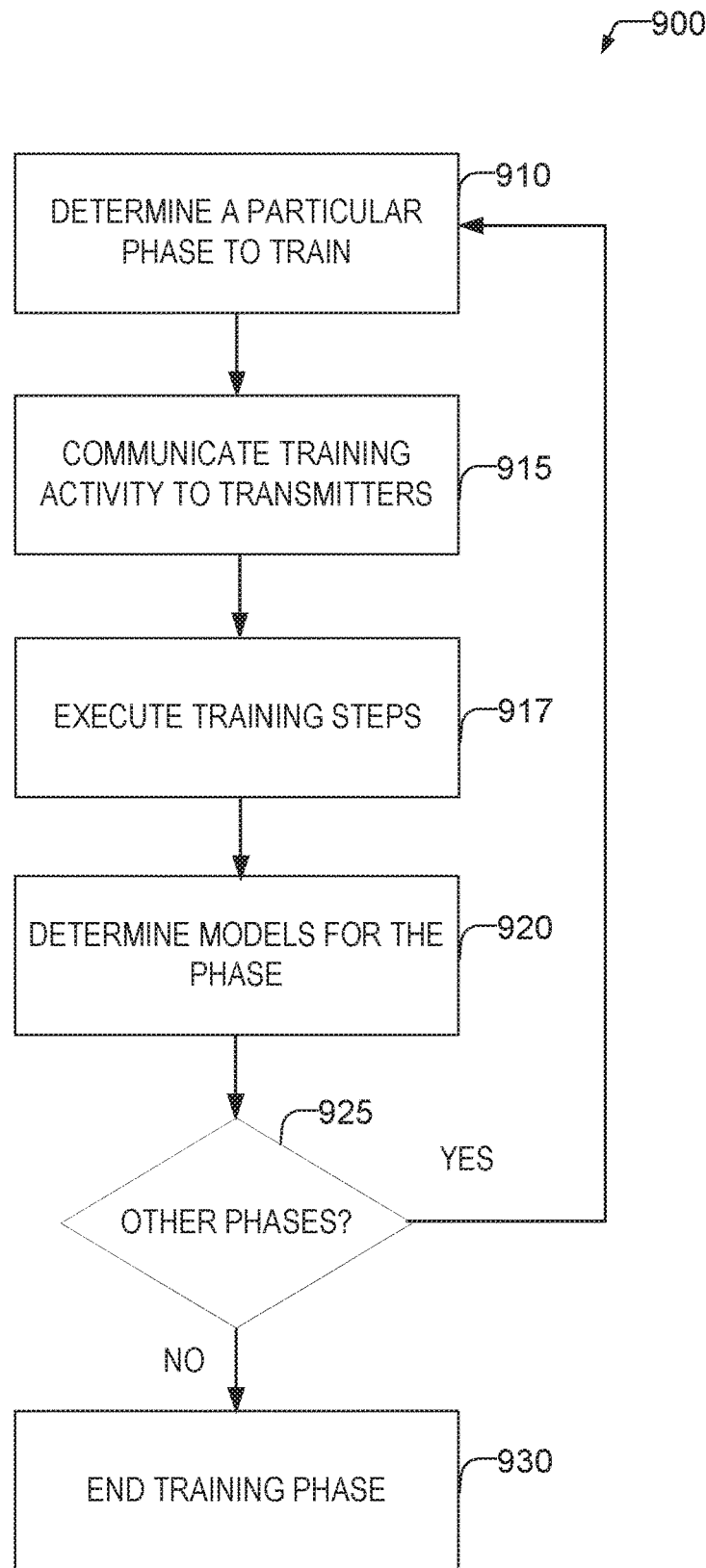
FIG. 9 illustrates a flowchart of a method of training a detection model according to some examples of the present disclosure.

FIG. 9 illustrates a flowchart of a method 900 of training a detection model according to some examples of the present disclosure. In some examples, the detection model may simply be an average number of photons observed that may be utilized in a mathematical formula (the formula may or may not be considered as part of the detection model) such as a Poisson distribution. In other examples, the detection models may be more complicated data structures, such as neuron weightings for neural networks, and the like.

At operation 910, the receiver may determine a particular phase to train of a power level assignment scheme. For example, in a power level assignment scheme with two phases, a first phase may be chosen for training first and then a second phase may be trained after the first phase. In examples in which power levels are fixed, this step may not be performed.

At operation 915, instructions are communicated to the receivers. Instructions may include what phase to utilize, what power levels to activate the light source at (which may be communicated by indicating the phase in cases where there is a power level assignment scheme), whether to activate the light source, how long to activate the light source for, any particular bit sequence to use, and the like. In some examples, the transmitter may be instructed to activate the light source multiple times over a predetermined period of time to allow for the receiver to take multiple measurements to produce an average photon count. The instructions sent by the receiver may instruct the receivers for each step—that is, during a first time frame a first transmitter will activate its light source at the first power level, during a second time frame a second transmitter will activate its light source at the second power level, and during a third time frame, both transmitters will activate their light sources at their respective assigned power levels.

At operation 917 the training step may be executed. At operation 917, the transmitters may activate or not activate at one or more power levels according to the instructions sent at operation 915. In some examples, rather than send the instructions at once, each training step may be proceeded by instructions. At operation 917, the receiver may also determine photon counts for each bit combination in the determined phase. For example, a first photon count (or average photon count in the case of multiple measurements) at the first-time frame corresponding to a first power level of a first transmitter, a second photon count (or average photon count in the case of multiple measurements) at the second time frame corresponding to a second power level of a second transmitter, a third photon count at the third time frame (or average photon count in the case of multiple measurements), corresponding to a third power level produced by both the first second transmitters activating their light sources at the respective first and second power levels.

At operation 920 the receiver may determine the models for the particular phase based upon the collected photon counts or average photon counts. Each model may correspond to a particular light source activated at a particular power level and thus may correspond to a particular bit assignment. At operation 925 a determination may be made whether any other phases are present. If so, then operations 910-920 are repeated for the other phases. If no other phases are present, then the training phase may end at operation 930. Once the training phase ends, the transmitters may send data to the receiver. The end of the training phase may be signaled by the receiver using a message, after a passage of a predetermined time (e.g., as indicated by the instructions communicated at operation 915), or the like.

Figure 10:
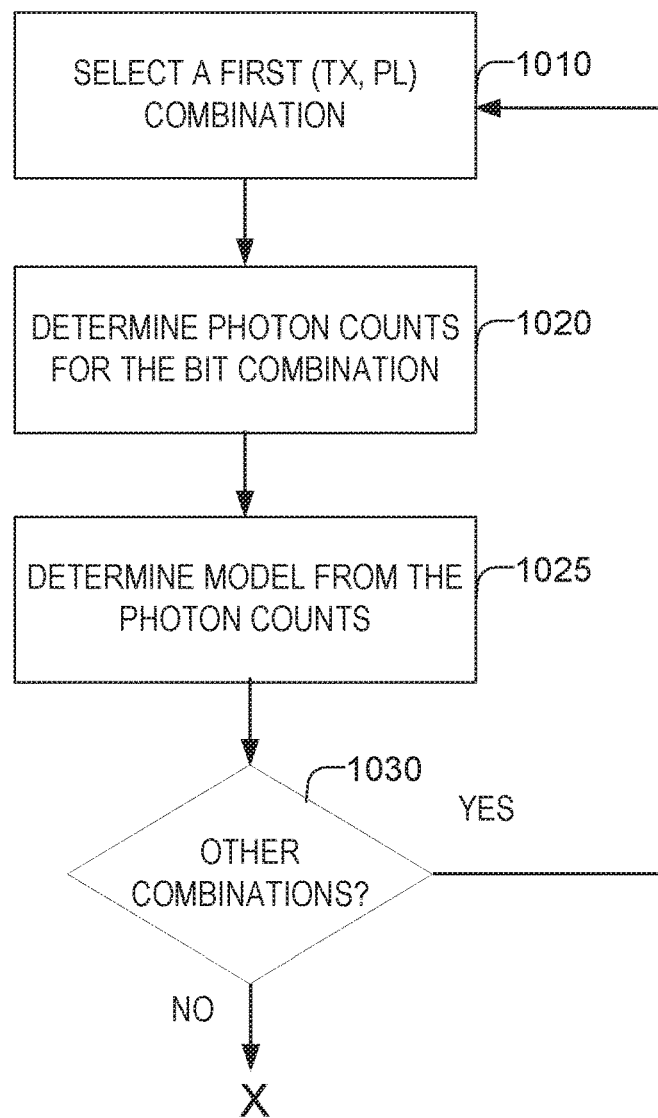
FIG. 10 illustrates a flowchart of a method of executing training steps and determining models according to some examples of the present disclosure.

FIG. 10 illustrates a flowchart of a method 1000 of executing training steps and determining models according to some examples of the present disclosure. Method 1000 may be an example of operations 917 and 920 according to some examples. At operation 1010 a first (transmitter, power level) combination is selected—e.g., from a table such as table 1. This corresponds to a bit assignment as noted previously. The set of (power level, transmitter) tuples may be dependent on the power level assignment scheme and the order in which they are trained may be given by instructions sent by the receiver—e.g., at operation 915. Those instructions may also specify a time to turn a light source on and off and at what power. In other examples, the tuple may be communicated to the transmitters along with an instruction to activate the light source prior to the time period for activating the light source (e.g., between operations 1010 and 1020). At operation 1025, photon counts may be determined. In some examples, this may be an average photon count. This average is used to build the model (or may be the model or a portion of the model). At operation 1030, the receiver may determine if any other combinations are left to be trained, and if so, then operations 1010-1030 are repeated for those combinations. If not, then the method ends.

Figure 11:
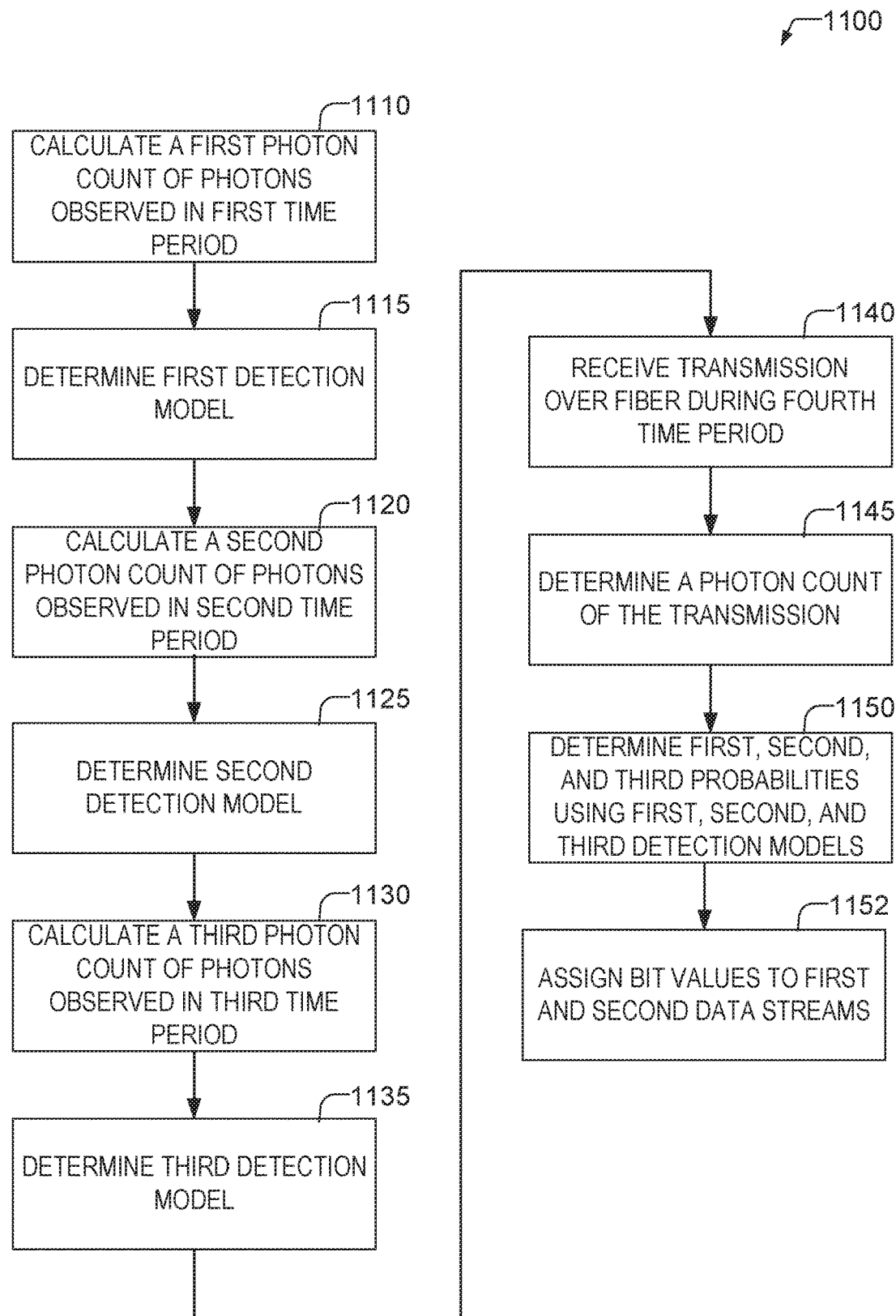
FIG. 11 illustrates a flowchart of a method showing a more specific implementation of the method of FIG. 10.

FIG. 11 illustrates a flowchart of a method 1100 showing a more specific implementation of method 1000. The method 1100 may be an implementation of operations 917 and 920 from FIG. 9. The method 1100 is a method of training that may be applied to a single phase of a power managements scheme in which there are two transmitters with two power levels. Additional operations may be performed for more transmitters. The process of FIG. 11 may be repeated for additional phases. Additionally, operations 1140-1152 show the subsequent usage of the trained detection models according to some examples of the present disclosure.

At operation 1110, the receiver calculates a first photon count of photons observed during a first-time period where a first light source is activated at a first power level on a first wavelength over a fiber and a second light source is not activated. In some examples, the receiver, or another device, instructs the first light source to activate prior to, or at the beginning of the first-time period. Likewise, the second transmitter may be instructed not to activate prior to, or at the beginning of the first-time period. In some examples, the photon count is an average photon count.

At operation 1115, the receiver determines a first detection model from the first photon count, the first detection model producing an inference for whether a given photon count indicates that the first light source is activated at the first power level and the second light source is not activated. For example, the detection model may be a Poisson distribution that may produce a probability that a particular photon count was produced by the first light source at the first power (where the second light source is not activated). In other examples, the detection model may be a machine-learning model as noted previously. The output of the machine learning model may be a probability, a yes-no answer, a confidence value, or the like.

At operation 1120, the receiver calculates a second photon count of photons observed during a second-time period where the second light source activates (turns on) at a second power level on the first wavelength over the fiber and the first light source does not activate. As with the first-time period, in some examples, the receiver, or another device, instructs the second light source to activate prior to, or at the beginning of the second time period. Likewise, the first transmitter may be instructed not to activate prior to, or at the beginning of the second time period. In some examples, the photon count is an average photon count.

At operation 1125, the receiver determines a second detection model from the second photon count, the second detection model producing an inference for whether a given photon count indicates that the second light source is activated at the second power level and the first light source is not activated. For example, the detection model may be a Poisson distribution that may produce a probability that a particular photon count was produced by the second light source at the second power (where the first light source is not activated). In other examples, the detection model may be a machine-learning model as noted previously. The output of the machine learning model may be a probability, a yes-no answer, a confidence value, or the like. The type of model used for the first detection model may be a same type of model used for the second detection model, or a different type of model.

At operation 1130, the receiver calculates a third photon count of photons observed during a third-time period where the first light source activates at the first power level and the second light source activates at the second power level. Both the first and second light sources activate on the first wavelength over the fiber. As with the first and second time periods, in some examples, the receiver, or another device, instructs the first and second light sources to activate prior to, or at the beginning of the second time period. In some examples, the photon count is an average photon count.

At operation 1135, the receiver determines a third detection model from the third photon count, the third detection model producing an inference for whether a given photon count indicates that both the first and second light sources are activated at the first and second power levels, respectively. For example, the detection model may be a Poisson distribution that may produce a probability that a particular photon count was produced by the first light source at the first power and the second light source at the second power. In other examples, the detection model may be a machine-learning model as noted previously. The output of the machine learning model may be a probability, a yes-no answer, a confidence value, or the like. The type of model used for the first detection model, second detection model, and third detection model may be a same type of model, or a different type of model.

While operations 1110-1135 are described in connection with a simple modulation scheme where a light source being activated during the time slot indicates a '1' and a light source being off during the time slot indicates a '0.' In other examples, the system may train a model based upon other types of modulations. For example, an amplitude modulation may be utilized and the system may train those models as well. In these examples, "activation" of the light source means to transmit a value of '1' according to the selected modulation scheme and turning the light source off means to transmit a value of '0' according to the selected modulation scheme. In some examples, amplitude modulation schemes may combine with the presently disclosed scheme to allow sending multiple bits per stream per timeslot using power level groups. In these examples, the system may learn a model for all possible bit groupings.

Once the models are determined, they may be used to determine bit assignments of streams of bits transmitted by the transmitters. For example, at operation 1140, the receiver may receive, during a fourth-time period, a transmission. The transmission may be received over the optical communication path (e.g., over a fiber optic fiber) at the first wavelength. At operation 1145, the receiver may determine a photon count of the transmission received at operation 1140. At operation 1150, the receiver may determine a first probability that the transmission resulted from activation of the first light source at the first power level using the first detection model, a second probability that the transmission resulted from the second light source activated at the second power level using the second detection model, and a third probability that the transmission resulted from the first and second light source activated together using the third detection model. At operation 1152, the receiver may assign bit values to a first data stream corresponding to the first light source and a second data stream corresponding to the second light source based upon the first, second, and third probabilities, the first and second data streams stored in a memory of a computing device. The data stream may be provided to a higher layer in a network stack (e.g., the method of FIG. 11 may be a physical layer). For example, the receiver may determine a highest probability value. The model that produced the highest probability value may have a corresponding bit value assignment for both the first and second streams. This corresponding bit value may be assigned to the first and second streams.

Example Transmitters and Receiver

Figure 12:
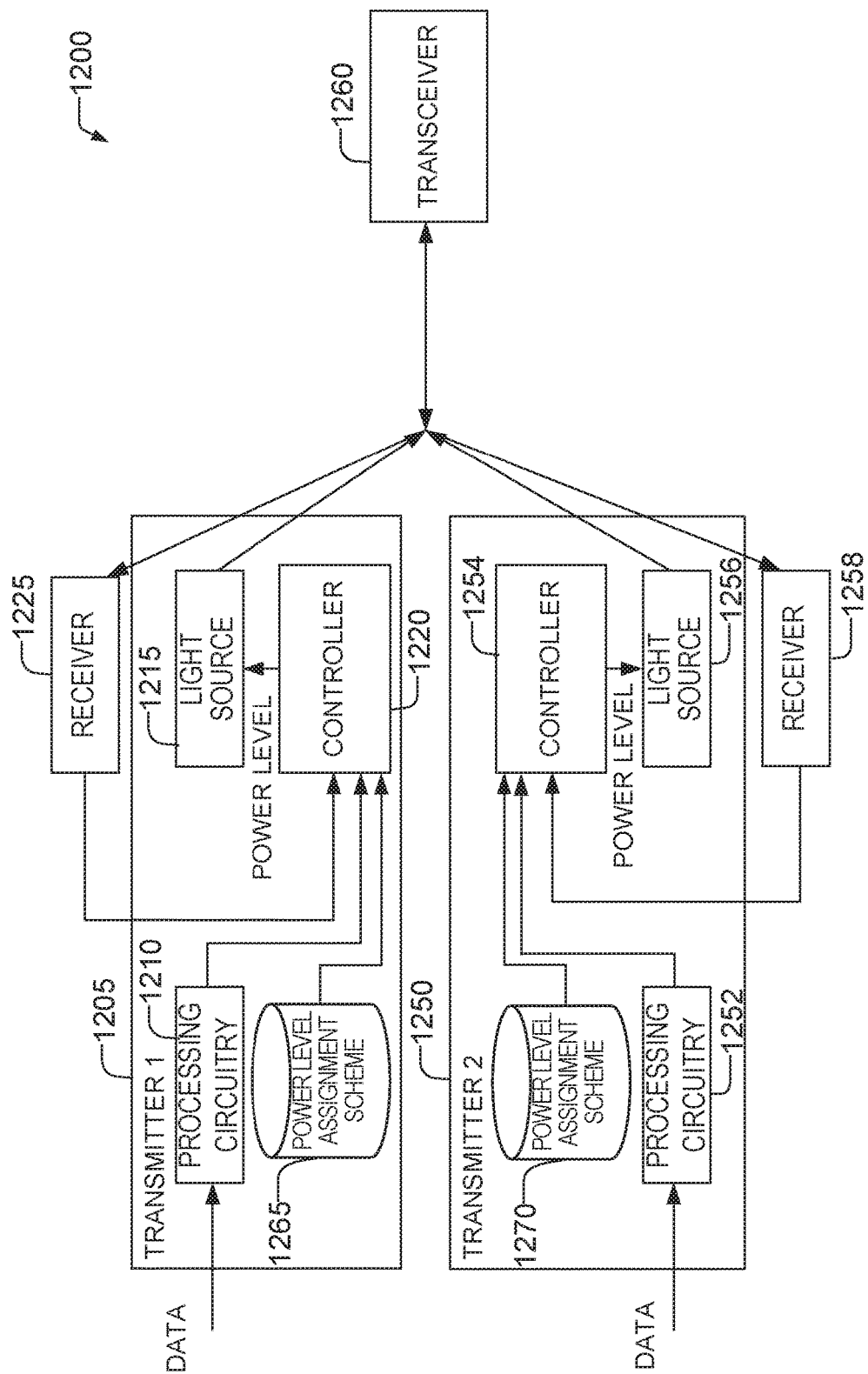
FIG. 12 illustrates a schematic of a system for increasing fiber optic bandwidth according to some examples of the present disclosure.

Turning now to FIG. 12, a schematic of a system 1200 for increasing fiber optic bandwidth is shown according to some examples of the present disclosure. First transmitter 1205 may include processing circuitry 1210 to transform the data stream to prepare it for transmission on the fiber optic fiber. Example operations include error coding, encryption, modulation operations, and the like. The transformed bits are used as a signal to the controller 1220 to instruct the light source 1215 to selectively turn on or off to represent the transformed bit stream according to a modulation scheme. For example, by turning the light source 1215 on in response to a '1' in the bit stream and turn the light source off in response to a '0' in the bit stream. The controller 1220 may set the power of the light source 1215 based upon the power level indicated in the assigned power level assignment scheme and based upon the current phase of the power level assignment scheme. In cases in which modulation schemes that vary power are utilized, the power level may be an average power level over a particular timeslot. The indication of which power level assignment scheme is active and which phase is active may be stored in power level assignment scheme storage 1265.

Light source 1215 transmits light over an optical communication path which may be through a medium such as a fiber optic fiber to a receiver. Example light sources may include an LED or a LASER light source. Controller 1220 and processing circuitry 1210 may be general purpose processors or may be specially designed circuits configured to implement the techniques described herein. Power level assignment scheme storage 1265 may be flash storage, Read Only Memory (ROM) or other transitory or non-transitory storage.

Transmitters 1205 and 1250 may be transceivers in that they may have associated receivers, such as a receivers 1225, 1258. The power level assignment scheme may be assigned by the receiver 1260 (which also may be a transceiver), through agreement with the second transmitter 1250, or the like. The assigned power level assignment scheme may be one of a predetermined library of assignment schemes that is stored in the power level assignment scheme storage 1265. In some examples, the assigned power level assignment scheme may be based upon a scheme in the library of assignment schemes but modified for one or more of the particular transmitters and receivers involved in the communication session. In yet other examples, the assigned power level assignment scheme may be custom to the particular communication session. The power level assignment scheme storage 1265 may store the particular assignment scheme, a selection of the particular assignment scheme, any customizations in use, the current phase, and/or the like.

Receiver 1225 may be a fiber optic receiver, but also may be an out-of-band receiver such as a WiFi receiver, a Bluetooth receiver, an ethernet receiver, or the like. Receiver 1225 may receive instructions from the receiver 1260 that are passed to the controller to turn on or off the light source 1215 during model training for the receiver.

Second transmitter 1250 may include similar components as first transmitter 1205. For example, a controller 1254, a light source 1256, processing circuitry 1252, a receiver 1258, a power level assignment scheme storage 1270, and the like. In some examples, if first transmitter 1205 and second transmitter 1250 are in a same device, one or more components may be shared between first transmitter 1205 and second transmitter 1250. Additionally, first transmitter 1205 and second transmitter 1250 may send multiple streams of data over the fiber optic cable to receiver 1260 over multiple different wavelengths. Thus, the first transmitter 1205 and second transmitter 1250 may utilize both the techniques of the present invention to send multiple streams of data simultaneously over a same fiber by altering power levels, but also multiple streams using different wavelengths.

Figure 13:
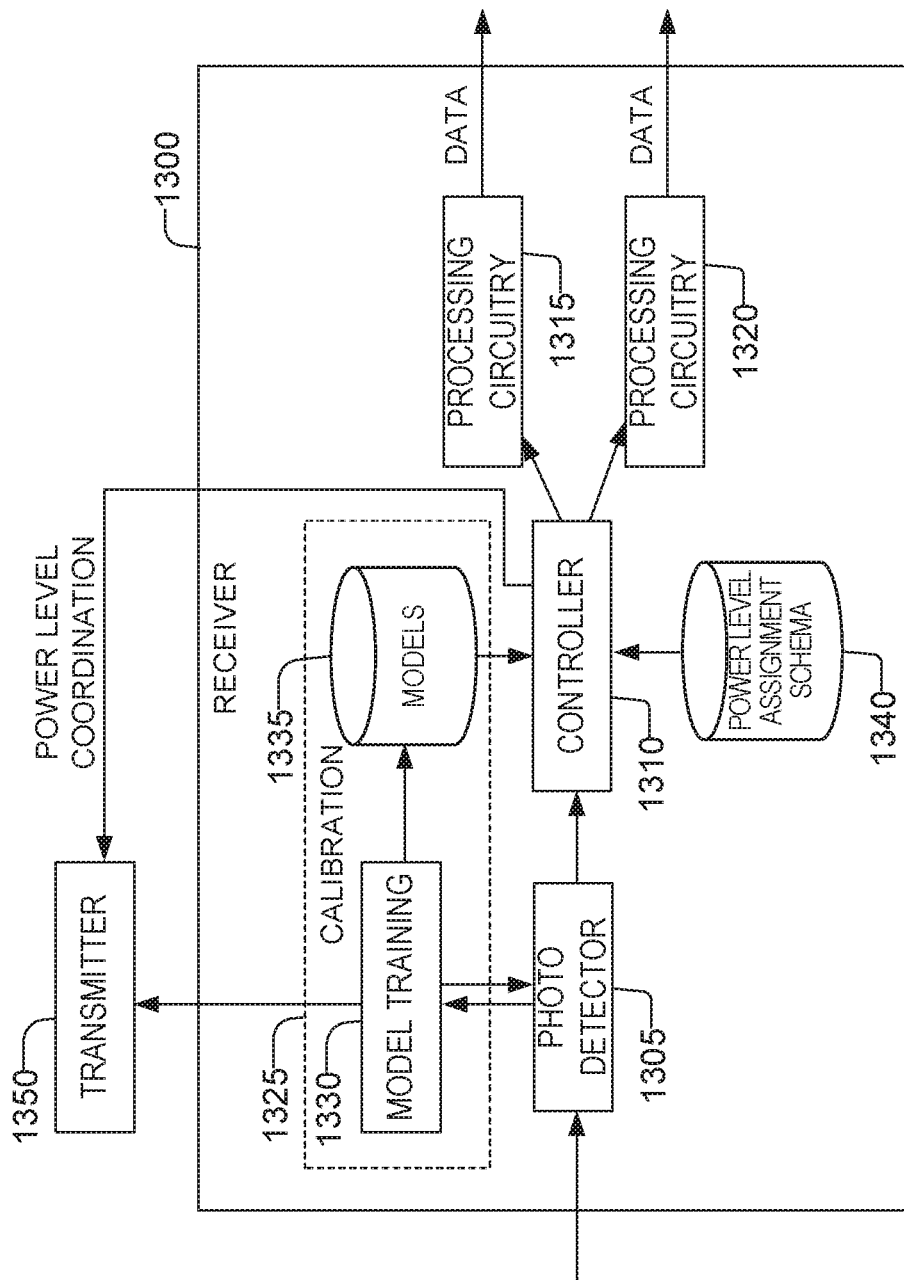
FIG. 13 shows a schematic of a receiver according to some examples of the present disclosure.

FIG. 13 shows a schematic of a receiver 1300 according to some examples of the present disclosure. For example, receiver 1300 may be an example receiver that is part of transceiver 1260. Receiver 1300 may include a photo detector 1305 that detects and/or counts photons received over an optical communication path such as a fiber optic fiber over a predetermined time period (e.g., a timeslot). The photon counts are passed to the controller 1310. Controller 1310 may utilize one or more detection models stored in model storage 1335 to determine individual bits in a bit stream. For example, the models may comprise one or more Poisson distributions that may return the probability that the photon counts correspond to one or more particular bit combinations for each stream. The particular detection models to use may be selected based upon the current phase of the current power level assignment scheme. The current phase and/or the selected power level assignment scheme may be stored in power level assignment scheme storage 1340.

For example, consider a simple power level assignment scheme in which two light sources simultaneously transmit across a same communication path (e.g., fiber optic fiber) on a same wavelength. The power level assignment scheme alternates which of the two light sources—corresponding to two distinct data streams activates on a high power level on a bit-by-bit basis. On the first bit, stream 1 is the high power light source and stream 2 is the low power light source. The received photon counts for the period of time in which the first bit is to be transmitted is submitted to a first detection model set that includes models trained to detect the first light source activating at a high power (with the second light source being off), the second light source activating at low power (with the first light source being off), and both activated at their respective assigned powers. The detection model to return a highest score (e.g., detection probability) is used to assign values to the bit stream. For example, if the detection model trained to detect the first light source activated at a high power (with the second light source being off) returns the highest probability, then a '1' is assigned to the bit stream corresponding to the first light source and a zero to the bit stream corresponding to the second light source (e.g., based upon the modulation scheme where a '1' is indicated by activation of the light source and '0' is indicated by the light source being off).

On the second phase, stream 1 is the low power light source and stream 2 is the high-power light source. The received photon counts for the period of time in which the second bit is to be transmitted is submitted to a second detection model set that includes models trained to detect the first light source activated at a low power (with no activation of the second light source), the second light source activated at a high power (with no activation of the first light source), and both transmitting a '1' at their respective assigned powers. The detection model to return a highest score (e.g., detection probability) is used to assign values to the bit stream. For example, if the detection model trained to detect the first light source activated at a low power (with no activation of the second device) returns the highest probability, then a '1' is assigned to the bit stream corresponding to the first light source and a zero to the bit stream corresponding to the second light source.

Each bit stream determined by the controller is then passed to the processing circuitry 1315 and 1320 respectively, which decodes the bit stream, and performs various operations (such as an inverse of the operations performed by the processing circuitry 1210 and 1252 of the transmitters in FIG. 12) and outputs bitstreams to higher level layers (such as a Physical, Transport, or other network layers).

Calibration components 1325 may include a model training component 1330 which may instruct the transmitters (through a transmitter 1350) to transmit various test data sequences. The models may be built using photon counts observed by the photo detector 1305. In some examples, the controller 1310 may also select and control the power level assignment scheme. For example, by communication with the transmitters to select and/or customize a scheme. This may happen before the communication session with the transmitters and/or periodically during the communication session. In other examples, where the transmitters agree to the power level assignment scheme, the controller 1310 receives messages indicating which power level assignment scheme is active. The controller may determine the current phase by messaging to and/or from one or more of the transmitters (e.g., for QoS based approaches or modifications), based upon an elapsed time from the last phase, or the like.

The controller 1310, as noted, determines the phase of the power level assignment scheme (which transmitter's light source is at what power) and uses the phase to select the appropriate detection models. For example, referring back to table 1 with a power level assignment scheme where a first phase has the first transmitter transmitting at a high power level, if the phase is 1, then the models trained with data on photon counts from a training period where the first transmitter was activated at a high power and the second transmitter was activated at a low power level may be selected and used.

Figure 14:
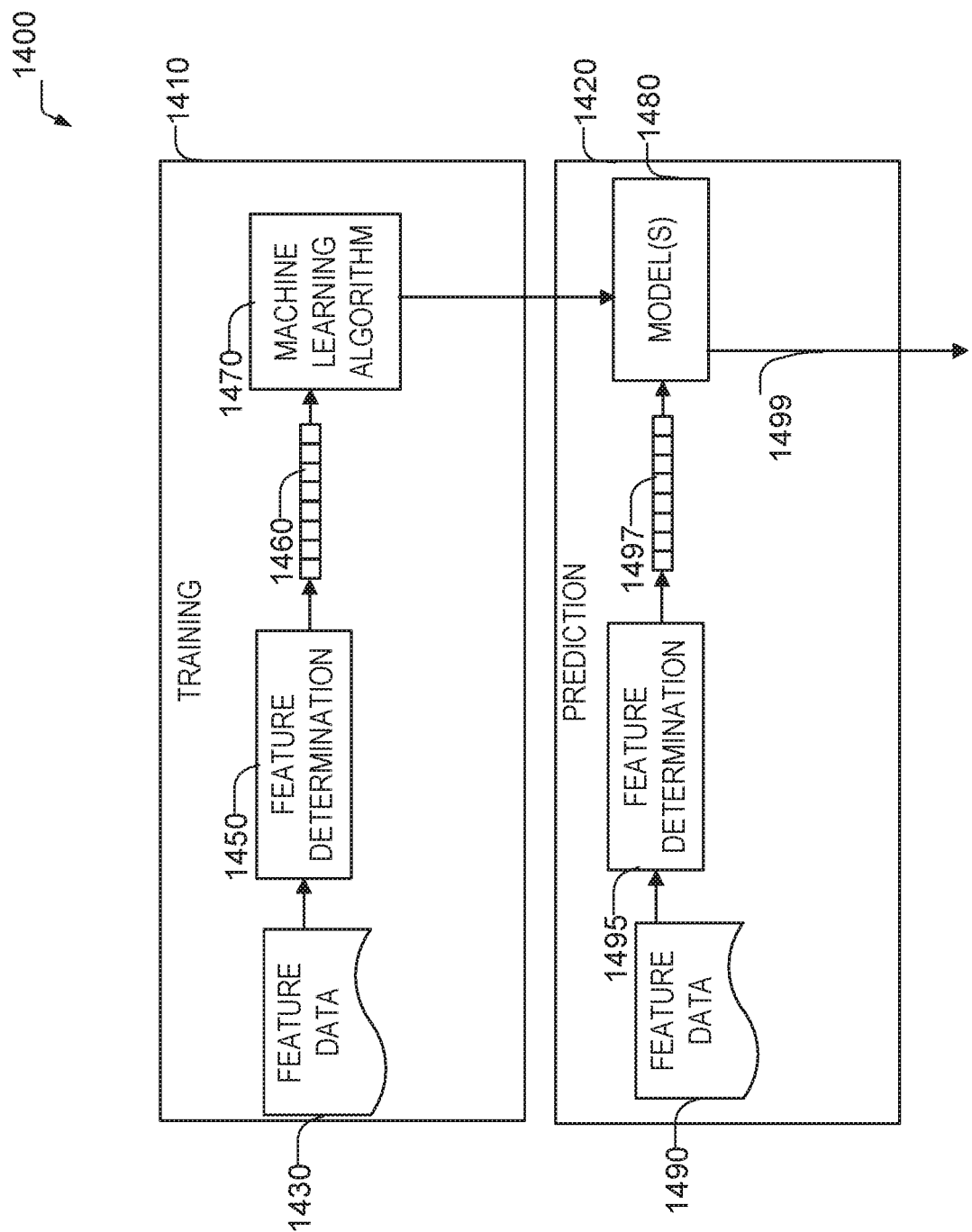
FIG. 14 shows an example machine learning component according to some examples of the present disclosure.

FIG. 14 shows an example machine learning component 1400 according to some examples of the present disclosure. The machine learning component 1400 may be implemented in whole or in part by the model training component 1330. The machine learning component 1400 may include a training component 1410 and a prediction component 1420. In some examples, the training component 1410 may be implemented by a different device than the prediction component 1420. In these examples, the model 1480 may be created on a first machine and then sent to a second machine.

Machine learning component 1400 utilizes a training component 1410 and a prediction component 1420. Training component 1410 inputs feature data 1430 into feature determination component 1450. The feature data 1430 may be photon counts, phases, and the like. In some examples, the feature data may be explicitly labeled with the bit assignments for each stream, the light source(s) currently transmitting, the power level the light source(s) that are currently transmitting are transmitting at, and the like.

Feature determination component 1450 determines one or more features for feature vector 1460 from the feature data 1430. Features of the feature vector 1460 are a set of the information input and is information determined to be predictive of a bit assignment for each stream. Features chosen for inclusion in the feature vector 1460 may be all the feature data 1430 or in some examples, may be a subset of all the feature data 1430. In examples in which the features chosen for the feature vector 1460 are a subset of the feature data 1430, a predetermined list of which feature data 1430 is included in the feature vector may be utilized. The feature vector 1460 may be utilized (along with any applicable labels) by the machine learning algorithm 1470 to produce one or more detection models 1480.

In the prediction component 1420, the current feature data 1490 (e.g., photon counts) may be input to the feature determination component 1495. Feature determination component 1495 may determine the same set of features or a different set of features as feature determination component 1450. In some examples, feature determination component 1450 and 1495 are the same components or different instances of the same component. Feature determination component 1495 produces feature vector 1497, which are input into the model 1480 to determine bit assignments, phases, power level assignment schemes, or the like 1499.

The training component 1410 may operate in an offline manner to train the model 1480. The prediction component 1420, however, may be designed to operate in an online manner. It should be noted that the model 1480 may be periodically updated via additional training and/or user feedback.

The machine learning algorithm 1470 may be selected from among many different potential supervised or unsupervised machine learning algorithms. Examples of supervised learning algorithms include artificial neural networks, convolutional neural networks, Bayesian networks, instance-based learning, support vector machines, decision trees (e.g., Iterative Dichotomiser 3, C4.5, Classification and Regression Tree (CART), Chi-squared Automatic Interaction Detector (CHAID), and the like),random forests, linear classifiers, quadratic classifiers, k-nearest neighbor, linear regression, logistic regression, support vector machines, perceptrons, and hidden Markov models. Examples of unsupervised learning algorithms include expectation-maximization algorithms, vector quantization, and information bottleneck method. Unsupervised models may not have a training component 1410. In some examples, the detection model 1480 may determine a bit for each stream based upon the detected photons. In other examples, the detection model 1480 may produce a score or probability for each stream that a particular bit was sent.

As noted, the machine learning models may be used to select a power level assignment scheme. In these examples, the feature data 1430, 1490 may be information predictive of a proper power level assignment scheme. The features discussed above may be utilized as feature data 1430, 1490 such as a power budget, transmitter characteristics, receiver characteristics, and the like. The result may be a ranking and/or selection 1499 of a power level assignment scheme.

The modulation schemes utilized herein have been relatively simple (on or off to represent a '1' or a '0'). In other examples, different modulation schemes may be utilized. For example, if the light sources and the receivers are capable, WDM, phase shift modulation, amplitude modulation, and other advanced modulation forms may be utilized in addition to the techniques described herein. For example, a plurality of bitstreams may be divided into a plurality of wavelengths where each wavelength may have multiple streams of data that are sent using the methods disclosed herein. Similarly, for power modulation, a power assignment scheme of the present invention may assign multiple power levels to each transmitter—where each power level is a particular bit combination. Thus, first transmitter may be assigned power levels 1, 2, and 3 (to indicate '01', '10', and '11' bits respectively) and second transmitter may be assigned power levels 4, 5, and 6 (to indicate '01', '10', and '11' bits respectively). In this example, the system may allocate the power levels such that the average photon counts of each power level combination are distinct enough such that the probability distributions are far enough apart so that the error rate is low.

Figure 15:
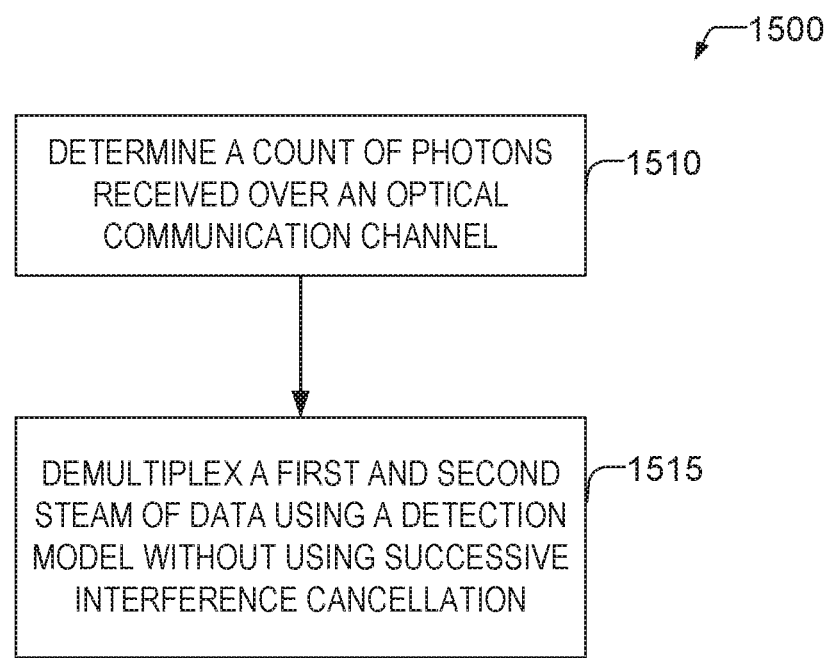
FIG. 15 illustrates a flowchart of a method of receiving data optically according to some examples of the present disclosure.

FIG. 15 illustrates a flowchart of a method 1500 of receiving data optically according to some examples of the present disclosure. At operation 1510, a controller or other processor of the receiver may determine a count of the photons received over an optical communication channel. For example, the controller may be communicatively coupled to a photon sensor. The controller may poll or otherwise receive a count, or the like. In some examples, the photons that hit the sensor may result from a transmission of a first stream of data at a first power level and a second stream of data at a second power level. The first stream of data may be transmitted by a first light source and the second stream of data may be transmitted by a second light source. The first and second light sources may be on a same device, or on different devices. In some examples, the photon count may correspond to photons detected by the photon detector within a timeslot for sending a bit of data.

At operation 1515, the receiver may demultiplex a first and a second stream of data from the optical communication channel by applying the photon count as an input to at least one detection model. An example detection model may be a probability distribution such as a Poisson probability distribution. The demultiplexing may be accomplished without using successive interference cancellation. In some examples, the demultiplexing may be performed utilizing a plurality of detection models by assigning bit values corresponding to a detection model of the plurality of detection models that returns a highest probability given the photon count. In some examples, the received photons may be detected as a sinusoidal wave, a square wave, or the like. In some examples, the photon count may result from, or be influenced by, destructive interference and the demultiplexing is not affected by it because the detection models are trained based upon the photon count averages which already account for the destructive interference. In some examples, the optical communication channel may be over (or partially over) a single fiber optic fiber. In other examples, the optical communication channel may be over (or partially over) air—e.g., the transmitter may be pointed at the receiver.

Figure 16:
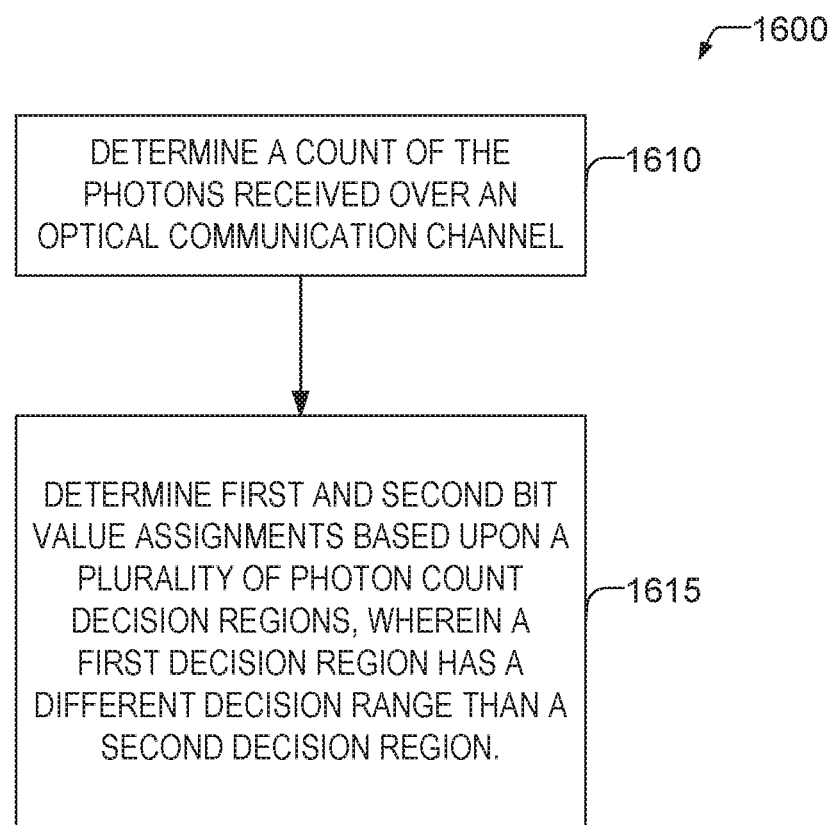
FIG. 16 illustrates a flowchart of a method for receiving optical signals at a receiver according to some examples of the present disclosure.

FIG. 16 illustrates a flowchart of a method 1600 for receiving optical signals at a receiver according to some examples of the present disclosure. At operation 1610 the receiver may determine a count of photons hitting a photon detector during a detection period (e.g., a timeslot) and for a particular light frequency. For example, a controller at the receiver may be communicatively coupled to a photon detector. The photons may have been produced from transmission of respective first and second bitstreams transmitted on a same frequency and across a same optical communication path to the photon detector during the detection period. The respective first and second bitstreams may be transmitted by selectively powering on and off first and second light sources at first and second power levels. In some examples, the selectively powering on and off may be in accordance with a particular modulation scheme, such as an amplitude modulation scheme.

At operation 1615, the receiver may determine, based upon the photon count, a first bit value assignment for the first bit stream and a second bit value assignment for the second bit stream based on a plurality of photon count decision regions. In some examples, each of the plurality of photon count decision regions correspond to respective bit value assignments for the first and second bit streams. In some examples, a first decision region of the plurality of photon count decision regions has a different decision range than a second decision region of the plurality of photon count decision regions. In some examples, a decision range of the plurality of photon count decision regions may be defined by a range of photon counts of the decision region where a probability is greater than a threshold (e.g., greater than a negligible threshold). In these examples, the decision ranges of multiple decision regions may overlap. In other examples, the decision range of the plurality of photon count decision regions may be defined as the photon count in which a probability returned by the decision region is highest. Thus, the decision regions may not overlap. In some examples, the decision regions may be described by a Poisson distribution.

In some examples, determining, based upon the photon count, a first bit value assignment for a first bit stream and a second bit value assignment for a second bit stream using a plurality of photon count decision regions is performed by determining, for each of the plurality of photon count decision regions, a probability given the photon count, selecting the photon count decision region with a greatest probability given the photon count, and assigning a value to the first and second bit streams that corresponds with a bit assignment corresponding to the selected photon count decision region. In some examples, the decision regions may be readjusted. For example, a training procedure may be rerun after a predetermined period of time. This may adjust for changing light source transmission characteristics, changing medium characteristics, and the like.

Figure 17:
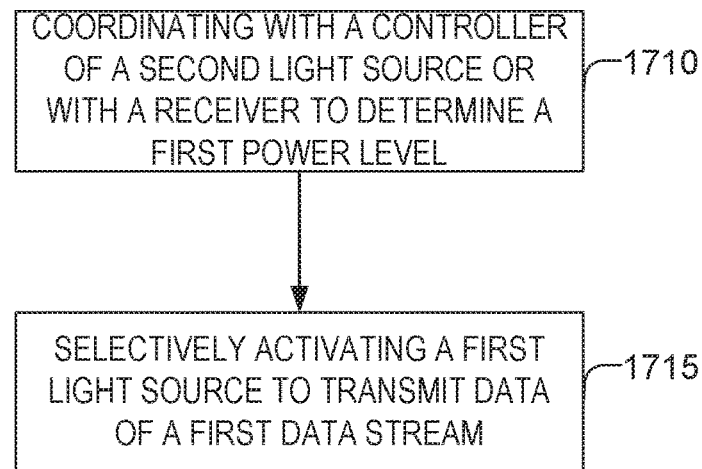
FIG. 17 illustrates a flowchart of a method for simultaneous transmission of multiple data streams over an optical communication path according to some examples of the present disclosure.

FIG. 17 illustrates a flowchart of a method 1700 for simultaneous transmission of multiple data streams over an optical communication path according to some examples of the present disclosure. The method 1700 may be performed by a controller of a first light source. At operation 1710, the controller may coordinate with a controller of a second light source or with a receiver to determine a first power level. For example, the controller may determine one or more power level assignment schemes, determine a current phase, and the like. The power level assignment schemes may be assigned by the receiver, determined by mutual agreement between transmitters and in some examples the receiver, or the like. The first power level may be determined by identifying a current phase. For example, based upon a bit transmitted in a sequence.

At operation 1715, the controller may selectively activate a first light source at the first power level at a first wavelength according to a modulation scheme to transmit data of a first stream of data to the receiver. During the same timeslot, the second data stream may be transmitted across the optical communication path by a second light source selectively activated according to the modulation scheme at the first wavelength and at a second power level. For example, the first light source may be activated "on" at the first power level to transmit a one bit and deactivated to transmit a zero. In other examples, more complex modulation schemes may be utilized, such as amplitude modulation where a sinusoidal waveform is adjusted in amplitude.

In some examples, each bit of data of the first stream may be transmitted at a same timeslot as corresponding bits of data of a second data stream (e.g., the bit transmissions are synchronized so each light source transmits simultaneously). For example, the first light source transmits the first bit of the first data stream during a first timeslot as the second light source transmits the first bit of data of the second data stream. During a second timeslot, the first light source may transmit the second bit of data of the first data stream and the second light source may transmit the second bit of data of the second data stream. In subsequent transmissions, based upon the power level assignment scheme, the first light source may selectively transmit at the first power level and the second light source may selectively transmit at the second power level according to the modulation scheme.

Figure 18:
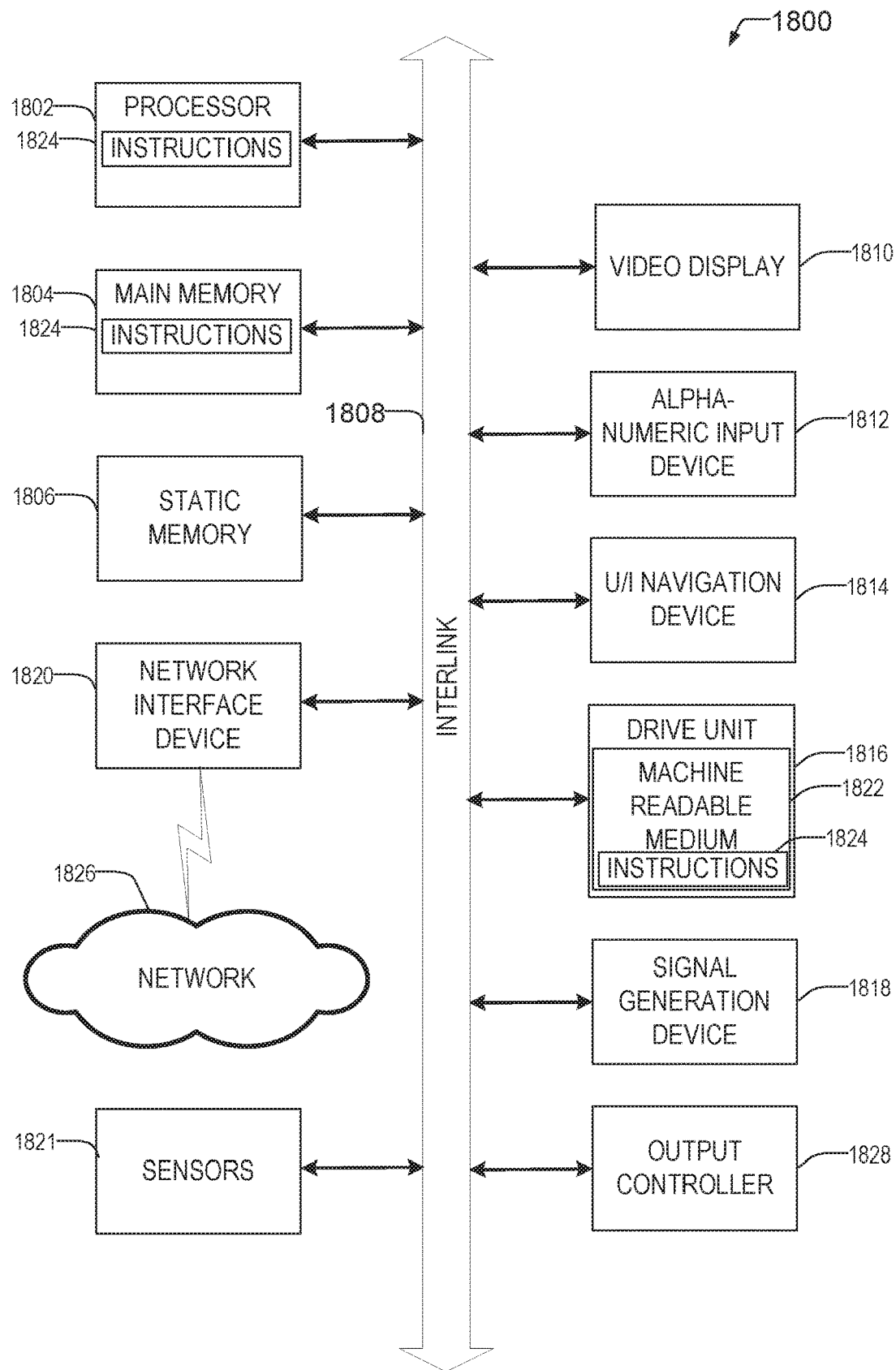
FIG. 18 is a block diagram illustrating an example of a machine upon which one or more embodiments may be implemented.

FIG. 18 illustrates a block diagram of an example machine 1800 upon which any one or more of the techniques (e.g., methodologies) discussed herein may perform. In alternative embodiments, the machine 1800 may operate as a standalone device or may be connected (e.g., networked) to other machines. In a networked deployment, the machine 1800 may operate in the capacity of a server machine, a client machine, or both in server-client network environments. In an example, the machine 1800 may act as a peer machine in peer-to-peer (P2P) (or other distributed) network environment. The machine 1800 may be a personal computer (PC), a tablet PC, a set-top box (STB), a personal digital assistant (PDA), a mobile telephone, a smart phone, a web appliance, a network router, switch or bridge, or any machine capable of executing instructions (sequential or otherwise) that specify actions to be taken by that machine. Machine 1800 may implement the transmitters and/or receivers disclosed herein. Furthermore, machine 1800 may include the transmitters and/or receivers disclosed herein. Machine 1800 may implement any of the methods disclosed herein. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate on, logic or a number of components, components, or mechanisms. Components are tangible entities (e.g., hardware) capable of performing specified operations and may be configured or arranged in a certain manner. In an example, circuits may be arranged (e.g., internally or with respect to external entities such as other circuits) in a specified manner as a component. In an example, the whole or part of one or more computer systems (e.g., a standalone, client or server computer system) or one or more hardware processors may be configured by firmware or software (e.g., instructions, an application portion, or an application) as a component that operates to perform specified operations. In an example, the software may reside on a machine readable medium. In an example, the software, when executed by the underlying hardware of the component, causes the hardware to perform the specified operations.

Accordingly, the term "component" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which components are temporarily configured, each of the components need not be instantiated at any one moment in time. For example, where the components comprise a general-purpose hardware processor configured using software, the general-purpose hardware processor may be configured as respective different components at different times. Software may accordingly configure a hardware processor, for example, to constitute a particular component at one instance of time and to constitute a different component at a different instance of time.

Machine (e.g., computer system) 1800 may include a hardware processor 1802 (e.g., a central processing unit (CPU), a graphics processing unit (GPU), a hardware processor core, or any combination thereof), a main memory 1804 and a static memory 1806, some or all of which may communicate with each other via an interlink (e.g., bus) 1808. The machine 1800 may further include a display unit 1810, an alphanumeric input device 1812 (e.g., a keyboard), and a user interface (UI) navigation device 1814 (e.g., a mouse). In an example, the display unit 1810, input device 1812 and UI navigation device 1814 may be a touch screen display. The machine 1800 may additionally include a storage device (e.g., drive unit) 1816, a signal generation device 1818 (e.g., a speaker), a network interface device 1820, and one or more sensors 1821, such as a global positioning system (GPS) sensor, compass, accelerometer, or other sensor. The machine 1800 may include an output controller 1828, such as a serial (e.g., universal serial bus (USB), parallel, or other wired or wireless (e.g., infrared (IR), near field communication (NFC), etc) connection to communicate or control one or more peripheral devices (e.g., a printer, card reader, etc.).

The storage device 1816 may include a machine readable medium 1822 on which is stored one or more sets of data structures or instructions 1824 (e.g., software) embodying or utilized by any one or more of the techniques or functions described herein. The instructions 1824 may also reside, completely or at least partially, within the main memory 1804, within static memory 1806, or within the hardware processor 1802 during execution thereof by the machine 1800. In an example, one or any combination of the hardware processor 1802, the main memory 1804, the static memory 1806, or the storage device 1816 may constitute machine readable media.

While the machine readable medium 1822 is illustrated as a single medium, the term "machine readable medium" may include a single medium or multiple media (e.g., a centralized or distributed database, and/or associated caches and servers) configured to store the one or more instructions 1824.

The term "machine readable medium" may include any medium that is capable of storing, encoding, or carrying instructions for execution by the machine 1800 and that cause the machine 1800 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); Solid. State Drives (SSD); and CD-ROM and DVD-ROM disks. In some examples, machine readable media may include non-transitory machine readable media. In some examples, machine readable media may include machine readable media that is not a transitory propagating signal.

The instructions 1824 may further be transmitted or received over a communications network 1826 using a transmission medium via the network interface device 1820. The Machine 1800 may communicate with one or more other machines utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, a Long Term Evolution (LTE) family of standards, a Universal Mobile Telecommunications System (UMTS) family of standards, peer-to-peer (P2P) networks, among others. In an example, the network interface device 1820 may include one or more physical jacks (e.g., Ethernet, coaxial, or phone jacks) or one or more antennas to connect to the communications network 1826. In an example, the network interface device 1820 may include a plurality of antennas to wirelessly communicate using at least one of single-input multiple-output (SIMO), multiple-input multiple-output (MIMO), or multiple-input single-output (MISO) techniques. In some examples, the network interface device 1820 may wirelessly communicate using Multiple User MIMO techniques.

OTHER NOTES AND EXAMPLES

Example 1 is a method for receiving data over an optical communication path, the method comprising: determining a count of photons detected on the optical communication path over a determined time frame; determining, based upon the count and a first detection model, a first probability that a first light source corresponding to a first data stream is powered on at a first power level, the first power level different than a second power level; determining, based upon the count and a second detection model, a second probability that a second light source corresponding to a second data stream is powered on at the second power level; determining, based upon the count and a third detection model, a third probability that both the first and second light sources are simultaneously on at the respective first and second power levels; and determining first data of the first data stream and second data of the second data stream based upon the first, second, and third probabilities.

In Example 2, the subject matter of Example 1 includes, wherein determining the first data and second data comprises: assigning a value of one to the first data responsive to the first probability or the third probability being greater than a threshold probability; and assigning a value of one to the second data responsive to the second probability or the third probability being greater than the threshold probability.

In Example 3, the subject matter of Examples 1-2 includes, wherein determining the first data and second data comprises: assigning a value of one to the first data responsive to the first probability or the third probability being a highest probability of the first, second, and third probabilities.

In Example 4, the subject matter of Examples 1-3 includes, wherein determining the first data and second data comprises: assigning a value of one to the second data responsive to the second probability or the third probability being higher than the first probability.

In Example 5, the subject matter of Examples 1-4 includes, wherein the first data stream and the second data stream are both transmitted by a same device.

In Example 6, the subject matter of Examples 1-5 includes, wherein the first data stream and the second data stream are transmitted by different devices.

In Example 7, the subject matter of Examples 1-6 includes, wherein the first data stream and the second data stream are transmitted on a same wavelength.

In Example 8, the subject matter of Examples 1-7 includes, wherein the first, second, and third detection models are Poisson distributions.

In Example 9, the subject matter of Examples 1-8 includes, wherein the optical communication path is a fiber optic fiber.

Example 10 is a device for receiving data over an optical communication path, the device comprising: a hardware processor configured to perform operations comprising: determining a count of photons detected on the optical communication path over a determined time frame; determining, based upon the count and a first detection model, a first probability that a first light source corresponding to a first data stream is powered on at a first power level, the first power level different than a second power level; determining, based upon the count and a second detection model, a second probability that a second light source corresponding to a second data stream is powered on at the second power level; determining, based upon the count and a third detection model, a third probability that both the first and second light sources are simultaneously on at the respective first and second power levels; and determining first data of the first data stream and second data of the second data stream based upon the first, second, and third probabilities.

In Example 11, the subject matter of Example 10 includes, wherein the operations of determining the first data and second data comprise: assigning a value of one to the first data responsive to the first probability or the third probability being greater than a threshold probability; and assigning a value of one to the second data responsive to the second probability or the third probability being greater than the threshold probability.

In Example 12, the subject matter of Examples 10-11 includes, wherein the operations of determining the first data and second data comprise: assigning a value of one to the first data responsive to the first probability or the third probability being a highest probability of the first, second, and third probabilities.

In Example 13, the subject matter of Examples 10-12 includes, wherein the operations of determining the first data and second data comprise: assigning a value of one to the second data responsive to the second probability or the third probability being higher than the first probability.

In Example 14, the subject matter of Examples 10-13 includes, wherein the first data stream and the second data stream are both transmitted by a same device.

In Example 15, the subject matter of Examples 10-14 includes, wherein the first data stream and the second data stream are transmitted by different devices.

In Example 16, the subject matter of Examples 10-15 includes, wherein the first data stream and the second data stream are transmitted on a same wavelength.

In Example 17, the subject matter of Examples 10-16 includes, wherein the first, second, and third detection models are Poisson distributions.

In Example 18, the subject matter of Examples 10-17 includes, wherein the optical communication path is a fiber optic fiber.

Example 19 is a machine-readable medium, storing instructions, which when executed by a machine, cause the machine to perform operations comprising: determining a count of photons detected on an optical communication path over a determined time frame; determining, based upon the count and a first detection model, a first probability that a first light source corresponding to a first data stream is powered on at a first power level, the first power level different than a second power level; determining, based upon the count and a second detection model, a second probability that a second light source corresponding to a second data stream is powered on at the second power level; determining, based upon the count and a third detection model, a third probability that both the first and second light sources are simultaneously on at the respective first and second power levels; and determining first data of the first data stream and second data of the second data stream based upon the first, second, and third probabilities.

In Example 20, the subject matter of Example 19 includes, wherein the operations of determining the first data and second data comprise: assigning a value of one to the first data responsive to the first probability or the third probability being greater than a threshold probability; and assigning a value of one to the second data responsive to the second probability or the third probability being greater than the threshold probability.

In Example 21, the subject matter of Examples 19-20 includes, wherein the operations of determining the first data and second data comprise: assigning a value of one to the first data responsive to the first probability or the third probability being a highest probability of the first, second, and third probabilities.

In Example 22, the subject matter of Examples 19-21 includes, wherein the operations of determining the first data and second data comprise: assigning a value of one to the second data responsive to the second probability or the third probability being higher than the first probability.

In Example 23, the subject matter of Examples 19-22 includes, wherein the first data stream and the second data stream are both transmitted by a same device.

In Example 24, the subject matter of Examples 19-23 includes, wherein the first data stream and the second data stream are transmitted by different devices.

In Example 25, the subject matter of Examples 19-24 includes, wherein the first data stream and the second data stream are transmitted on a same wavelength.

In Example 26, the subject matter of Examples 19-25 includes, wherein the first, second, and third detection models are Poisson distributions.

In Example 27, the subject matter of Examples 19-26 includes, wherein the optical communication path is a fiber optic fiber.

Example 28 is a device for receiving data over an optical communication path, the device comprising: means for determining a count of photons detected on the optical communication path over a determined time frame; means for determining, based upon the count and a first detection model, a first probability that a first light source corresponding to a first data stream is powered on at a first power level, the first power level different than a second power level; means for determining, based upon the count and a second detection model, a second probability that a second light source corresponding to a second data stream is powered on at the second power level; means for determining, based upon the count and a third detection model, a third probability that both the first and second light sources are simultaneously on at the respective first and second power levels; and means for determining first data of the first data stream and second data of the second data stream based upon the first, second, and third probabilities.

In Example 29, the subject matter of Example 28 includes, wherein the means for determining the first data and second data comprises: means for assigning a value of one to the first data responsive to the first probability or the third probability being greater than a threshold probability; and means for assigning a value of one to the second data responsive to the second probability or the third probability being greater than the threshold probability.

In Example 30, the subject matter of Examples 28-29 includes, wherein the means for determining the first data and second data comprises: means for assigning a value of one to the first data responsive to the first probability or the third probability being a highest probability of the first, second, and third probabilities.

In Example 31, the subject matter of Examples 28-30 includes, wherein the means for determining the first data and second data comprises: means for assigning a value of one to the second data responsive to the second probability or the third probability being higher than the first probability.

In Example 32, the subject matter of Examples 28-31 includes, wherein the first data stream and the second data stream are both transmitted by a same device.

In Example 33, the subject matter of Examples 28-32 includes, wherein the first data stream and the second data stream are transmitted by different devices.

In Example 34, the subject matter of Examples 28-33 includes, wherein the first data stream and the second data stream are transmitted on a same wavelength.

In Example 35, the subject matter of Examples 28-34 includes, wherein the first, second, and third detection models are Poisson distributions.

In Example 36, the subject matter of Examples 28-35 includes, wherein the optical communication path is a fiber optic fiber.

Example 37 is a method for simultaneous transmission of multiple data streams across an optical communication path, the method comprising: identifying a power level assignment scheme, the power level assignment scheme assigning different power levels to first and second light sources; determining a current phase of the power level assignment scheme; determining a first power level of the first light source corresponding to a first stream of data to be transmitted across the optical communication path based upon the power level assignment scheme and the current phase; and transmitting data of the first stream of data at a first frequency across the optical communication path using the first light source at the first power level, the data of the first stream of data transmitted at a same time and frequency as data of a second stream of data is transmitted across the same optical communication path, the second stream of data transmitted at a second power level.

In Example 38, the subject matter of Example 37 includes, transmitting the data of the second stream of data using the second light source at the second power level.

In Example 39, the subject matter of Examples 37-38 includes, wherein the data of the second stream of data is transmitted by a different device than the data of the first stream of data.

In Example 40, the subject matter of Examples 37-39 includes, determining a priority of the first stream of data; communicating the priority to one of: a receiver of the first and second streams of data or a transmitter of the second stream of data; and wherein one of: the power level assignment scheme is identified or the current phase, is determined based at least in part upon the priority of the first stream of data and a priority of the second stream of data.

In Example 41, the subject matter of Examples 37-40 includes, wherein a current phase is a first phase and wherein a second phase of the power level assignment scheme assigns the first power level to the second light source and the second power level to the first light source, and wherein the method further comprises: determining that the current phase has transitioned to the second phase; and transmitting data of the first stream of data using the second power level.

In Example 42, the subject matter of Examples 37-41 includes, wherein identifying the power level assignment scheme comprises receiving an identifier of a selected power level assignment scheme from a receiver.

In Example 43, the subject matter of Examples 37-42 includes, wherein determining the current phase comprises determining whether a timer of a first phase has elapsed.

In Example 44, the subject matter of Examples 37-43 includes, wherein determining the current phase comprises determining whether a data counter of a first phase has exceeded a threshold count.

In Example 45, the subject matter of Examples 37-44 includes, wherein determining the first power level comprises parsing the power level assignment scheme for the first power level.

In Example 46, the subject matter of Examples 37-45 includes, wherein the optical communication path is a fiber optic fiber.

Example 47 is a device for transmitting data across an optical communication path, the device comprising: a hardware processor configured to perform operations comprising: identifying a power level assignment scheme, the power level assignment scheme assigning different power levels to first and second light sources; determining a current phase of the power level assignment scheme; determining a first power level of the first light source corresponding to a first stream of data to be transmitted across an optical communication path based upon the power level assignment scheme and the current phase; and transmitting data of the first stream of data at a first frequency across the optical communication path using the first light source at the first power level, the data of the first stream of data transmitted at a same time and frequency as data of a second stream of data is transmitted across the same optical communication path, the second stream of data transmitted at a second power level.

In Example 48, the subject matter of Example 47 includes, wherein the operations further comprise: transmitting the data of the second stream of data using the second light source at the second power level.

In Example 49, the subject matter of Examples 47-48 includes, wherein the data of the second stream of data is transmitted by a different device than the data of the first stream of data.

In Example 50, the subject matter of Examples 47-49 includes, wherein the operations further comprise: determining a priority of the first stream of data; communicating the priority to one of: a receiver of the first and second streams of data or a transmitter of the second stream of data; and wherein one of: the power level assignment scheme is identified or the current phase, is determined based at least in part upon the priority of the first stream of data and a priority of the second stream of data.

In Example 51, the subject matter of Examples 47-50 includes, wherein a current phase is a first phase and wherein a second phase of the power level assignment scheme assigns the first power level to the second light source and the second power level to the first light source, and wherein the operations further comprise: determining that the current phase has transitioned to the second phase; and transmitting data of the first stream of data using the second power level.

In Example 52, the subject matter of Examples 47-51 includes, wherein the operations of identifying the power level assignment scheme comprises receiving an identifier of a selected power level assignment scheme from a receiver.

In Example 53, the subject matter of Examples 47-52 includes, wherein the operations of determining the current phase comprises determining whether a timer of a first phase has elapsed.

In Example 54, the subject matter of Examples 47-53 includes, wherein the operations of determining the current phase comprises determining whether a data counter of a first phase has exceeded a threshold count.

In Example 55, the subject matter of Examples 47-54 includes, wherein the operations of determining the first power level comprises parsing the power level assignment scheme for the first power level.

In Example 56, the subject matter of Examples 47-55 includes, wherein the optical communication path is a fiber optic fiber.

Example 57 is a machine-readable medium, storing instructions, which when executed by a machine, cause the machine to perform operations comprising: a hardware processor configured to perform operations comprising: identifying a power level assignment scheme, the power level assignment scheme assigning different power levels to first and second light sources; determining a current phase of the power level assignment scheme; determining a first power level of the first light source corresponding to a first stream of data to be transmitted across an optical communication path based upon the power level assignment scheme and the current phase; transmitting data of the first stream of data at a first frequency across the optical communication path using the first light source at the first power level, the data of the first stream of data transmitted at a same time and frequency as data of a second stream of data is transmitted across the same optical communication path, the second stream of data transmitted at a second power level.

In Example 58, the subject matter of Example 57 includes, wherein the operations further comprise: transmitting the data of the second stream of data using the second light source at the second power level.

In Example 59, the subject matter of Examples 57-58 includes, wherein the data of the second stream of data is transmitted by a different device than the data of the first stream of data.

In Example 60, the subject matter of Examples 57-59 includes, wherein the operations further comprise: determining a priority of the first stream of data; communicating the priority to one of: a receiver of the first and second streams of data or a transmitter of the second stream of data; and wherein one of: the power level assignment scheme is identified or the current phase, is determined based at least in part upon the priority of the first stream of data and a priority of the second stream of data.

In Example 61, the subject matter of Examples 57-60 includes, wherein a current phase is a first phase and wherein a second phase of the power level assignment scheme assigns the first power level to the second light source and the second power level to the first light source, and wherein the operations further comprise: determining that the current phase has transitioned to the second phase; and transmitting data of the first stream of data using the second power level.

In Example 62, the subject matter of Examples 57-61 includes, wherein the operations of identifying the power level assignment scheme comprises receiving an identifier of a selected power level assignment scheme from a receiver.

In Example 63, the subject matter of Examples 57-62 includes, wherein the operations of determining the current phase comprises determining whether a timer of a first phase has elapsed.

In Example 64, the subject matter of Examples 57-63 includes, wherein the operations of determining the current phase comprises determining whether a data counter of a first phase has exceeded a threshold count.

In Example 65, the subject matter of Examples 57-64 includes, wherein the operations of determining the first power level comprises parsing the power level assignment scheme for the first power level.

In Example 66, the subject matter of Examples 57-65 includes, wherein the optical communication path is a fiber optic fiber.

Example 67 is a device for transmitting data across an optical communication path, the device comprising: means for identifying a power level assignment scheme, the power level assignment scheme assigning different power levels to first and second light sources; means for determining a current phase of the power level assignment scheme; means for determining a first power level of the first light source corresponding to a first stream of data to be transmitted across an optical communication path based upon the power level assignment scheme and the current phase; and means for transmitting data of the first stream of data at a first frequency across the optical communication path using the first light source at the first power level, the data of the first stream of data transmitted at a same time and frequency as data of a second stream of data is transmitted across the same optical communication path, the second stream of data transmitted at a second power level.

In Example 68, the subject matter of Example 67 includes, means for transmitting the data of the second stream of data using the second light source at the second power level.

In Example 69, the subject matter of Examples 67-68 includes, wherein the data of the second stream of data is transmitted by a different device than the data of the first stream of data.

In Example 70, the subject matter of Examples 67-69 includes, means for determining a priority of the first stream of data; means for communicating the priority to one of: a receiver of the first and second streams of data or a transmitter of the second stream of data; and means for wherein one of: the power level assignment scheme is identified or the current phase, is determined based at least in part upon the priority of the first stream of data and a priority of the second stream of data.

In Example 71, the subject matter of Examples 67-70 includes, wherein a current phase is a first phase and wherein a second phase of the power level assignment scheme assigns the first power level to the second light source and the second power level to the first light source, and wherein the device further comprises: means for determining that the current phase has transitioned to the second phase; and means for transmitting data of the first stream of data using the second power level.

In Example 72, the subject matter of Examples 67-71 includes, wherein the means for identifying the power level assignment scheme comprises means for receiving an identifier of a selected power level assignment scheme from a receiver.

In Example 73, the subject matter of Examples 67-72 includes, wherein the means for determining the current phase comprises means for determining whether a timer of a first phase has elapsed.

In Example 74, the subject matter of Examples 67-73 includes, wherein the means for determining the current phase comprises means for determining whether a data counter of a first phase has exceeded a threshold count.

In Example 75, the subject matter of Examples 67-74 includes, wherein the means for determining the first power level comprises means for parsing the power level assignment scheme for the first power level.

In Example 76, the subject matter of Examples 67-75 includes, wherein the optical communication path is a fiber optic fiber.

Example 77 is a method for receiving data over an optical communication path, the method comprising: calculating a first photon count of photons observed during a first time period when a first light source transmits at a first power level on a first wavelength over an optical communication path and a second light source does not transmit over the fiber; determining a first detection model from the first photon count, the first detection model producing an inference for whether a given photon count indicates that the first light source is activated at the first power level and the second light source is not activated; calculating a second photon count of photons observed during a second time period when the second light source transmits at a second power level on the first wavelength over the fiber and the first light source does not transmit over the fiber; determining a second detection model from the second photon count, the second detection model producing an inference for whether a given photon count indicates that the second light source is activated at a second power level and the first light source is not activated; calculating a third photon count of photons observed during a third time period when both the first light source transmits at the first power level and the second light source transmits at the second power level on the first wavelength over the fiber; determining a third detection model from the third photon count, the third detection model producing an inference for whether a given photon count indicates that both the first light source is activated at the first power level and the second light source is activated at a second power level; receiving a transmission over the fiber at the first wavelength during a fourth time period; determining a photon count of the transmission; determining a first inference that the transmission resulted from the first light source at the first power level using the first detection model, a second inference that the transmission resulted from the second light source at the second power level using the second detection model, and a third inference that the transmission resulted from the first and second light source together using the third detection model; and assigning bit values to, a first data stream corresponding to the first light source and a second data stream corresponding to the second light source, based upon the first, second, and third inferences, the first and second data streams stored in a memory of a computing device.

In Example 78, the subject matter of Example 77 includes, wherein the first detection model is a Poisson distribution.

In Example 79, the subject matter of Example 78 includes, wherein training the first photon count is an average number of photons observed during the first time period.

In Example 80, the subject matter of Examples 77-79 includes, wherein determining the first detection model comprises training a supervised learning machine learned model using the first photon count.

In Example 81, the subject matter of Examples 77-80 includes, wherein the method further comprises: sending a first instruction to a controller of the first light source prior to the first time period; sending a second instruction to a controller of the second light source prior to the second time period; and sending a third instruction to the controller of the first light source and the controller of the second light source prior to the third time period.

In Example 82, the subject matter of Examples 77-81 includes, wherein the first and second light sources are in a same device.

In Example 83, the subject matter of Examples 77-82 includes, wherein the first and second light sources are in different devices.

In Example 84, the subject matter of Examples 77-83 includes, wherein the first, second, and third inferences are probabilities and wherein assigning bit values to the first data stream corresponding to the first light source and the second data stream corresponding to the second light source based upon the first, second, and third inferences comprises: determining that either the first or third inferences indicates a greatest probability, and, in response, assigning a value of one to the first stream.

In Example 85, the subject matter of Examples 77-84 includes, wherein the first, second, and third inferences are probabilities and wherein assigning bit values to the first data stream corresponding to the first light source and the second data stream corresponding to the second light source based upon the first, second, and third inferences comprises: determining that either the second or third inferences indicates a greatest probability, and, in response, assigning a value of one to the second stream.

In Example 86, the subject matter of Examples 77-85 includes, wherein the first, second, and third detection models are specific to a first phase of a power level assignment scheme, and wherein the method further comprises: determining the first inference, the second inference, and the third inference responsive to a determination that the first phase of the power level assignment scheme is active; receiving a next transmission over the fiber at the first wavelength during a fifth time period; determining a photon count of the next transmission; determining that a second phase of the power level assignment scheme is active; responsive to determining that the second phase of the power level assignment scheme is active, determining a next bit assignment for the first data stream and the second data stream based upon the photon count of the next transmission and fourth, fifth, and sixth detection models, the fourth, fifth, and sixth detection models calculated based upon the second phase of the power level assignment scheme.

In Example 87, the subject matter of Examples 77-86 includes, wherein the optical communication path is a fiber optic fiber.

Example 88 is a device for receiving data over an optical communication path, the device comprising: a hardware processor configured to perform the operations comprising: calculating a first photon count of photons observed during a first time period when a first light source transmits at a first power level on a first wavelength over an optical communication path and a second light source does not transmit over the fiber; determining a first detection model from the first photon count, the first detection model producing an inference for whether a given photon count indicates that the first light source is activated at the first power level and the second light source is not activated; calculating a second photon count of photons observed during a second time period when the second light source transmits at a second power level on the first wavelength over the fiber and the first light source does not transmit over the fiber; determining a second detection model from the second photon count, the second detection model producing an inference for whether a given photon count indicates that the second light source is activated at a second power level and the first light source is not activated; calculating a third photon count of photons observed during a third time period when both the first light source transmits at the first power level and the second light source transmits at the second power level on the first wavelength over the fiber; determining a third detection model from the third photon count, the third detection model producing an inference for whether a given photon count indicates that both the first light source is activated at the first power level and the second light source is activated at a second power level; receiving a transmission over the fiber at the first wavelength during a fourth time period; determining a photon count of the transmission; determining a first inference that the transmission resulted from the first light source at the first power level using the first detection model, a second inference that the transmission resulted from the second light source at the second power level using the second detection model, and a third inference that the transmission resulted from the first and second light source together using the third detection model; and assigning bit values to, a first data stream corresponding to the first light source and a second data stream corresponding to the second light source, based upon the first, second, and third inferences, the first and second data streams stored in a memory of a computing device.

In Example 89, the subject matter of Example 88 includes, wherein the first detection model is a Poisson distribution.

In Example 90, the subject matter of Example 89 includes, wherein the operations of training the first photon count is an average number of photons observed during the first time period.

In Example 91, the subject matter of Examples 88-90 includes, wherein the operations of determining the first detection model comprises training a supervised learning machine learned model using the first photon count.

In Example 92, the subject matter of Examples 88-91 includes, wherein the operations further comprises: sending a first instruction to a controller of the first light source prior to the first time period; sending a second instruction to a controller of the second light source prior to the second time period; and sending a third instruction to the controller of the first light source and the controller of the second light source prior to the third time period.

In Example 93, the subject matter of Examples 88-92 includes, wherein the first and second light sources are in a same device.

In Example 94, the subject matter of Examples 88-93 includes, wherein the first and second light sources are in different devices.

In Example 95, the subject matter of Examples 88-94 includes, wherein the first, second, and third inferences are probabilities and wherein the operations of assigning bit values to the first data stream corresponding to the first light source and the second data stream corresponding to the second light source based upon the first, second, and third inferences comprises: determining that either the first or third inferences indicates a greatest probability, and, in response, assigning a value of one to the first stream.

In Example 96, the subject matter of Examples 88-95 includes, wherein the first, second, and third inferences are probabilities and wherein the operations of assigning bit values to the first data stream corresponding to the first light source and the second data stream corresponding to the second light source based upon the first, second, and third inferences comprises: determining that either the second or third inferences indicates a greatest probability, and, in response, assigning a value of one to the second stream.

In Example 97, the subject matter of Examples 88-96 includes, wherein the first, second, and third detection models are specific to a first phase of a power level assignment scheme, and wherein the operations further comprise: determining the first inference, the second inference, and the third inference responsive to a determination that the first phase of the power level assignment scheme is active; receiving a next transmission over the fiber at the first wavelength during a fifth time period; determining a photon count of the next transmission; determining that a second phase of the power level assignment scheme is active; responsive to determining that the second phase of the power level assignment scheme is active, determining a next bit assignment for the first data stream and the second data stream based upon the photon count of the next transmission and fourth, fifth, and sixth detection models, the fourth, fifth, and sixth detection models calculated based upon the second phase of the power level assignment scheme.

In Example 98, the subject matter of Examples 88-97 includes, wherein the optical communication path is a fiber optic fiber.

Example 99 is a machine-readable medium that stores instructions, which when performed, cause a machine to perform operations comprising: calculating a first photon count of photons observed during a first time period when a first light source transmits at a first power level on a first wavelength over an optical communication path and a second light source does not transmit over the fiber; determining a first detection model from the first photon count, the first detection model producing an inference for whether a given photon count indicates that the first light source is activated at the first power level and the second light source is not activated; calculating a second photon count of photons observed during a second time period when the second light source transmits at a second power level on the first wavelength over the fiber and the first light source does not transmit over the fiber; determining a second detection model from the second photon count, the second detection model producing an inference for whether a given photon count indicates that the second light source is activated at a second power level and the first light source is not activated; calculating a third photon count of photons observed during a third time period when both the first light source transmits at the first power level and the second light source transmits at the second power level on the first wavelength over the fiber; determining a third detection model from the third photon count, the third detection model producing an inference for whether a given photon count indicates that both the first light source is activated at the first power level and the second light source is activated at a second power level; receiving a transmission over the fiber at the first wavelength during a fourth time period; determining a photon count of the transmission; determining a first inference that the transmission resulted from the first light source at the first power level using the first detection model, a second inference that the transmission resulted from the second light source at the second power level using the second detection model, and a third inference that the transmission resulted from the first and second light source together using the third detection model; and assigning bit values to, a first data stream corresponding to the first light source and a second data stream corresponding to the second light source, based upon the first, second, and third inferences, the first and second data streams stored in a memory of a computing device.

In Example 100, the subject matter of Example 99 includes, wherein the first detection model is a Poisson distribution.

In Example 101, the subject matter of Example 100 includes, wherein the operations of training the first photon count is an average number of photons observed during the first time period.

In Example 102, the subject matter of Examples 99-101 includes, wherein the operations of determining the first detection model comprises training a supervised learning machine learned model using the first photon count.

In Example 103, the subject matter of Examples 99-102 includes, wherein the operations further comprises: sending a first instruction to a controller of the first light source prior to the first time period; sending a second instruction to a controller of the second light source prior to the second time period; and sending a third instruction to the controller of the first light source and the controller of the second light source prior to the third time period.

In Example 104, the subject matter of Examples 99-103 includes, wherein the first and second light sources are in a same device.

In Example 105, the subject matter of Examples 99-104 includes, wherein the first and second light sources are in different devices.

In Example 106, the subject matter of Examples 99-105 includes, wherein the first, second, and third inferences are probabilities and wherein the operations of assigning bit values to the first data stream corresponding to the first light source and the second data stream corresponding to the second light source based upon the first, second, and third inferences comprises: determining that either the first or third inferences indicates a greatest probability, and, in response, assigning a value of one to the first stream.

In Example 107, the subject matter of Examples 99-106 includes, wherein the first, second, and third inferences are probabilities and wherein the operations of assigning bit values to the first data stream corresponding to the first light source and the second data stream corresponding to the second light source based upon the first, second, and third inferences comprises: determining that either the second or third inferences indicates a greatest probability, and, in response, assigning a value of one to the second stream.

In Example 108, the subject matter of Examples 99-107 includes, wherein the first, second, and third detection models are specific to a first phase of a power level assignment scheme, and wherein the operations further comprise: determining the first inference, the second inference, and the third inference responsive to a determination that the first phase of the power level assignment scheme is active; receiving a next transmission over the fiber at the first wavelength during a fifth time period; determining a photon count of the next transmission; determining that a second phase of the power level assignment scheme is active; responsive to determining that the second phase of the power level assignment scheme is active, determining a next bit assignment for the first data stream and the second data stream based upon the photon count of the next transmission and fourth, fifth, and sixth detection models, the fourth, fifth, and sixth detection models calculated based upon the second phase of the power level assignment scheme.

In Example 109, the subject matter of Examples 99-108 includes, wherein the optical communication path is a fiber optic fiber.

Example 110 is a device for receiving data over an optical communication path, the device comprising: means for calculating a first photon count of photons observed during a first time period when a first light source transmits at a first power level on a first wavelength over an optical communication path and a second light source does not transmit over the fiber; means for determining a first detection model from the first photon count, the first detection model producing an inference for whether a given photon count indicates that the first light source is activated at the first power level and the second light source is not activated; means for calculating a second photon count of photons observed during a second time period when the second light source transmits at a second power level on the first wavelength over the fiber and the first light source does not transmit over the fiber; means for determining a second detection model from the second photon count, the second detection model producing an inference for whether a given photon count indicates that the second light source is activated at a second power level and the first light source is not activated; means for calculating a third photon count of photons observed during a third time period when both the first light source transmits at the first power level and the second light source transmits at the second power level on the first wavelength over the fiber; means for determining a third detection model from the third photon count, the third detection model producing an inference for whether a given photon count indicates that both the first light source is activated at the first power level and the second light source is activated at a second power level; means for receiving a transmission over the fiber at the first wavelength during a fourth time period; means for determining a photon count of the transmission; means for determining a first inference that the transmission resulted from the first light source at the first power level using the first detection model, a second inference that the transmission resulted from the second light source at the second power level using the second detection model, and a third inference that the transmission resulted from the first and second light source together using the third detection model; and means for assigning bit values to, a first data stream corresponding to the first light source and a second data stream corresponding to the second light source, based upon the first, second, and third inferences, the first and second data streams stored in a memory of a computing device.

In Example 111, the subject matter of Example 110 includes, wherein the first detection model is a Poisson distribution.

In Example 112, the subject matter of Example 111 includes, wherein training the first photon count is an average number of photons observed during the first time period.

In Example 113, the subject matter of Examples 110-112 includes, wherein the means for determining the first detection model comprises means for training a supervised learning machine learned model using the first photon count.

In Example 114, the subject matter of Examples 110-113 includes, means for sending a first instruction to a controller of the first light source prior to the first time period; means for sending a second instruction to a controller of the second light source prior to the second time period; and means for sending a third instruction to the controller of the first light source and the controller of the second light source prior to the third time period.

In Example 115, the subject matter of Examples 110-114 includes, wherein the first and second light sources are in a same device.

In Example 116, the subject matter of Examples 110-115 includes, wherein the first and second light sources are in different devices.

In Example 117, the subject matter of Examples 110-116 includes, wherein the first, second, and third inferences are probabilities and wherein the means for assigning bit values to the first data stream corresponding to the first light source and the second data stream corresponding to the second light source based upon the first, second, and third inferences comprises: means for determining that either the first or third inferences indicates a greatest probability, and, in response, assigning a value of one to the first stream.

In Example 118, the subject matter of Examples 110-117 includes, wherein the first, second, and third inferences are probabilities and wherein the means for assigning bit values to the first data stream corresponding to the first light source and the second data stream corresponding to the second light source based upon the first, second, and third inferences comprises: means for determining that either the second or third inferences indicates a greatest probability, and, in response, assigning a value of one to the second stream.

In Example 119, the subject matter of Examples 110-118 includes, wherein the first, second, and third detection models are specific to a first phase of a power level assignment scheme, and wherein the device further comprises: means for determining the first inference, the second inference, and the third inference responsive to a determination that the first phase of the power level assignment scheme is active; means for receiving a next transmission over the fiber at the first wavelength during a fifth time period; means for determining a photon count of the next transmission; means for determining that a second phase of the power level assignment scheme is active; responsive to determining that the second phase of the power level assignment scheme is active, means for determining a next bit assignment for the first data stream and the second data stream based upon the photon count of the next transmission and fourth, fifth, and sixth detection models, the fourth, fifth, and sixth detection models calculated based upon the second phase of the power level assignment scheme.

In Example 120, the subject matter of Examples 110-119 includes, wherein the optical communication path is a fiber optic fiber.

Example 121 is a method of receiving data optically, the method comprising: determining a count of photons received over an optical communication channel, the photons resulting from a transmission of a first stream of data at a first power level and a second stream of data at a second power level; and demultiplexing a first and a second stream of data from the optical communication channel by applying the photon count as an input to at least one detection model without using successive interference cancellation.

In Example 122, the subject matter of Example 121 includes, wherein the demultiplexing is performed utilizing a plurality of detection models including the at least one detection model, the demultiplexing comprising assigning bit values corresponding to a detection model of the plurality of detection models that returns a highest probability given the photon count to the first stream of data and the second stream of data.

In Example 123, the subject matter of Example 122 includes, wherein a first detection model of the plurality of detection models has a different range than a second detection model of the plurality of detection models.

In Example 124, the subject matter of Example includes, wherein the plurality of detection models are probability models.

In Example 125, the subject matter of Examples 1-124 includes, wherein the received photons are received as a sinusoidal wave.

In Example 126, the subject matter of Examples 121-125 includes, wherein the received photons are received as a square wave.

In Example 127, the subject matter of Examples 121-126 includes, wherein the photon count results from destructive interference, and wherein demultiplexing the first and second stream of data is performed despite the destructive interference.

In Example 128, the subject matter of Examples 121-127 includes, wherein the photons are received over a single fiber optic fiber.

In Example 129, the subject matter of Examples 121-128 includes, wherein a first light source was used to transmit the first data stream and a second light source was used to transmit the second stream of data.

In Example 130, the subject matter of Examples 121-129 includes, wherein demultiplexing comprises demultiplexing a first and a second stream of data from the optical communication channel by applying the photon count as an input to at least one detection model without using successive interference cancellation and without remodulating a signal.

Example 131 is a device for receiving data optically, the device comprising: a controller configured to perform operations comprising: determining a count of photons received over an optical communication channel, the photons resulting from a transmission of a first stream of data at a first power level and a second stream of data at a second power level; and demultiplexing a first and a second stream of data from the optical communication channel by applying the photon count as an input to at least one detection model without using successive interference cancellation.

In Example 132, the subject matter of Example 131 includes, wherein the controller performs the demultiplexing utilizing a plurality of detection models including the at least one detection model, the operations of demultiplexing comprising assigning bit values corresponding to a detection model of the plurality of detection models that returns a highest probability given the photon count to the first stream of data and the second stream of data.

In Example 133, the subject matter of Example 132 includes, wherein a first detection model of the plurality of detection models has a different range than a second detection model of the plurality of detection models.

In Example 134, the subject matter of Example 133 includes, wherein the plurality of detection models are probability models.

In Example 135, the subject matter of Examples 131-134 includes, wherein the received photons are received as a sinusoidal wave.

In Example 136, the subject matter of Examples 131-135 includes, wherein the received photons are received as a square wave.

In Example 137, the subject matter of Examples 131-136 includes, wherein the photon count results from destructive interference, and wherein the operations of demultiplexing the first and second stream of data is performed despite the destructive interference.

In Example 138, the subject matter of Examples 131-137 includes, wherein the photons are received over a single fiber optic fiber.

In Example 139, the subject matter of Examples 131-138 includes, wherein a first light source was used to transmit the first stream of data and a second light source was used to transmit the second stream of data.

In Example 140, the subject matter of Examples 131-139 includes, wherein the operations of demultiplexing comprises demultiplexing a first and a second stream of data from the optical communication channel by applying the photon count as an input to at least one detection model without using successive interference cancellation and without remodulating a signal.

Example 141 is a machine-readable medium, storing instructions for receiving data optically, which when executed by a machine, cause the machine to perform operations comprising: a controller configured to perform operations comprising: determining a count of photons received over an optical communication channel, the photons resulting from a transmission of a first stream of data at a first power level and a second stream of data at a second power level; and demultiplexing a first and a second stream of data from the optical communication channel by applying the photon count as an input to at least one detection model without using successive interference cancellation.

In Example 142, the subject matter of Example 141 includes, wherein the demultiplexing utilizes a plurality of detection models including the at least one detection model, the operations of demultiplexing comprising assigning bit values corresponding to a detection model of the plurality of detection models that returns a highest probability given the photon count to the first stream of data and the second stream of data.

In Example 143, the subject matter of Example 142 includes, wherein a first detection model of the plurality of detection models has a different range than a second detection model of the plurality of detection models.

In Example 144, the subject matter of Example 143 includes, wherein the plurality of detection models are probability models.

In Example 145, the subject matter of Examples 141-144 includes, wherein the received photons are received as a sinusoidal wave.

In Example 146, the subject matter of Examples 141-145 includes, wherein the received photons are received as a square wave.

In Example 147, the subject matter of Examples 141-146 includes, wherein the photon count results from destructive interference, and wherein the operations of demultiplexing the first and second stream of data is performed despite the destructive interference.

In Example 148, the subject matter of Examples 141-147 includes, wherein the photons are received over a single fiber optic fiber.

In Example 149, the subject matter of Examples 141-148 includes, wherein a first light source was used to transmit the first stream of data and a second light source was used to transmit the second stream of data.

In Example 150, the subject matter of Examples 141-149 includes, wherein the operations of demultiplexing comprises demultiplexing a first and a second stream of data from the optical communication channel by applying the photon count as an input to at least one detection model without using successive interference cancellation and without remodulating a signal.

Example 151 is a device for receiving data optically, the device comprising: means for determining a count of photons received over an optical communication channel, the photons resulting from a transmission of a first stream of data at a first power level and a second stream of data at a second power level; and means for demultiplexing a first and a second stream of data from the optical communication channel by applying the photon count as an input to at least one detection model without using successive interference cancellation.

In Example 152, the subject matter of Example 151 includes, wherein the demultiplexing is performed utilizing a plurality of detection models including the at least one detection model, the means for demultiplexing comprising means for assigning bit values corresponding to a detection model of the plurality of detection models that returns a highest probability given the photon count to the first stream of data and the second stream of data.

In Example 153, the subject matter of Example 152 includes, wherein a first detection model of the plurality of detection models has a different range than a second detection model of the plurality of detection models.

In Example 154, the subject matter of Example 153 includes, wherein the plurality of detection models are probability models.

In Example 155, the subject matter of Examples 151-154 includes, wherein the received photons are received as a sinusoidal wave.

In Example 156, the subject matter of Examples 151-155 includes, wherein the received photons are received as a square wave.

In Example 157, the subject matter of Examples 151-156 includes, wherein the photon count results from destructive interference, and wherein demultiplexing the first and second stream of data is performed despite the destructive interference.

In Example 158, the subject matter of Examples 151-157 includes, wherein the photons are received over a single fiber optic fiber.

In Example 159, the subject matter of Examples 151-158 includes, wherein a first light source was used to transmit the first stream of data and a second light source was used to transmit the second stream of data.

In Example 160, the subject matter of Examples 151-159 includes, wherein the means for demultiplexing comprises means for demultiplexing a first and a second stream of data from the optical communication channel by applying the photon count as an input to at least one detection model without using successive interference cancellation and without remodulating a signal.

Example 161 is a system for transmitting data using light, the system comprising: a first light source configured to transmit a first data stream at a first power level and on a first wavelength to a receiver over a first optical communication path; and a second light source configured to transmit a second data stream at a second power level different than the first power level and on the first wavelength to the receiver over the first optical communication path simultaneously to a transmission of the first data stream by the first light source.

In Example 162, the subject matter of Example 161 includes, wherein the first optical communication path is a single fiber optic fiber.

In Example 163, the subject matter of Examples 161-162 includes, wherein the first and second light sources, when both activated, at least partially interfere with one another.

In Example 164, the subject matter of Examples 161-163 includes, a receiver configured to receive the first and second data streams and utilize a plurality of detection models to recover the first data stream and the second data stream.

In Example 165, the subject matter of Example 164 includes, wherein the first and second light sources, when both activated, interfere with one another at least sometimes on the first optical communication path and wherein the plurality of detection models are configured to account for the interference and wherein the receiver is configured to recover the first and second data streams despite the interference.

In Example 166, the subject matter of Examples 164-165 includes, wherein the receiver is configured to recover the first and second data streams by inputting a photon count of received photons to the plurality of detection models.

In Example 167, the subject matter of Example 166 includes, wherein at least one of the plurality of detection models is a Poisson probability distribution.

In Example 168, the subject matter of Examples 166-167 includes, wherein at least one of the plurality of detection models is a supervised learning neural network model.

In Example 169, the subject matter of Examples 166-168 includes, wherein at least two of the plurality of detection models have different detection ranges.

In Example 170, the subject matter of Examples 166-169 includes, wherein the receiver is configured to recover the first and second data streams by: submitting a photon count to the plurality of detection models, each of the plurality of detection models corresponding to a bit assignment of the first and second data streams; and assigning a value to the first data stream and the second data stream equal to the corresponding bit assignment of the detection model that produces a highest probability given a photon count.

In Example 171, the subject matter of Examples 166-170 includes, wherein the receiver is configured to instruct the first and second light sources to transmit a plurality of training sequences and the receiver is further configured to determine, from the training sequences, the plurality of detection models.

In Example 172, the subject matter of Examples 166-171 includes, wherein the receiver is configured to communicate a power level assignment scheme to the first and second light sources, the power level assignment schemes specifying a power level used by the first and second light sources at a plurality of phases, including a phase in which the first light source transmits at the first power level and the second light source transmits at the second power level.

In Example 173, the subject matter of Examples 161-172 includes, wherein the first and second light sources are contained in a same computing device.

In Example 174, the subject matter of Examples 161-173 includes, wherein the first light source is contained in a first computing device and a second light source is contained in a second computing device.

In Example 175, the subject matter of Examples 161-174 includes, wherein a controller of the first light source is configured to receive an instruction from the receiver indicating the first power level.

In Example 176, the subject matter of Examples 161-175 includes, wherein a controller of the first light source and a controller of the second light source are configured to transmit a training sequence to the receiver.

In Example 177, the subject matter of Examples 161-176 includes, wherein the first light source and the second light source are configured to be time synchronized and to transmit respective bits of the first and second data streams simultaneously.

In Example 178, the subject matter of Examples 161-177 includes, wherein the first light source is configured to transmit a sinusoidal waveform.

In Example 179, the subject matter of Examples 161-178 includes, wherein the first light source is configured to transmit a square waveform.

In Example 180, the subject matter of Examples 161-179 includes, wherein the first light source is a Light Emitting Diode (LED).

Example 181 is a method for simultaneous transmission of multiple data streams over an optical communication path, the method comprising, at a controller of a first light source: coordinating with a controller of a second light source or with a receiver to determine a first power level; and selectively activating a first light source at the first power level at a first wavelength according to a modulation scheme to transmit data of a first stream of data to the receiver, each bit of data of the first stream of data transmitted in a same timeslot as corresponding bits of data of a second data stream, the second data stream transmitted across the optical communication path by a second light source selectively activated according to the modulation scheme at the first wavelength and at a second power level.

In Example 182, the subject matter of Example 181 includes, wherein the optical communication path is a single fiber optic fiber.

In Example 183, the subject matter of Examples 181-182 includes, wherein the optical communication path is a path between the first and second light sources and a photon detector of the receiver that does not pass through a glass fiber.

In Example 184, the subject matter of Examples 181-183 includes, wherein coordinating with the controller of the second light source or with the receiver to determine a first power level comprises selecting a power level assignment scheme and determining the first power level from the selected power level assignment scheme.

In Example 185, the subject matter of Example 184 includes, wherein determining the first power level from the selected power level assignment scheme comprises identifying a current phase, and based upon the current phase, identifying the first power level from the power level assignment scheme.

In Example 186, the subject matter of Example 185 includes, wherein the current phase is related to a current timeslot.

In Example 187, the subject matter of Examples 181-186 includes, wherein the modulation scheme produces a sinusoidal waveform.

In Example 188, the subject matter of Examples 181-187 includes, wherein the modulation scheme produces a square waveform.

In Example 189, the subject matter of Examples 181-188 includes, wherein the first light source and the second light source are at different devices.

In Example 190, the subject matter of Examples 181-189 includes, wherein the first light source and the second light source are on a same device.

In Example 191, the subject matter of Examples 181-190 includes, wherein the method further comprises: at a subsequent phase of a power level assignment scheme, selectively activating the first light source at the second power level, and wherein the second light source is selectively activated at the first power level.

In Example 192, the subject matter of Examples 181-191 includes, wherein the modulation scheme activates the first light source when a bit of the first stream of data is a value of one and does not activate the first light source when a bit of the first stream of data is a value of zero.

Example 193 is a device for simultaneous transmission of multiple data streams over an optical communication path, the device comprising: a controller of a first light source configured to perform operations comprising: coordinating with a controller of a second light source or with a receiver to determine a first power level; and selectively activating a first light source at the first power level at a first wavelength according to a modulation scheme to transmit data of a first stream of data to the receiver, each bit of data of the first stream of data transmitted in a same timeslot as corresponding bits of data of a second data stream, the second data stream transmitted across the optical communication path by a second light source selectively activated according to the modulation scheme at the first wavelength and at a second power level.

In Example 194, the subject matter of Example 193 includes, wherein the optical communication path is a single fiber optic fiber.

In Example 195, the subject matter of Examples 193-194 includes, wherein the optical communication path is a path between the first and second light sources and a photon detector of the receiver that does not pass through a glass fiber.

In Example 196, the subject matter of Examples 193-195 includes, wherein the operations of coordinating with the controller of the second light source or with the receiver to determine a first power level comprises selecting a power level assignment scheme and determining the first power level from the selected power level assignment scheme.

In Example 197, the subject matter of Example 196 includes, wherein the operations of determining the first power level from the selected power level assignment scheme comprises identifying a current phase, and based upon the current phase, identifying the first power level from the power level assignment scheme.

In Example 198, the subject matter of Example 197 includes, wherein the current phase is related to a current timeslot.

In Example 199, the subject matter of Examples 193-198 includes, wherein the modulation scheme produces a sinusoidal waveform.

In Example 200, the subject matter of Examples 193-199 includes, wherein the modulation scheme produces a square waveform.

In Example 201, the subject matter of Examples 193-200 includes, wherein the first light source and the second light source are at different devices.

In Example 202, the subject matter of Examples 193-201 includes, wherein the first light source and the second light source are on a same device.

In Example 203, the subject matter of Examples 193-202 includes, wherein the operations further comprise: at a subsequent phase of a power level assignment scheme, selectively activating the first light source at the second power level, and wherein the second light source is selectively activated at the first power level.

In Example 204, the subject matter of Examples 193-203 includes, wherein the modulation scheme activates the first light source when a bit of the first stream of data is a value of one and does not activate the first light source when a bit of the first stream of data is a value of zero.

Example 205 is a machine-readable medium, storing instructions for simultaneous transmission of multiple data streams over an optical communication path, the instructions, when executed by a machine at a first light source, cause the machine to perform operations comprising: coordinating with a controller of a second light source or with a receiver to determine a first power level; and selectively activating a first light source at the first power level at a first wavelength according to a modulation scheme to transmit data of a first stream of data to the receiver, each bit of data of the first stream of data transmitted in a same timeslot as corresponding bits of data of a second data stream, the second data stream transmitted across the optical communication path by a second light source selectively activated according to the modulation scheme at the first wavelength and at a second power level.

In Example 206, the subject matter of Example 205 includes, wherein the optical communication path is a single fiber optic fiber.

In Example 207, the subject matter of Examples 205-206 includes, wherein the optical communication path is a path between the first and second light sources and a photon detector of the receiver that does not pass through a glass fiber.

In Example 208, the subject matter of Examples 205-207 includes, wherein the operations of coordinating with the controller of the second light source or with the receiver to determine a first power level comprises selecting a power level assignment scheme and determining the first power level from the selected power level assignment scheme.

In Example 209, the subject matter of Example 208 includes, wherein the operations of determining the first power level from the selected power level assignment scheme comprises identifying a current phase, and based upon the current phase, identifying the first power level from the power level assignment scheme.

In Example 210, the subject matter of Example 209 includes, wherein the current phase is related to a current timeslot.

In Example 211, the subject matter of Examples 205-210 includes, wherein the modulation scheme produces a sinusoidal waveform.

In Example 212, the subject matter of Examples 205-211 includes, wherein the modulation scheme produces a square waveform.

In Example 213, the subject matter of Examples 205-212 includes, wherein the first light source and the second light source are at different devices.

In Example 214, the subject matter of Examples 205-213 includes, wherein the first light source and the second light source are on a same device.

In Example 215, the subject matter of Examples 205-214 includes, wherein the operations further comprise: at a subsequent phase of a power level assignment scheme, selectively activating the first light source at the second power level, and wherein the second light source is selectively activated at the first power level.

In Example 216, the subject matter of Examples 205-215 includes, wherein the modulation scheme activates the first light source when a bit of the first stream of data is a value of one and does not activate the first light source when a bit of the first stream of data is a value of zero.

Example 217 is a device for simultaneous transmission of multiple data streams over an optical communication path, the device comprising, at a controller of a first light source: means for coordinating with a controller of a second light source or with a receiver to determine a first power level; and means for selectively activating a first light source at the first power level at a first wavelength according to a modulation scheme to transmit data of a first stream of data to the receiver, each bit of data of the first stream of data transmitted in a same timeslot as corresponding bits of data of a second data stream, the second data stream transmitted across the optical communication path by a second light source selectively activated according to the modulation scheme at the first wavelength and at a second power level.

In Example 218, the subject matter of Example 217 includes, wherein the optical communication path is a single fiber optic fiber.

In Example 219, the subject matter of Examples 217-218 includes, wherein the optical communication path is a path between the first and second light sources and a photon detector of the receiver that does not pass through a glass fiber.

In Example 220, the subject matter of Examples 217-219 includes, wherein the means for coordinating with the controller of the second light source or with the receiver to determine a first power level comprises means for selecting a power level assignment scheme and means for determining the first power level from the selected power level assignment scheme.

In Example 221, the subject matter of Example 220 includes, wherein the means for determining the first power level from the selected power level assignment scheme comprises means for identifying a current phase, and based upon the current phase, identifying the first power level from the power level assignment scheme.

In Example 222, the subject flatter of Example 221 includes, wherein the current phase is related to a current timeslot.

In Example 223, the subject matter of Examples 217-222 includes, wherein the modulation scheme produces a sinusoidal waveform.

In Example 224, the subject matter of Examples 217-223 includes, wherein the modulation scheme produces a square waveform.

In Example 225, the subject matter of Examples 217-224 includes, wherein the first light source and the second light source are at different devices.

In Example 226, the subject matter of Examples 217-225 includes, wherein the first light source and the second light source are on a same device.

In Example 227, the subject matter of Examples 217-226 includes, wherein the device further comprises: at a subsequent phase of a power level assignment scheme, means for selectively activating the first light source at the second power level, and wherein the second light source is selectively activated at the first power level.

In Example 228, the subject matter of Examples 217-227 includes, wherein the modulation scheme activates the first light source when a bit of the first stream of data is a value of one and does not activate the first light source when a bit of the first stream of data is a value of zero.

Example 229 is a method for receiving optical signals at a receiver, the method comprising: using hardware processing circuitry: determining a count of photons hitting a photon detector during a detection period and for a particular light frequency, the photons produced from transmission of respective first and second bitstreams transmitted on a same frequency and across a same optical communication path to the photon detector during the detection period; and determining, based upon the photon count, a first bit value assignment for the first bit stream and a second bit value assignment for the second bit stream based on a plurality of photon count decision regions, each of the plurality of photon count decision regions corresponding to respective bit value assignments for the first and second bit streams and wherein a first decision region of the plurality of photon count decision regions has a different decision range than a second decision region of the plurality of photon count decision regions.

In Example 230, the subject matter of Example 229 includes, wherein a decision range of the plurality of photon count decision regions comprises photon counts that produce a probability that is greater than a predetermined minimum threshold.

In Example 231, the subject matter of Example 230 includes, wherein determining, based upon the photon count, a first bit value assignment for a first bit stream and a second bit value assignment for a second bit stream using a plurality of photon count decision regions comprises: determining, for each of the plurality of photon count decision regions, a probability given the photon count; selecting the photon count decision region with a greatest probability given the photon count; and assigning a value to the first and second bit streams that corresponds with a bit assignment corresponding to the selected photon count decision region.

In Example 232, the subject matter of Example 231 includes, wherein the plurality of photon count decision regions are Poisson probability distributions created from a plurality of average photon counts received at the receiver during a training period.

In Example 233, the subject matter of Examples 229-232 includes, updating the plurality of photon count decision regions using a training process, wherein the training process changes a range of at least one of the plurality of photon count decision regions.

In Example 234, the subject matter of Examples 229-233 includes, instructing a first light source to transmit at a first power level and a second light source to transmit at a second power level.

In Example 235, the subject matter of Examples 229-234 includes, wherein the optical communication path is a single fiber optic fiber.

In Example 236, the subject matter of Examples 229-235 includes, wherein the optical communication path is a spatial alignment of a first transmitter that transmits the first bit stream and a photon detector of the receiver and a spatial alignment of a second transmitter that transmits the second bit stream and the photon detector.

Example 237 is a device for receiving optical signals, the device comprising: hardware processing circuitry configured to perform operations comprising: determining a count of photons hitting a photon detector during a detection period and for a particular light frequency, the photons produced from transmission of respective first and second bitstreams transmitted on a same frequency and across a same optical communication path to the photon detector during the detection period; and determining, based upon the photon count, a first bit value assignment for the first bit stream and a second bit value assignment for the second bit stream based on a plurality of photon count decision regions, each of the plurality of photon count decision regions corresponding to respective bit value assignments for the first and second bit streams and wherein a first decision region of the plurality of photon count decision regions has a different decision range than a second decision region of the plurality of photon count decision regions.

In Example 238, the subject matter of Example 237 includes, wherein a decision range of the plurality of photon count decision regions comprises photon counts that produce a probability that is greater than a predetermined minimum threshold.

In Example 239, the subject matter of Example 238 includes, wherein the operations of determining, based upon the photon count, a first bit value assignment for a first bit stream and a second bit value assignment for a second bit stream using a plurality of photon count decision regions comprises: determining, for each of the plurality of photon count decision regions, a probability given the photon count; selecting the photon count decision region with a greatest probability given the photon count; and assigning a value to the first and second bit streams that corresponds with a bit assignment corresponding to the selected photon count decision region.

In Example 240, the subject matter of Example 239 includes, wherein the plurality of photon count decision regions are Poisson probability distributions created from a plurality of average photon counts received at the receiver during a training period.

In Example 241, the subject matter of Examples 237-240 includes, wherein the operations further comprise: updating the plurality of photon count decision regions using a training process, wherein the training process changes a range of at least one of the plurality of photon count decision regions.

In Example 242, the subject matter of Examples 237-241 includes, wherein the operations further comprise: instructing a first light source to transmit at a first power level and a second light source to transmit at a second power level.

In Example 243, the subject matter of Examples 237-242 includes, wherein the optical communication path is a single fiber optic fiber.

In Example 244, the subject matter of Examples 237-243 includes, wherein the optical communication path is a spatial alignment of a first transmitter that transmits the first bit stream and a photon detector of the receiver and a spatial alignment of a second transmitter that transmits the second bit stream and the photon detector.

Example 245 is a machine-readable medium, storing instructions for receiving optical signals at a receiver, the instructions, when executed by a machine, cause the machine to perform operations comprising: determining a count of photons hitting a photon detector during a detection period and for a particular light frequency, the photons produced from transmission of respective first and second bitstreams transmitted on a same frequency and across a same optical communication path to the photon detector during the detection period; and determining, based upon the photon count, a first bit value assignment for the first bit stream and a second bit value assignment for the second bit stream based on a plurality of photon count decision regions, each of the plurality of photon count decision regions corresponding to respective bit value assignments for the first and second bit streams and wherein a first decision region of the plurality of photon count decision regions has a different decision range than a second decision region of the plurality of photon count decision regions.

In Example 246, the subject matter of Example 245 includes, wherein a decision range of the plurality of photon count decision regions comprises photon counts that produce a probability that is greater than a predetermined minimum threshold.

In Example 247, the subject matter of Example 246 includes, wherein the operations of determining, based upon the photon count, a first bit value assignment for a first bit stream and a second bit value assignment for a second bit stream using a plurality of photon count decision regions comprises: determining, for each of the plurality of photon count decision regions, a probability given the photon count; selecting the photon count decision region with a greatest probability given the photon count; and assigning a value to the first and second bit streams that corresponds with a bit assignment corresponding to the selected photon count decision region.

In Example 248, the subject matter of Example 247 includes, wherein the plurality of photon count decision regions are Poisson probability distributions created from a plurality of average photon counts received at the receiver during a training period.

In Example 249, the subject matter of Examples 245-248 includes, wherein the operations further comprise: updating the plurality of photon count decision regions using a training process, wherein the training process changes a range of at least one of the plurality of photon count decision regions.

In Example 250, the subject matter of Examples 245-249 includes, wherein the operations further comprise: instructing a first light source to transmit at a first power level and a second light source to transmit at a second power level.

In Example 251, the subject matter of Examples 245-250 includes, wherein the optical communication path is a single fiber optic fiber.

In Example 252, the subject matter of Examples 245-251 includes, wherein the optical communication path is a spatial alignment of a first transmitter that transmits the first bit stream and a photon detector of the receiver and a spatial alignment of a second transmitter that transmits the second bit stream and the photon detector.

Example 253 is a device for receiving optical signals, the device comprising: means for determining a count of photons hitting a photon detector during a detection period and for a particular light frequency, the photons produced from transmission of respective first and second bitstreams transmitted on a same frequency and across a same optical communication path to the photon detector during the detection period; and means for determining, based upon the photon count, a first bit value assignment for the first bit stream and a second bit value assignment for the second bit stream based on a plurality of photon count decision regions, each of the plurality of photon count decision regions corresponding to respective bit value assignments for the first and second bit streams and wherein a first decision region of the plurality of photon count decision regions has a different decision range than a second decision region of the plurality of photon count decision regions.

In Example 254, the subject matter of Example 253 includes, wherein a decision range of the plurality of photon count decision regions comprises photon counts that produce a probability that is greater than a predetermined minimum threshold.

In Example 255, the subject matter of Example 254 includes, wherein the means for determining, based upon the photon count, a first bit value assignment for a first bit stream and a second bit value assignment for a second bit stream using a plurality of photon count decision regions comprises: means for determining, for each of the plurality of photon count decision regions, a probability given the photon count; means for selecting the photon count decision region with a greatest probability given the photon count; and means for assigning a value to the first and second bit streams that corresponds with a bit assignment corresponding to the selected photon count decision region.

In Example 256, the subject matter of Example 255 includes, wherein the plurality of photon count decision regions are Poisson probability distributions created from a plurality of average photon counts received at the receiver during a training period.

In Example 257, the subject matter of Examples 253-256 includes, means for updating the plurality of photon count decision regions using a training process, wherein the training process changes a range of at least one of the plurality of photon count decision regions.

In Example 258, the subject matter of Examples 253-257 includes, means for instructing a first light source to transmit at a first power level and a second light source to transmit at a second power level.

In Example 259, the subject matter of Examples 253-258 includes, wherein the optical communication path is a single fiber optic fiber.

In Example 260, the subject matter of Examples 253-259 includes, wherein the optical communication path is a spatial alignment of a first transmitter that transmits the first bit stream and a photon detector of the receiver and a spatial alignment of a second transmitter that transmits the second bit stream and the photon detector.

Example 261 is at least one machine-readable medium including instructions that, when executed by processing circuitry, cause the processing circuitry to perform operations to implement of any of Examples 1-260.

Example 262 is an apparatus comprising means to implement of any of Examples 1-260.

Example 263 is a system to implement of any of Examples 1-260.

Example 264 is a method to implement of any of Examples 1-260.

What is claimed is:
1. A method for simultaneous transmission of multiple data streams over an optical communication path, the method comprising, at a controller of a first light source:
coordinating with a controller of a second light source or with a receiver to determine a first power level; and
selectively activating a first light source at the first power level at a first wavelength according to a modulation scheme to transmit data of a first stream of data to the receiver, each bit of data of the first stream of data transmitted during a same timeslot simultaneously with a corresponding bit of data of a second data stream, the second data stream transmitted across the optical communication path by a second light source selectively activated according to the modulation scheme at the first wavelength and at a second power level, the selective activation including at least one instance of simultaneous activation of both the first and second light sources, the first and second power levels both greater than zero.

2. The method of claim 1, wherein the optical communication path is a single fiber optic fiber.

3. The method of claim 1, wherein the optical communication path is a path between the first and second light sources and a photon detector of the receiver that does not pass through a glass fiber.

4. The method of claim 1, wherein coordinating with the controller of the second light source or with the receiver to determine a first power level comprises selecting a power level assignment scheme and determining the first power level from the selected power level assignment scheme.

5. The method of claim 4, wherein determining the first power level from the selected power level assignment scheme comprises identifying a current phase, and based upon the current phase, identifying the first power level from the power level assignment scheme.

6. The method of claim 5, wherein the current phase is related to a current timeslot.

7. The method of claim 1, wherein the modulation scheme produces a sinusoidal waveform.

8. The method of claim 1, wherein the modulation scheme produces a square waveform.

9. A device for simultaneous transmission of multiple data streams over an optical communication path, the device comprising:

a controller of a first light source configured to perform operations comprising:

coordinating with a controller of a second light source or with a receiver to determine a first power level; and selectively activating a first light source at the first power level at a first wavelength according to a modulation scheme to transmit data of a first stream of data to the receiver, each bit of data of the first stream of data transmitted during a same timeslot simultaneously with a corresponding bit of data of a second data stream, the second data stream transmitted across the optical communication path by a second light source selectively activated according to the modulation scheme at the first wavelength and at a second power level, the selective activation including at least one instance of simultaneous activation of both the first and second light sources, the first and second power levels both greater than zero.

10. The device of claim 9, wherein the optical communication path is a single fiber optic fiber.

11. The device of claim 9, wherein the optical communication path is a path between the first and second light sources and a photon detector of the receiver that does not pass through a glass fiber.

12. The device of claim 9, wherein the operations of coordinating with the controller of the second light source or with the receiver to determine a first power level comprises selecting a power level assignment scheme and determining the first power level from the selected power level assignment scheme.

13. The device of claim 12, wherein the operations of determining the first power level from the selected power level assignment scheme comprises identifying a current phase, and based upon the current phase, identifying the first power level from the power level assignment scheme.

14. The device of claim 13, wherein the current phase is related to a current timeslot.

15. The device of claim 9, wherein the modulation scheme produces a sinusoidal waveform.

16. The device of claim 9, wherein the modulation scheme produces a square waveform.

17. The device of claim 9, wherein the first light source and the second light source are at different devices.

18. The device of claim 9, wherein the first light source and the second light source are on a same device.

19. The device of claim 9, wherein the operations further comprise:

at a subsequent phase of a power level assignment scheme, selectively activating the first light source at the second power level, and wherein the second light source is selectively activated at the first power level.

20. The device of claim 9, wherein the modulation scheme activates the first light source when a bit of the first stream of data is a value of one and does not activate the first light source when a bit of the first stream of data is a value of zero.

* * * * *